United States Patent [19]
Estes

[11] Patent Number: 4,858,152
[45] Date of Patent: Aug. 15, 1989

[54] OPERATOR ACCESS TO MONITORING APPLICATIONS

[75] Inventor: Mark W. Estes, Dallas, Tex.; Harold H. Hall, San Jose, Ca.

[73] Assignee: International Business Machines Corp., Armonk, N.Y.

[21] Appl. No.: 6,514

[22] Filed: Jan. 23, 1987

[51] Int. Cl.[4] .............................................. G01F 15/06
[52] U.S. Cl. .................................... 364/550; 364/521; 364/138; 364/185; 340/721
[58] Field of Search ............... 364/550, 551, 518, 521, 364/900, 138, 139, 146, 178, 179, 184, 185, 188, 194; 340/720-722, 747, 701

[56] References Cited

U.S. PATENT DOCUMENTS

| | | | |
|---|---|---|---|
| 4,348,739 | 9/1982 | Deaver et al. | 364/900 |
| 4,375,079 | 2/1983 | Ricketts et al. | 364/900 |
| 4,468,750 | 8/1984 | Chamoff et al. | 364/900 |
| 4,471,348 | 9/1984 | London et al. | 364/551 |
| 4,527,247 | 7/1985 | Kaiser et al. | 364/550 |
| 4,622,538 | 11/1986 | Whynacht et al. | 364/551 |
| 4,644,478 | 2/1987 | Stephens et al. | 364/550 |
| 4,648,028 | 3/1987 | DeKlotz et al. | 364/188 |
| 4,653,112 | 3/1987 | Ouimette | 364/188 |
| 4,663,704 | 5/1987 | Jones et al. | 364/146 |
| 4,677,427 | 6/1987 | Komatsu et al. | 340/703 |
| 4,718,025 | 1/1988 | Minor et al. | 364/518 |

OTHER PUBLICATIONS

Sharman, "Multi-Thread Host Server for PC Support", IBM Technical Disclosure Bulletin, vol. 28, No. 9, pp. 3848–3855 (2/86).
Gallant, "Outspoken Micros Keep Support Center Humming", Computerworld, vol. XIX, No. 14, pp. 1 & 4 (4/8/85).

Primary Examiner—Parshotam S. Lall
Assistant Examiner—Brian M. Mattson
Attorney, Agent, or Firm—C. Lamont Whitham; Michael E. Whitham

[57] ABSTRACT

Information from multiple CICS host applications is gathered and the information is displayed on a single display screen. The information includes graphics, reports, and monitoring information. The display screens that the user is presented with are in a format that correspond to the host display screens that are commonly employed in large data processing (DO) centers. A host based status array is used to minimize the overhead of the communications between the host and the PC. The IBM 3270-PC or other microprocessor with a host communications interface receives existing, summarized information and reduces the information to a complete, accurate picture of the multiple applications that enables the operator to have timely information and respond effectively in a complex DP environment. The alarm information is organized to effectively call the operator's attention to a key problem quickly and efficiently. Key alarm messages can be designated as voice messages which are automatically translated and output as synthesized voice alerts. Threshold conditions can be called to the operator's attention by specifying tolerances, that once exceeded, trigger an electronic tone of designated frequency and duration.

10 Claims, 47 Drawing Sheets

```
                CICSPARS Alert Monitor          20 MAR 86   16:32:40
   Sample Interval= 5    Current Task= 122   Applid = CICSPARS  Sysid = CICS
MXT set at= 25     MXT HWM= 2    Times at MXT= 0    Tran Rate= 24.4 /SEC
AMXT set at= 10    AMXT HWM= 2                         DSA Size= 3231744
CMXT Values= 002 002 002 002 002 002 002 002 002      OSCOR size= 31624
CMXT HWM    = 000 000 000 000 000 000 000 000 000        Times SOS= 0
DL/I: Threads= 32  Pool Sizes(bytes) DMB= 204800  PSB= 307200  ENQ= 40960

Thr     Value
Set   Monitored       Observed

80% DSA Used---=)XXXXXX:XXXXXX 21%
80% OSCOR Used--=)XXXXX:XXXXX:XXXXX:XXXXX:XXXXX:XXXX 58%
15   Act. Tasks=)XXXXX 10
10   Sus. Tasks=)XX 5
20   Threads----=)XXXXX:XX 15
60% DMBpool----=)XXXXX:XXXXX:XXXXX:XXXXX:XXXXX 50%
50% PSBpool----=)XXXXX:XXXXX:XXXXX:XXXXX:XXXXX:X 52%

PF1=Help            xPress Enter to Terminate   Next Sample at 15:32:42
ERROR: This is the error line which reports any current error conditions.
```

FIG. 1
PRIOR ART

DISPLAY SCREEN

09:03:30 FOR RESOURCE NCP113   NPM ALERT MESSAGE   18 WAS ABOVE THE
MONITOR LIMIT OF 10            THE SLOWDOWN VALUE OF                08:51:50 14 Mar 86

Alert Status

| CICS Applid | DSA % | OSCOR % | Curr Task Used | Susp Task | Trds Used | DMB % | PSB % | ENQ % | Trans /Sec | Last Update | Alert Message |
|---|---|---|---|---|---|---|---|---|---|---|---|
| CICS002J | 15 | 86 | 14 | 1 | 0 | 45 | 53 | 0 | 18.4 | 08:50:20 | Multiple Alerts |
| CICS012J | 13 | 59 | 4 | 9 | 16 | 49 | 50 | 0 | 18.4 | 08:49:20 | PSB |
| CICS022J | 29 | 83 | 6 | 4 | 14 | 50 | 33 | 0 | 17.4 | 08:49:00 | OSCOR |
| CICS032J | 66 | 59 | 12 | 1 | 7 | 62 | 19 | 0 | 23.4 | 08:49:00 | DMB |
| CICS042J | 57 | 17 | 2 | 7 | 22 | 44 | 14 | 0 | 28.4 | 08:48:20 | Threads Used |
| CICS052J | 92 | 35 | 18 | 3 | 15 | 39 | 10 | 0 | 20.4 | 08:49:30 | Multiple Alerts |
| CICS062J | 80 | 10 | 14 | 5 | 5 | 54 | 44 | 0 | 27.4 | 08:48:50 | Dynamic Storage |
| CICS072J | 9 | 58 | 14 | 2 | 15 | 15 | 15 | 0 | 23.4 | 08:49:40 | |
| CICS082J | 90 | 77 | 13 | 3 | 2 | 19 | 27 | 0 | 19.4 | 08:50:10 | Dynamic Storage |
| CICS092J | 14 | 26 | 14 | 12 | 11 | 16 | 45 | 0 | 15.4 | 08:49:30 | Suspended Tasks |
| CICS102J | 83 | 60 | 6 | 2 | 12 | 48 | 33 | 0 | 23.4 | 08:50:10 | Dynamic Storage |
| CICS112J | 5 | 45 | 12 | 12 | 6 | 41 | 42 | 0 | 27.4 | 08:45:30 | Suspended Tasks |
| CICS122J | 64 | 55 | 13 | 12 | 1 | 60 | 48 | 0 | 12.4 | 08:50:20 | Multiple Alerts |
| CICS132J | 60 | 55 | 12 | 8 | 4 | 64 | 15 | 0 | 30.4 | 08:45:10 | DMB |
| CICS142J | 91 | 59 | 14 | 1 | 19 | 50 | 54 | 0 | 19.4 | 08:50:30 | Multiple Alerts |
| CICS152J | 0 | 0 | 0 | 0 | 0 | 0 | 0 | 0 | 22.4 | 08:50:30 | |
| CICS162J | 39 | 13 | 9 | 6 | 6 | 31 | 14 | 0 | 10.4 | 08:50:00 | |

F1=Help    F2=DOS    F4=Set History    F8=Cancel Alerts    F10=Exit

DISPLAY SCREEN

FIG. 2
PRIOR ART

```
              CICSPARS ALERT MONITOR INVOCATION  28 MAR 86  11:23:53
                                     Applid = CICSPARS  Sysid = CICS There are NO other alert monitors active in region CICS
         MXT set at  25      DL/I Threads set at 32

Enter Thresholds for Optional Values to be Monitored:

DSA-----------=> 75 % Used     DL/I Threads Used =)
OSCOR---------=> 75 % Used     DL/I DMB Pool -----)        % Used
Active Tasks--=> 0015          DL/I PSB Pool -----)        % Used
Suspended Tasks=> 0010         DL/I ENQ Pool -----)        % Used Enter Data Sample/Display Options:

Sample Interval  ==> 0080 Seconds (Default)
Display when   -----=> S (S = Sampled or T = Threshold exceeded)
Use GDDM?      -----=> N (Y = Yes or N = No for Graphic display)
Display Te inal =)   B214 = (DEFAULT)
Journal?   =   -----=> N (Y = Yes or N = No) Journal ID ---)  (enter ID)
3270 PC MSA;i -----=> Y (Y = Yes or N = No or G = PC Graphics)

PF1=HELP PF3=RETURN    ENTER=START  PF9=ACTIVE MONITORS      PF12=MENU  CLEAR=QUIT
ECP10361 - Use PF9 to review attributes of other active ALERT Monitors       0300
```

— DISPLAY SCREEN

FIG. 4

```
CICS       ALERT STATUS
APPLID  DSA OSCOR CURR SUSP THRD DMB PSB ENQ TRANS    LAST
         %   %   TASK TASK USED  %   %   %  /SEC  UPDATE  ALERT MESSAGE

System Characteristics
            Machine: 3270 PC Model 2, 4, or 6
   Control Program Release: 1.20, 1.21, or 1.22
              Version: Not Applicable
                Level: Not Applicable
              Display: 5272
   All Points Addressable: Yes
      Programmed Symbols: Yes
         Current Mode: PC Compatable Graphics
      Display Attributes: Not Applicable
         Voice Adaptor: Yes
                                                                    DISPLAY
                                                                    SCREEN

CONFIG  1HELP  2ON-OFF 3MAIN  4DEBUG  5     6    7    8    9    0EXIT
```

FIG. 5

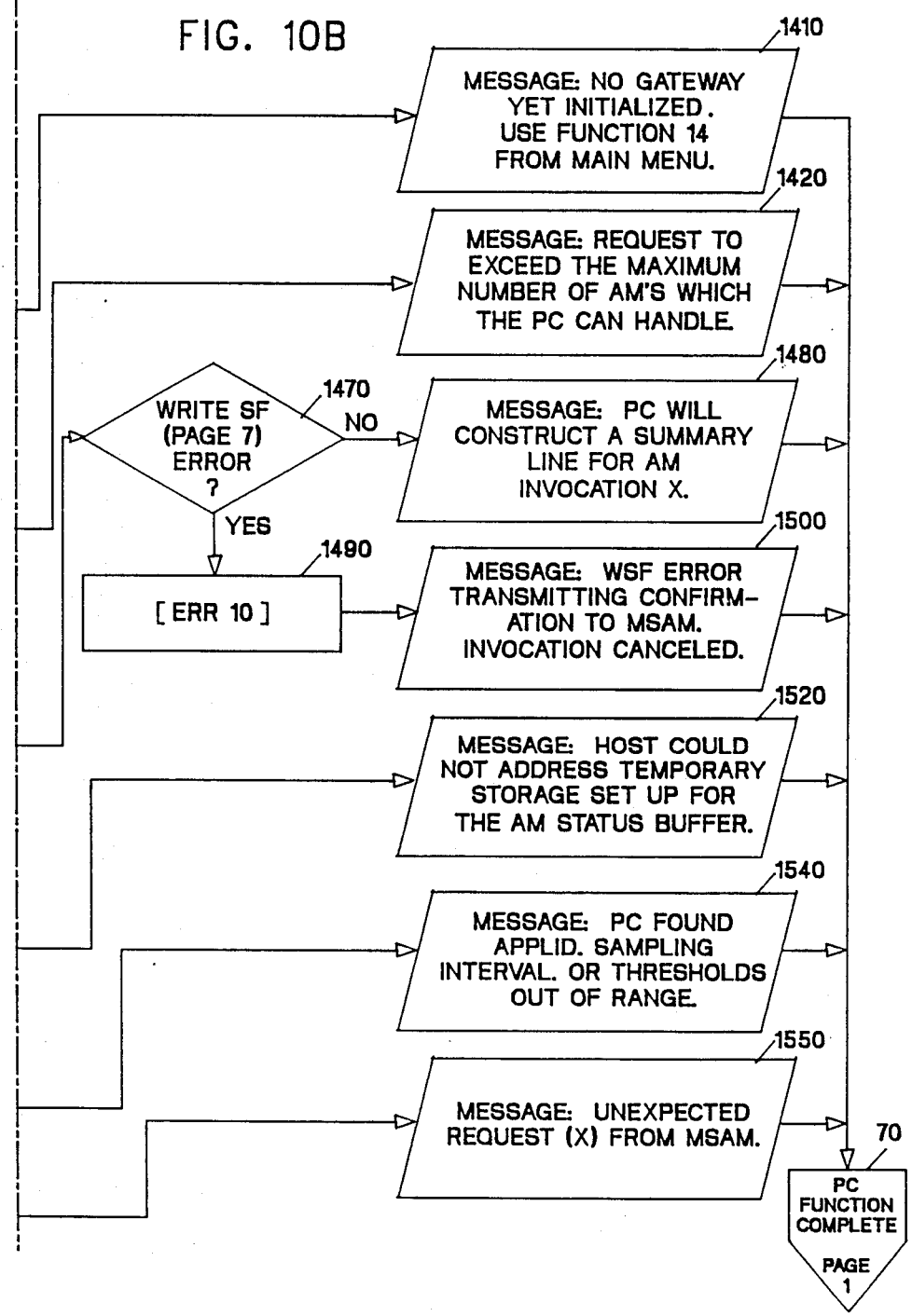

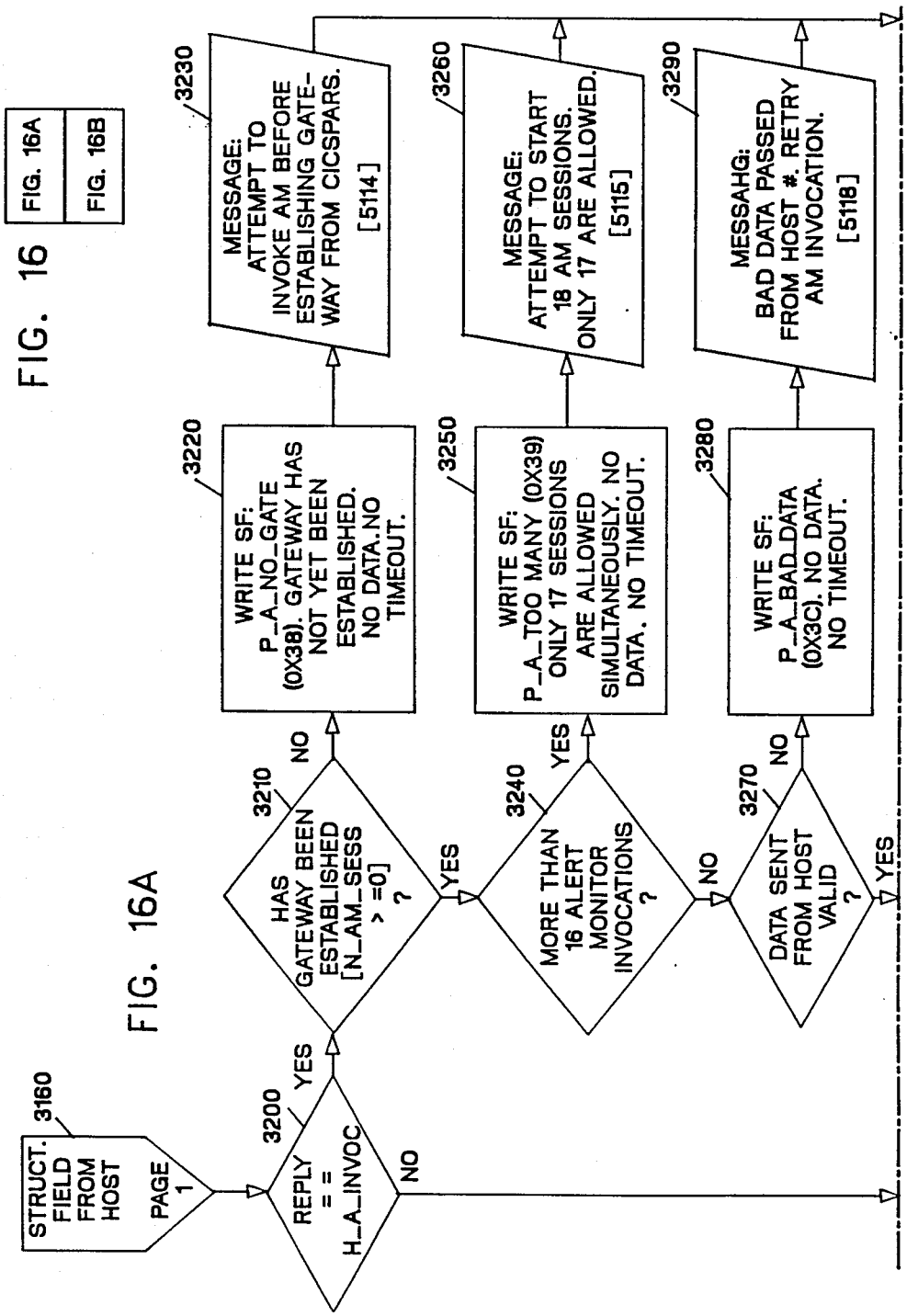

| FIG. 21A |
| FIG. 21B |

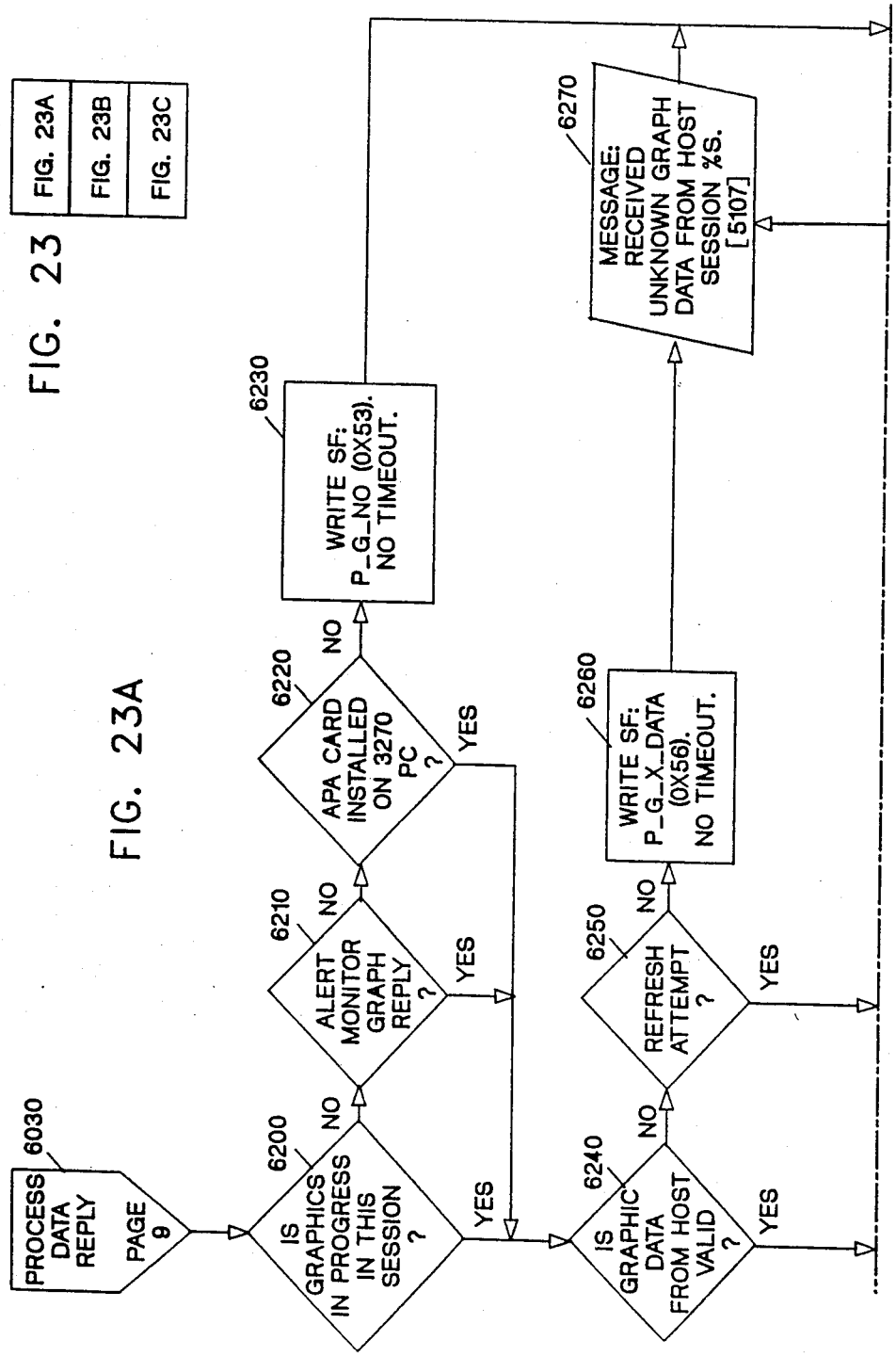

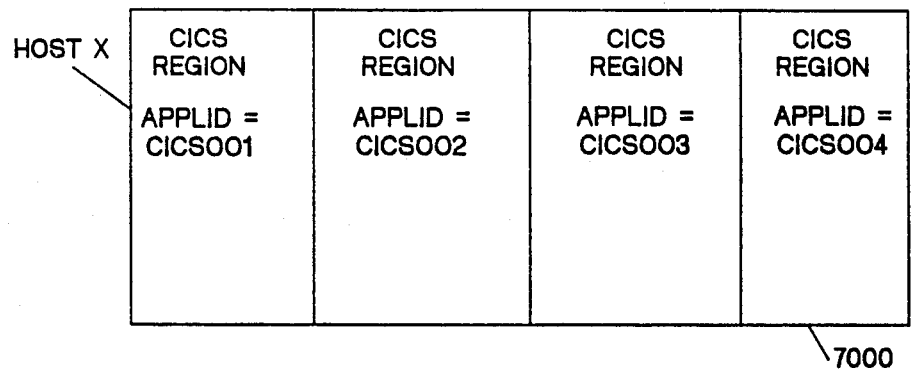
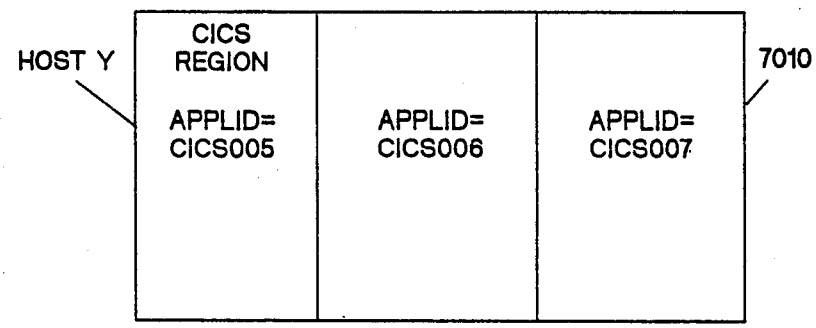
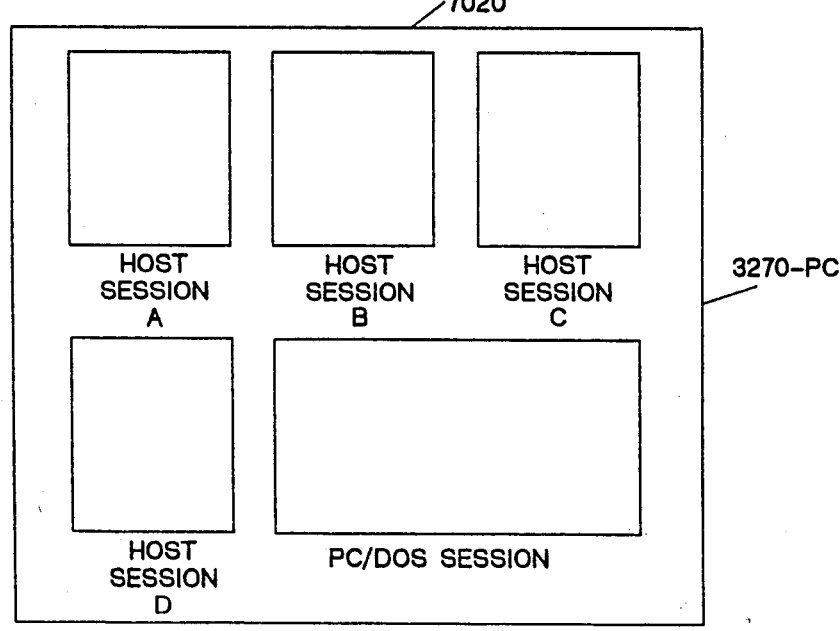
FIG. 24

OPERATOR ACCESS TO MONITORING APPLICATIONS

BACKGROUND OF THE INVENTION

1. Field of the Invention

The present invention is in the field of monitoring and alarm systems, and more particularly, the invention is directed to a display system which facilitates the display of status information which reflects the current status of multiple host based programs on a single display screen. The display system is called Multiple System Alert Monitor (MSAM).

2. Background of the Invention

Monitoring and alarm systems are required for a wide variety of applications ranging from simple mechanisms to rather complex processes. An example of a simple mechanism requiring a monitoring and alarm system would be a home heating system, and an example of a complex process also requiring a monitoring and alarm system would be a nuclear reactor.

Monitoring systems acquire information from a variety of sources. The information may come from sensors attached to devices measuring temperature and pressure, or they may come from another computer connected by a communications interface. An example of a monitoring system acquiring information from sensor information can be found in U.S. Pat. No. 4,588,987, to Stephens, issued May 13, 1986 and U.S. Pat. No. 4,471,348, to London et al., issued Sept. 11, 1984. These patents discuss techniques for acquiring sensor information from a plant environment, filtering the information and formatting it for display on a graphics display screen.

Monitoring systems for computer applications include the system described in U.S. Pat. No. 4,348,739, to Deaver et al., issued Sept. 7, 1982. The Deaver et al. system provides operator information on the characteristics of a data communication system. The information is displayed on a single terminal in the form of a table of summary information. The terminal is connected to the communication system and uses a handshaking protocol to obtain information. The information displayed is very important to the data processing staff because it provides management information for the communications network.

As monitoring capabilities evolved to more complex techniques, the ability to provide multiple virtual displays on a single display screen became necessary. An example of this type of processing is disclosed in the aforementioned patent to London et al. The system disclosed in the London et al. patent assigns each virtual display information for its own use. The information for each of the virtual displays is obtained and formatted for display on the separate sections of the display screen assigned to each of the virtual displays. With the advent of color displays, monitoring packages began to use color graphics to accentuate trends and alarm situations to assist the operator in determining where the problem occurred. An example of this approach is illustrated in U.S. Pat. No. 4,375,079, to Ricketts et al., issued Feb. 22, 1983. This patent describes the IBM 3279 color display and how it can be utilized to display color graphics. The color graphics include bar charts, pie charts and line graphs.

One system operation that can be monitored with this system is the IBM Customer Information Control System (CICS). This system manages a network of terminals and other communications devices attached to a host processor. A description of the operation of this system can be found in the Customer Information Control System/Virtual Storage (CICS/VS) General Information Manual, GC33-0155-1 published by International Business Machines Corporation. Due to the complexity of CICS, there are a number of monitoring programs that support the tuning and management of the system. The IBM Network Performance Monitor (NPM) aids network support personnel in managing the performance and growth of communications networks. A description of NPM can be found in the Network Performance Monitor General Information Manual, GH20-6539 published by International Business Machines Corporation. CICS Performance Analysis Reporting System (CICS/PARS) provides online display capabilities, system alert monitoring functions, problem determination aids and extensive batch reporting and analysis capabilities. A description of CICS/PARS can be found in CICS/OS/VS Performance Analysis Reporting System/MVS General Information System, GH20-6836-0 published by International Business Machines Corporation.

Today, with the proliferation of personal computers (PCs), systems are taking advantage of the user acceptance of PCs for performing functions locally to offload host processes. PCs are often attached to a host processor to monitor and collect information and to display the information on a locally attached graphics device and printer. An example of this approach is found in Sharman, "Multi-Thread Host Server For PC Support", *IBM Technical Disclosure Bulletin*, Vol. 28, No. 9, Feb. 1986. Sharman discloses a technique for using PCs in a CICS environment. The PCs are used as local file, print and message servicers. Rather than print a report on a remote host printer, each user employing the disclosed technique has the capability of locally printing a report, storing a host file and interacting with a CICS application.

Another pertinent example of such a monitoring application residing on a PC is discussed by Gallant, "Outspoken Micros Keep Support Center Humming", *Computerworld*, Apr. 8, 1985, at page 1, col. 1. Gallant's article discusses a PC based CICS monitoring system. The PCs are tied into four major on-line CICS applications that impact most of the company's 1200 employees. The PCs use a voice synthesizer to announce alerts while simultaneously calculating response times, maintaining history information and charting the results for tracking service.

The problem with even the most advanced of these systems is the inability to display information from multiple host applications on a single display screen. A significant amount of time is spent by the operator moving from one monitoring application to another trying to identify specific problems. The issue is further compounded when there are multiple copies of CICS running on a single processor.

SUMMARY OF THE INVENTION

It is therefore an object of the present invention to provide a monitoring system that concurrently monitors multiple host applications and displays the information on a single display screen.

It is a further object of the invention to provide a monitoring system that summarizes the information from host monitoring applications and displays the information on a single display screen.

It is another object of the invention to rely upon the graphics and multi-tasking capabilities of a microprocessor system with a host communication interface, such as the IBM 3270-PC, to communicate with multiple host monitoring applications and display summary information in the form of tabular reports, graphs and other status information.

It is yet another object of the invention to employ the microprocessor system speaker to emit an audible tone of varying frequency and duration for indicating the attainment of user definable thresholds.

It is still another object of the invention to automatically translate the monitoring and alarm messages from host applications into voice messages to alert the operator to a specific problem.

According to the invention, these objects are accomplished by providing a computer program MSAM which runs on a microprocessor system with a host communications interface such as an IBM 3270-PC. MSAM is a single program which gathers information from multiple CICS host regions and displays the information on a single display screen. The information includes graphics, reports, monitoring and alarm information. The display screens that the user is presented with are in a format that correspond to the host display screens that are commonly employed in large data processing (DP) centers today.

MSAM reduces the overhead of the communications between the microprocessor and the host by employing a structured data stream that eliminates the need to pass large amounts of information. The microprocessor receives existing, summarized information and reduces the information to a complete, accurate picture of the multiple applications that enables the operator to have timely information and respond effectively in a complex DP environment.

The alarm information is organized to effectively call the operator's attention to the key problem quickly and efficiently. Key alarm messages can be designated as voice messages which are automatically translated and output as synthesized voice alerts. Threshold conditions can be called to the operator's attention by specifying tolerances, that once achieved, trigger an electronic tone of designated duration and frequency.

BRIEF DESCRIPTION OF THE DRAWINGS

The foregoing and other objects, aspects and advantages of the invention will be better understood from the following detailed description of a preferred embodiment with reference to the drawings, in which:

FIG. 1 is a screen print showing an example of a CICS/PARS alert monitor display;

FIG. 2 is a screen print showing an example of an NPM display alert message;

FIG. 4 is a screen print showing the alert monitor invocation screen;

FIG. 5 is a screen print showing the initial system configuration screen;

FIGS. 24 to 36 are screen prints showing the sample session screens; and

DETAILED DESCRIPTION OF THE PREFERRED EMBODIMENT OF THE INVENTION

MSAM HARDWARE/SOFTWARE ENVIRONMENT

Figure 3:
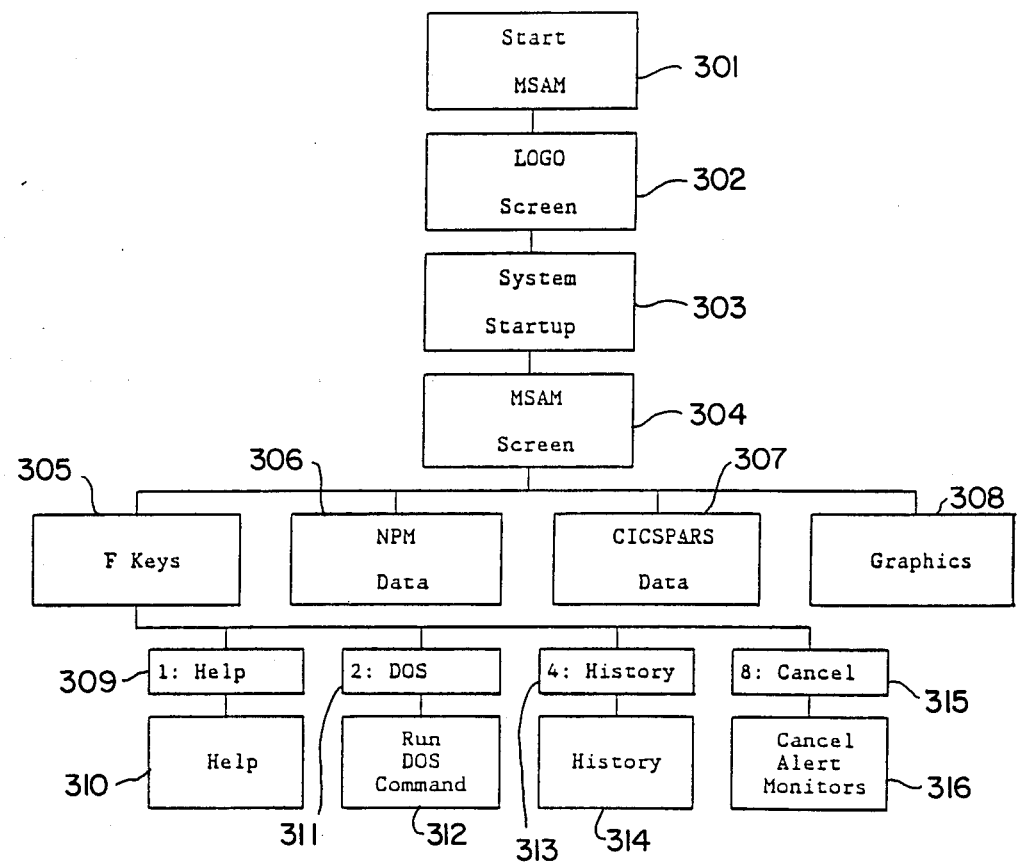
FIG. 3 is the functional organizational chart of the system according to the present invention.

The disclosed invention is described using an IBM 3270-PC; however, one of ordinary skill in the art will recognize that any microprocessor that has the capability of communicating with a host computer could be substituted for the IBM 3270-PC. The Multiple System Alert Monitor (MSAM) relies upon many standard IBM products to provide the advanced monitoring capabilities. These products include the Personal Computer (PC)/Disk Operating System (DOS). PC/DOS acts as the operating system for the IBM 3270-PC. The IBM 3270-PC is an IBM product that provides cooperative processing between PC and host display programs. It combines the functions of a 3270 terminal with the flexibility of a PC. With one keyboard and one display, the user has access to a PC session and up to four host sessions. The user can press the JUMP key to move between the applications. The IBM 3270-PC allows the operator to divide the display into multiple windows of user-specified size. The windows can be distributed between multiple host sessions and a single DOS session. The host sessions are active at the same time; however, the user can only interact with one session at a time. This capability is important to allow multiple host sessions to be processed in the background as a single display is presented to guide the user to the key problems.

There are various models of the IBM 3270-Personal Computer(PC) with modular features. These features include additional memory, medium to high resolution monochrome and color graphics displays and a PC/Advanced Technology (PC/AT) version. Additional information describing the IBM 3270-PC is contained in the IBM 3270-Personal Computer Control Program User's Guide and Reference, SC23-0103 and the Introduction and Preinstallation Planning Guide, GA23-0179; both are published by International Business Machines Corporation.

The IBM 3270-PC Control Program is also used as a window and task manager for the IBM 3270-PC. This program interfaces between PC/DOS and the 3270-PC hardware to perform the functions of multiple 3270 displays. The IBM 3270-PC Control Program manages the keyboard and display to allow the user to interface with up to four host sessions and one PC session, one at a time. The control program also contains the Applications Programming Interface (API) which contains the support for the structured field communications. The structured field communications is used to support communications between MSAM and the HOST. This program is discussed in detail in the IBM 3270-PC Control Program Programming Guide, GA23-0221 published by International Business Machines Corporation. These products are used in conjunction with unique displaying, reporting, monitoring and alarming code to implement the invention on an IBM 3270-PC.

HOST SOFTWARE

The hosts that the application is monitoring are required to have some other IBM products. These include the Customer Information Control System (CICS). As mentioned earlier, CICS is a general purpose data communication monitor that reduces the effort necessary to implement terminal-oriented transaction applications. CICS is used around the world to enable applications ranging from payroll to inventory control to function interactively and handle a large number of displays. In a DP environment it is very important to manage CICS to allow users to enjoy quick response times to their inquiries in an interactive environment. Because of this need, CICS/Performance Analysis Reporting System (CICS/PARS) was created. This product aids network support personnel in managing the performance and growth of their CICS environment. CICS/PARS has a complete set of monitoring tools to allow a user at a host display to monitor a CICS application and create the reports necessary to track the performance of the application. One function of CICS/PARS is the alert monitor. The alert monitor allows thresholds for CICS system resources to be set and provides display capability to monitor these resources. FIG. 1 shows an example of a CICS/PARS alert monitor display. An additional feature of CICS/PARS is the graphical display of selected system resources using the IBM Graphical Data Display Manager (GDDM). GDDM provides fullscreen extended alphanumeric and graphic support for the IBM 3270 display family including the 3270-PC family of products. Application programs such as CICS/PARS call GDDM routines to create graphic displays. Details of the GDDM product are presented in the GDDM General Information Manual, GC33-0108 published by International Business Machines Incorporated. The graphical displays that CICS/PARS creates are displayable on any of the host sessions active on the IBM 3270-PC. A complete description of CICS/PARS is contained in the CICS/OS/VS Performance Analysis Reporting System User's Guide and Reference, SH20-6837.

If communications information for the host is desired, the host must have the Network Performance Monitor (NPM) installed. This product aids network support personnel in managing the performance and growth of their communications network by supplying on-line statistics to allow real-time analysis of a network. The functions that NPM supplies are similar to CICS/PARS except that they are concerned with communications networks. An operator can enter thresholds corresponding to network tolerances. Should a threshold be exceeded, a message is displayed which indicates the nature of the problem. An example of an NPM display message is shown at the top of FIG. 2. A complete description of NPM appears in the Network Performance Monitor User's Guide and Reference, SH20-6360.

MSAM APPLICATION ENVIRONMENT

The application program that enables the disclosed invention resides on the IBM 3270-PC and communicates with CICS/PARS and/or NPM to obtain status information on the host CICS applications and the host communications environment. CICS/PARS collects status information from the host applications and sends it to the 3270-PC application to be processed. The interface between CICS/PARS and the IBM 3270-PC application is a Structured Field Communication interface. Structured Field Communication allows an efficient and clean method of transmitting data between the host and the 3270-PC. The data is transferred in the structure specified depending on the one character TYPE field.

TYPE FIELD DESCRIPTION

The TYPE field is a one character indication which communicates which action has been taken by the source of the communication or should be taken by the destination of the communication. The TYPE field is limited to a single character because that character fits conveniently after the communications header byte to word align any data in the communication. Based on the type of communications, the TYPE field may be followed by a variable amount of data; although, some transactions have no data following the TYPE field.

The structures associated with TYPE fields have a letter prefix associated with the structure name that corresponds to the one byte values. The structure prefix for the TYPE values Hex 00 and Hex 7F MSAM to HOST communications is "P". The structure prefix for the TYPE values Hex 80 and Hex FF for HOST to MSAM communications is "H".

Each set of 16 TYPE codes correspond to a similar task. For example, 30-3F are the TYPE BYTES associated with the MSAM alert monitor function. In addition the TYPE codes associated with a 3270-PC MSAM function are separated by 80 hex from the host TYPE codes. Thus, BO-BF are the TYPE BYTES associated with the alert monitor function on the HOST. Similarly, 30-3F are the TYPE BYTES associated with the MSAM alert monitor function.

As much as possible, the data in the communications buffer is passed as short integers of two bytes. String data will be passed as single bytes of EBCDIC.

COMMUNICATIONS CHARACTERISTICS

The MSAM initiated communications transaction TYPE BYTES are defined below:

| | |
|---|---|
| Alert Monitor Gateway Startup (30–37) | |
| (1) Define P_A_BUSY (gateway session already in progress) | HEX 31 |
| Alert Monitor Invocation Group (38–3F) | |
| (1) Define P_A_NO_GATE (gateway session not yet established) | HEX 38 |
| (2) Define P_A_TOO_MANY (attempt to start more than 17 AM sessions) | HEX 39 |
| (3) Define P_A_GOOD_DATA (valid data received from HOST for starting summary line) | HEX 3B |
| (4) Define P_A_BAD_DATA (HOST has sent invalid start up data - no summary line) | HEX 3C |
| Alert Monitor Gateway Execution Group (40–4F) | |
| (1) Define P_A_READ (MSAM requests that HOST read AM Status Array | HEX 40 |

-continued

|  |  |
|---|---|
| to send to MSAM) | |
| (2) Define P_A_X_SESS | HEX 43 |
| (MSAM desires to delete a subset of AM invokes (see del_sess struct)) | |
| (3) Define P_A_X_ALL | HEX 44 |
| (MSAM desires to terminate all AM invokes) | |
| Graphic Data Group (50-5F) | |
| (1) Define P_G_PFKEY | HEX 52 |
| (MSAM is sending the user selected PF Key to the HOST) | |
| (2) Define P_G_NO | HEX 53 |
| (PC does not have an APA card) | |
| (3) Define P_G_BUSY | HEX 54 |
| (MSAM graphics session is currently in progress) | |
| (4) Define P_G_ERROR | HEX 55 |
| (A Virtual Device Interface (VDI) error is cancelling an MSAM graphics session) | |
| (5) Define P_G_X_DATA | HEX 56 |
| (MSAM received unexpected data - no graphics session) | |
| (6) Define P_G_REFRESH | HEX 57 |
| (MSAM requesting graphic data refresh) | |
| Error Handling Group (70-7F) | |
| (1) Define P_STOP_REQUEST | HEX 7F |
| (Sent in two cases: | |
|     (A) The Control Break Key is struck at any time when using MSAM (If control break is pressed from a graphics screen, the HOST should respond as if a quit (exit CICS/PARS) has been pressed. In a gateway session, the HOST should kill all active alert monitors and exit CICS/PARS.) | |
|     (B) PF10 is pressed from the MSAM Main Menu) | |

The following HOST initiated TYPE BYTES are defined:

The data that follows the different TYPE fields is described below:

| | |
|---|---|
| Alert Monitor Gateway Startup (B0-B7) | |
| (1) Define H_A_ALIVE | HEX B0 |
| (HOST is starting a gateway session - sends h_am_start) | |
| Alert Monitor Invocation Group (B8-BF) | |
| (1) Define H_A_INVOC | HEX B8 |
| (HOST is starting another alert monitor for MSAM summary lines) | |
| (2) Define H_A_GOOD_ID | HEX BA |
| (HOST has access to the AM Status Array) | |
| (3) Define H_A_BAD_ID | HEX BD |
| (HOST does not have access to the AM Status Array) | |
| Alert Monitor Gateway Execution Group (C0-CF) | |
| (1) Define H_A_GOOD_READ | HEX C0 |
| (HOST has data from AM Status Buffer to send to MSAM) | |
| (2) Define H_A_NO_DATA | HEX C1 |
| (No updates to AM Status Buffer since previous MSAM request) | |
| (3) Define H_A_X_ACK | HEX C3 |
| (HOST is confirming attempt to delete a subset of AM invokes) | |
| (4) Define H_A_X_ALL | HEX C4 |
| (HOST is confirming attempt to delete all AM invokes) | |
| Graphic Data Group (D0-DF) | |
| (1) Define H_G_DATA_REPLY | HEX D1 |
| (HOST is sending data to MSAM to display graphically) | |
| (2) Define H_G_PFKEY_ACK | HEX D2 |
| (Ack of a PF key sent to the HOST by MSAM) | |
| Error Handling Group (F0-FF) | |
| (1) Define H_STOP_REPLY | HEX FF |
| (Ack that MSAM is terminating) | |

Data For TYPE H_G_DATA_REPLY

| | |
|---|---|
| (1) Define BYE_GRAPH (Exit from alert monitor graph) | HEX 0000 |
| (2) Define ALT_GRAPH (Alert monitor graph) | HEX 0001 |
| (3) Define VSL_GRAPH (Low Virtual Storage graph) | HEX 0002 |
| (4) Define VSH_GRAPH (High Virtual Storage graph) | HEX 0003 |
| (5) Define DSA_GRAPH (Dynamic storage graph) | HEX 0004 |
| (6) Define HIS_GRAPH (DSA and OSCOR history graph) | HEX 0005 |
| (7) Define BYE_GR_VSE (Exit from alert monitor graph) | HEX 0010 |
| (8) Define ALT_GR_VSE (Alert monitor graph) | HEX 0011 |
| (9) Define VSL_GR_VSE (Low Virtual Storage graph) | HEX 0012 |
| (10) Define VSH_GR_VSE (High Virtual Storage graph) | HEX 0013 |
| (11) Define DSA_GR_VSE (Dynamic storage graph) | HEX 0014 |
| (12) Define HIS_GR_VSE (DSA and OSCOR history graph) | HEX 0015 |

Data following P_G_PFKEY (Function Key Pressed)

| | |
|---|---|
| (1) Define PF1 (PF1 key pressed on MSAM) | HEX 0100 |
| (2) Define PF2 (PF2 key pressed on MSAM) | HEX 0200 |
| (3) Define PF3 (PF3 key pressed on MSAM) | HEX 0300 |
| (4) Define PF4 (PF4 key pressed on MSAM) | HEX 0400 |
| (5) Define PF5 (PF5 key pressed on MSAM) | HEX 0500 |
| (6) Define PF6 (PF6 key pressed on MSAM) | HEX 0600 |
| (7) Define PF7 (PF7 key pressed on MSAM) | HEX 0700 |
| (8) Define PF8 (PF8 key pressed on MSAM) | HEX 0800 |
| (9) Define PF9 (PF9 key pressed on MSAM) | HEX 0900 |
| (10) Define PF10 (PF10 key pressed on MSAM) | HEX 0A00 |
| (11) Define PF11 (PF11 key pressed on MSAM) | HEX 0B00 |
| (12) Define PF12 (PF12 key pressed on MSAM) | HEX 0C00 |
| (13) Define H_PA1 (PA1 pressed on MSAM) | HEX 0D00 |
| (14) Define H_PA2 (PA2 pressed on MSAM) | HEX 0E00 |
| (15) Define H_PA3 (PA3 pressed on MSAM) | HEX 0F00 |
| (16) Define H_ENTER (Enter pressed on MSAM) | HEX 1000 |
| (17) Define H_CLEAR (ESC key pressed on MSAM - interpret as CLEAR on HOST) | HEX 1100 |

The different communications buffers and their structures are listed below to describe the traffic between MSAM and the HOST.

| NAME | SIZE(bytes) | DESCRIPTION |
|---|---|---|
| g_dsa | 44 | DSA Graph data |
| g_vsl | 58 | VSL Graph |
| g_vsh | 44 | VSH Graph |
| g_his | 840 | History Graph |
| h_alt | 162 | Alert Monitor Graph HOST |
| g_alt | 162 | Alert Monitor Graph MSAM |

STRUCTURE SIZES ASSOCIATED WITH THE Alert Monitor Function

| NAME | SIZE(bytes) | DESCRIPTION |
|---|---|---|
| h_sys_term_id | 14 | handshaking information |
| h_am_start | 32 | add a new summary line |
| p_am_start | 32 | h_am_start MSAM reformatted |
| h_a_rec | 22 | AM status array |
| p_a_rec | 24 | h_a_rec MSAM reformatted |
| h_a_array[ ] | 17*22 | AM is 17 (h_a_rec's) |
| p_a_array[ ] | 17*24 | AM status array MSAM |
| p_a_ctrl | 52 | record of the control array |
| p_ctrl[ ] | 17*52 | A p_a_ctrl for the 17 sess. |
| del_sess | 18 | delete sessions array |
| sf_fun | 6 | func. code to func. maps |
| time_out | 6 | structure of timeouts m. #s |
| t_o_values[ ] | 6*6 | array of type time_out |
| t_out | 10 | timeouts and time values |
| t_out[ ] | 6*10 | A t_out for each pending m. |

The following structure is passed from the HOST to MSAM at gateway initiation with the H_A_ALERT transmission. It is passed back with the P_A_GOOD_DATA at each alert invocation. The actual byte assignment is:

| | |
|---|---|
| 0-3 | sysid |
| 4-7 | termid |
| 8-9 | HOST index |
| 10-11 | MSAM slot number |
| 12-13 | Host operating system (FFFF is MVS, 0000 is VSE) |

The TYPE field plays a critical role in defining the communication's buffer to the HOST and to MSAM. The number of bytes of data is dependent on the value of the TYPE field. For example, if the TYPE field's value is hex 003A, there is no data and the communications buffer is interpreted to mean that the 3270-PC is requesting the host to send the start values for the status information. Alternatively, if the TYPE field's value is hex 0001, the 3270-PC interprets the data following the TYPE field to be an alert monitor graph.

SYSTEM INITIALIZATION

Referring now to the drawings and more particularly to FIG. 3, there is shown the organizational chart of the system according to the invention. When MSAM is invoked at 301 on an IBM 3270-PC, an initial logo display is presented at 302 to the user. The user presses the enter key to enter the system. When the system is initially started at 303, the user presses the JUMP key to select a host session. The user logs on to the CICS/PARS session that he desires to dedicate as a gateway between CICS/PARS and the 3270-PC. The 3270-PC screen dedicated to this function remains active until the last CICS/PARS alert monitor is cancelled.

Once the gateway session is established, the user presses the JUMP key to select a second host session. The user logs on to the first CICS session that he wishes to monitor and brings up the Alert Monitor Invocation screen shown in FIG. 4. The first time the system is started, the system configuration is presented to the user on the configuration screen shown in FIG. 5. The options are listed on the left side for the user's review. Characteristics that are reflected on this display include the model of IBM 3270-PC, the IBM 3270-PC Control Program Release Level, the type of IBM 3270-PC display, the existence of All Points Addressable and Programmed Symbols, and the mode of graphics supported. The configuration information on these displays are useful for product support because they provide configuration information that makes it easier to identify the problem the user is experiencing.

PROGRAM FUNCTIONAL OVERVIEW

The functions available to the user are indicated in the four boxes under the MAIN screen 304 in FIG. 3. These are the Function Key(Fkey) functions 305, the Network Performance Monitor (NPM) data functions 306, the CICS/PARS data functions 307 and the Graphics Functions 308. The function key functions 305, include: F1 describes the functions 309 of the other Fkeys at 310. F2 311 executes a DOS command 312 such as displaying a directory listing of your disk. F4 313 changes the level of the history collection 314 to increase or decrease the amount of information that is collected. As F5 is pressed, selections are rotated through Collect All Summary Lines to Collect Exceeded Thresholds Only to Collect No Summary Lines. F6 enters the Voice definition screen; and F8 315 cancels a CICS/PARS session 316.

NPM MONITORING

MSAM monitors NPM screens for the purpose of detecting an alert message from NPM. This removes the operator from the responsibility of monitoring one or more physically detached terminals for a NPM alert condition. To invoke NPM monitoring 306, the user must use one of the host sessions on the IBM 3270-PC to access NPM and set the threshold monitoring parameters. More information on these displays and their functions can be found in the Network Performance Monitor General Information Manual, GC33-6539 published by International Business Machines Corporation. The session used to set the thresholds must remain dedicated to NPM so that the presence of an alert message may be detected by MSAM.

Information from NPM is obtained through Screen Captures. Screen Capture allows MSAM to access the host screen images. MSAM processes NPM screens by distinguishing the screen of interest from the other screens, picking out the significant information from the screen and transforming the information into usable information. Since screen capture is used, no structures are needed for communication.

CICS/PARS MONITORING

The CICS/PARS data 307 display screen allows the user to view summary line descriptions of CICS system resources which are passed via a gateway link between the IBM 3270-PC and the CICS/PARS application residing on the host. This gateway session acts as the data channel for all system resource summary line information passing between the IBM 3270-PC and the CICS/PARS application. The actual communication is by means of a structured buffer described field. The structured field communication provides an efficient method of transmitting data between a host and an IBM 3270-PC. The data stream is reduced to the minimal amount of summary information and transferred from the host application to a buffer in MSAM. The user can select the applications and thresholds that he would like to monitor. A summary line is built for each CICS application that is designated for monitoring. The information that can be displayed for each CICS application includes:

(1) (DSA)%—the percent of dynamic storage utilization.
(2) (OSCOR)%—the percent of Operating System Memory that is being used.
(3) (CURR TASK)—the number of active tasks.
(4) (SUSP TASK)—the number of suspended tasks.
(5) THRD USED—the number of threads used if a data base manager is being used.
(6) DMB%—The percentage utilization of the Data Management Block subpool if a data base manager is being used.
(7) PSB%—The percentage utilization of the Program Specification Block subpool if a database manager is being used.
(8) ENQ%—The percentage utilization of the enque subpool if a data base manager is being used.
(9) Trans/Sec—The number of transactions per second in the previous interval.
(10) Last Update—Time that the corresponding session last reported.
(11) Alert Message—Short message field describing the alert condition.

The summary lines indicate various alarm situations by displaying the messages in various colors. Red means that a critical threshold has been exceeded, and yellow means that a warning threshold has been exceeded. In addition to using color to highlight alarm situations or emit a tone of user designated frequency, and key messages can be annunciated through a voice synthesizer. If information from an application becomes tardy due to a communications error, the last update time turns red to call the situation to the attention of the user.

Figure 6:
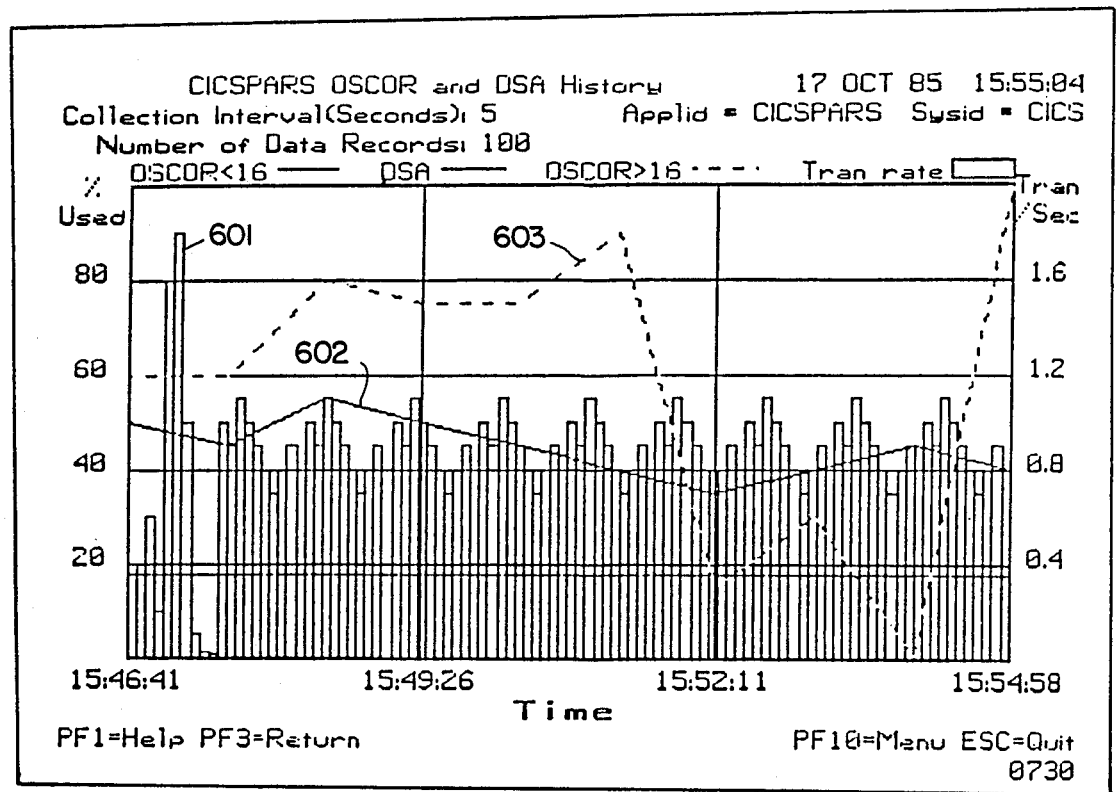
FIG. 6 is a screen print showing an example of a MSAM graphics screen.

The final function indicated in FIG. 3 is the graphics function 308. The graphics function 308 includes the capability of emulating all of the summary and graphical reports that CICS/PARS provides using four color medium resolution PC graphics. One of the advantages of using the IBM 3270-PC is the capability of off-loading the host from the burden of formatting and displaying graphics. The graphical displays include bar charts, pie charts and trends. An example of the graphics capability is shown in FIG. 6. In FIG. 6, the transaction rate is tracked over time by the individual vertical bars 601. The percentage of dynamic storage that is currently utilized is tracked over time by the solid line 602. The percentage of operating system core is tracked over time by the dashed line 603. The actual time is indicated beneath each of the vertical divisions. The particular application and system are indicated in the top right-hand corner. This display portrays the usefulness of graphics in condensing information for quick reference by an operator.

PSEUDO-CODE OF OVERALL SYSTEM OPERATION

The pseudo-code below presents the high-level flow of MSAM. The main loop that is activated until the user exits initially checks to see if a function key is pressed and handles the function that the key represents. Then, if NPM is active, the NPM host screen is processed and the portion of the MSAM display requiring update is updated with any new alarm messages from NPM. Then, depending on the type of communications buffer received, the appropriate processing of the communications buffer takes place. If data is received, then a graph is drawn. If alert information is received, then the alert information is processed and the information updated on the display. The loop is then repeated until the EXIT key is pressed. This discussion is only intended to set the stage for the more detailed discussion of the flowcharts.

```
do while (exit = FALSE)
    if (user presses a F key)
        process F key
    endif
    for (all sessions)
        if (NPM monitoring is active and
            session = NPM)
            process NPM screen
            update NPM portion of MSAM S
        endif
        if (received structured field =
            GRAPHICS)
            process graphics data
            draw graph
        endif
        if (received structured field =
            ALERT)
            process structured field
            update CICS portion of MSAM S
        endif
    next session
endwhile
```

DISCUSSION OF THE FLOWCHARTS

Referring now to FIGS. 7 to 23, there is an important distinction to note between the two sets of flowcharts. FIGS. 7 to 13 pertain to the host processing that must transpire to interface to MSAM, and FIGS. 14 to 23 explicitly define the logic resident on the IBM 3270-PC to enable MSAM. The HOST side of application is actually an addition to CICS/PARS, discussed above.

MSAM HOST PROCESSING (CICS/PARS)

Figure 7:
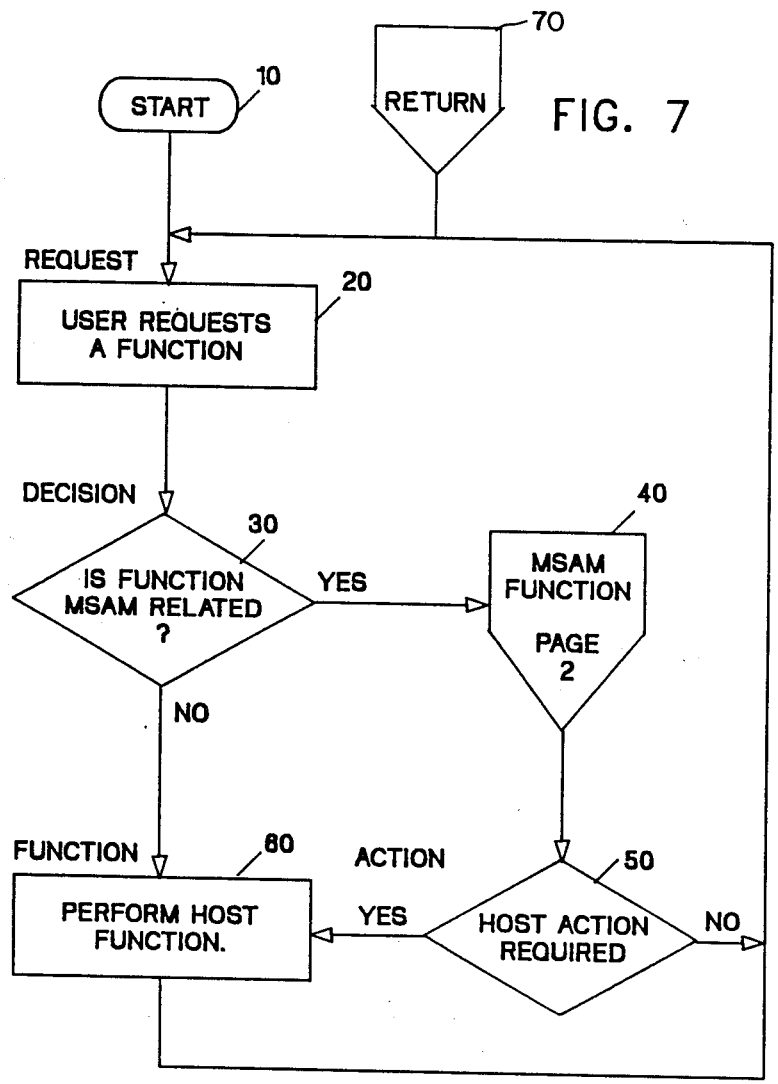
FIGS. 7 to 23 are the detailed flowcharts of the HOST & PC logic of the invention.

Referring now to FIG. 7, control enters at 10 where a continuous loop is presented. The loop consists of carrying out two basic sets of functions, HOST and MSAM functions. As indicated at function block 20, the user requests a function by entering information in the form of text or more often by pressing a function key. With MSAM, a function key request may be serviced by a structured field. This happens when the user presses a function key on an MSAM graphics display. The program next determines the type of function that was requested at decision block 30. If the function is a MSAM function, then processing is done at branch label 40 and a decision is made at decision block 50 to determine if additional HOST processing is required. If it is, a HOST function or additional HOST processing must be done to a MSAM function, then processing is done at function block 60. The MSAM related functions include establishing a gateway with MSAM, processing MSAM's alert monitor display, graphic displays, history display, and two virtual storage displays. A return label at 70 is also provided for returns to the main processing loop from any ancillary function processing.

Figures 8, 8A:
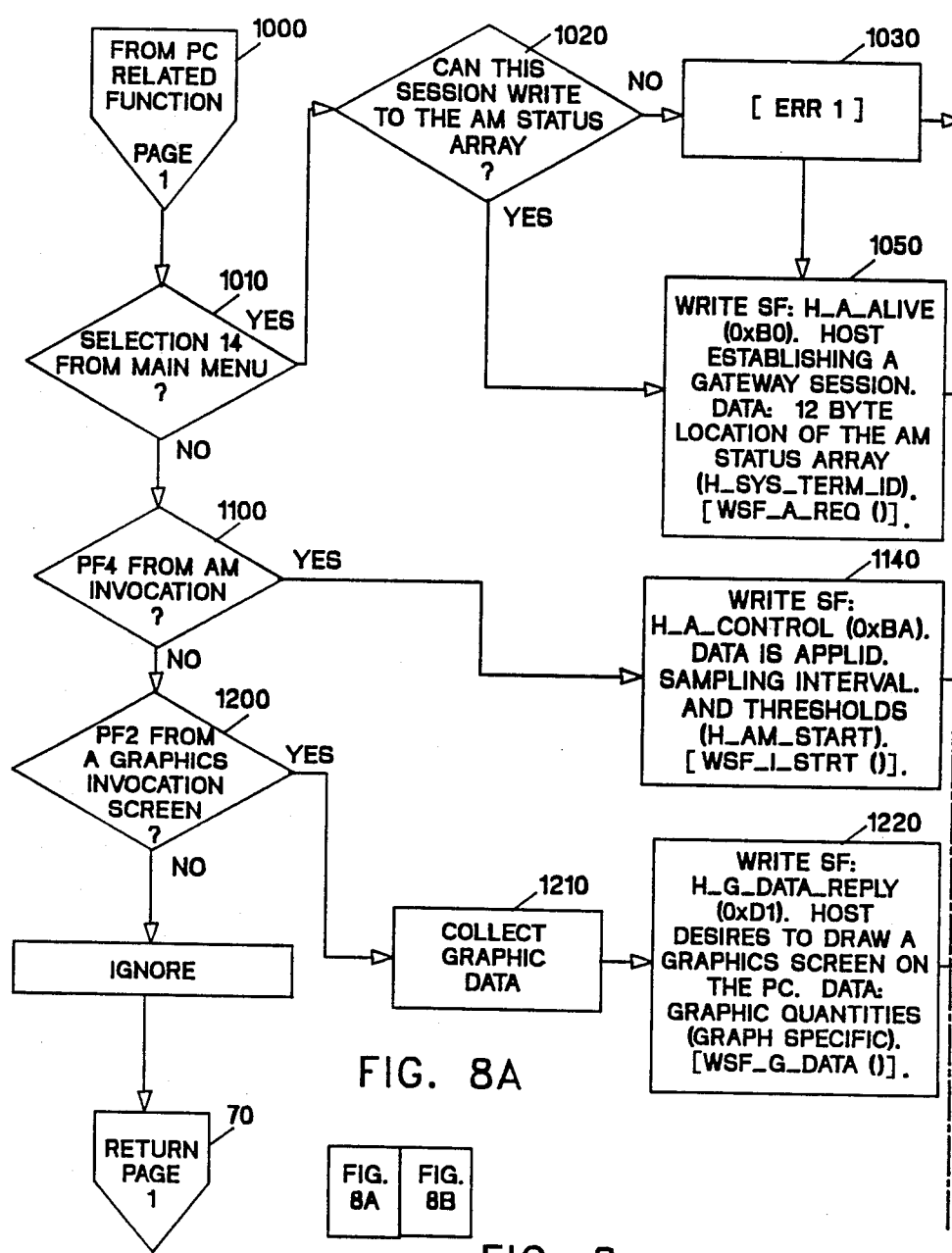
Figure 8B:
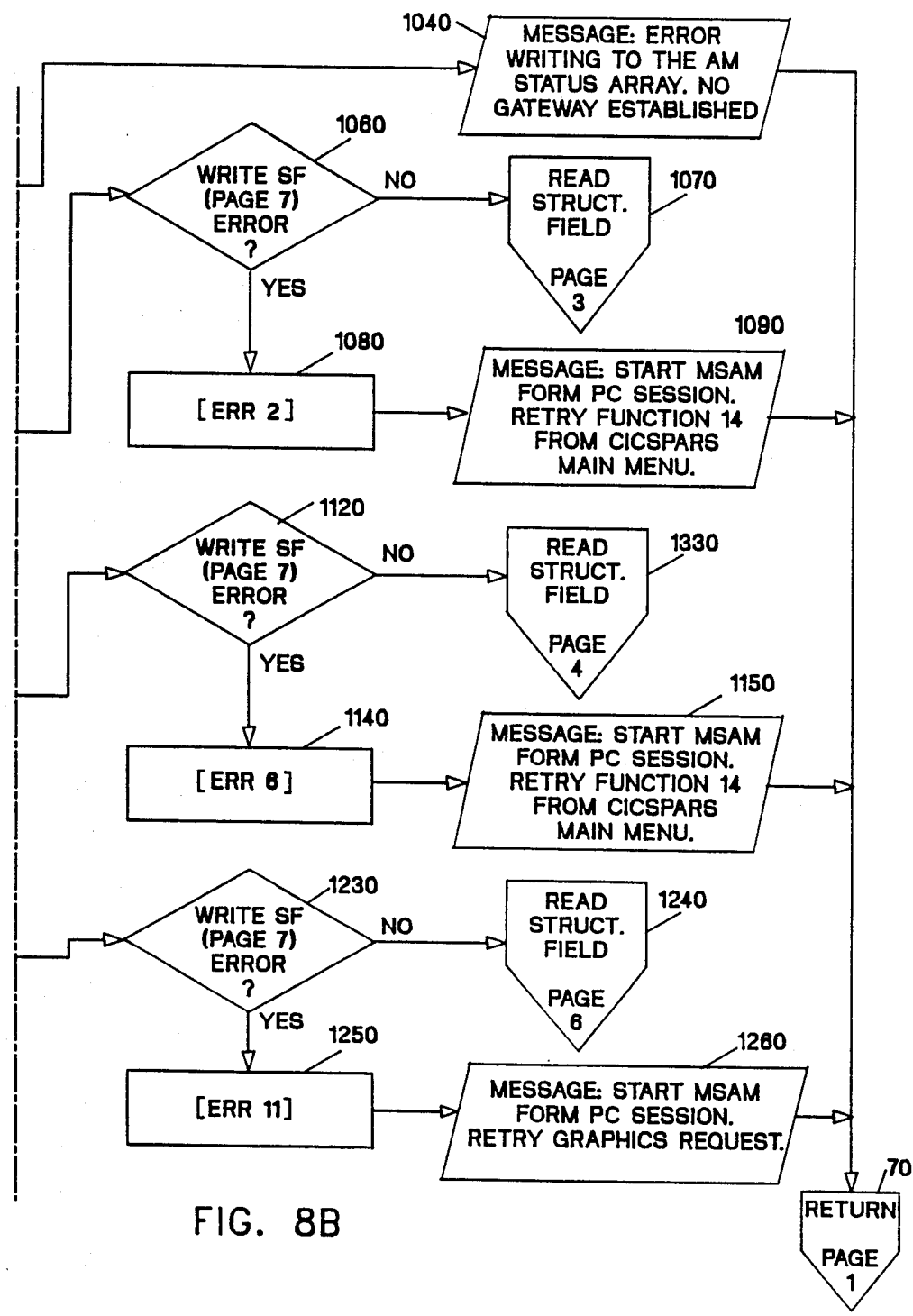

In FIGS. 8A and 8B, the HOST processing of various MSAM related requests is presented. Control enters at branch label 1000 from the main loop in FIG. 7. In decision block 1010, the program checks to see if the user is attempting to start up the HOST gateway between MSAM and the gateway CICS session. If the user is trying to start the gateway, then a second test is performed at decision block 1020 to determine if this session can write to the Alert Monitor Status Array (AMSA). If CICS/PARS cannot write to the AMSA, then an error message is formatted at function block 1030 and written onto the display at output block 1040 informing the user that the gateway cannot be established. If CICS/PARS can write to the AMSA at decision block 1020, then the application writes a twelve byte data string of TYPE H_A_ALIVE (Hex B0) that informs the MSAM application that the Host is establishing a gateway session. The data string contains the location of the AMSA is passed back to MSAM. MSAM is responsible for informing other sessions of the locations of the AMSA. If an error is detected at decision block 1060, then an error message is formatted at function block 1080 and written onto the display at output block 1090. The message prompts the user to start MSAM on the PC and then retry the invocation of the gateway session. After the message is written control passes back to the main loop at 70. If no error is detected at decision block 1060, then control is passed to 1070 in FIG. 9 to wait for the receipt of a structured field message from MSAM. Decision block 1075 performs the test for receipt of the MSAM communications and passes control to decision block 1300 when the communications is received. Depending on the TYPE of communications, the wait may be relatively short, as in the case of a status message, or long, as in the case of a request to read the statuses of a CICS application.

If the user did not request the gateway to be started, then a test is made to see if the user pressed function key four at decision block 1100 in FIG. 8A to start the alert monitor in the mode where summary lines are written to the AMSA. If function key four was pressed, then the application writes a thirty-two byte data string of TYPE H_A_INVOK (Hex B8+Application Identification+Sampling Interval) 1110 that informs the MSAM application of the characteristics of the CICS session to be monitored. If an error is not detected at decision block 1120, then the application passes control to the branch label at 1330 to wait for the receipt of a structured field message from MSAM. If an error is detected at decision block 1120, then the error message is formatted at function block 1140 and presented to the user at output block 1150. The message prompts the user to start MSAM from the PC and to restart the gateway from the CICS/PARS Main Menu. After the user is prompted, control passes back to the main loop at branch label 70.

If the user did not request the alert monitor to be started, then a test is made to see if the user pressed function key F2 at decision block 1200 to see if the user wanted to generate a graph on MSAM. If function key two was pressed, then the application collects the raw resource information used to plot the graph and sends it to MSAM in a 780 byte communications transaction of TYPE H_G_DATA_REPLY (Hex D1). If an error is not detected at decision block 1230, then the application passes control to the branch label at 1240 to wait for the structured field message from MSAM. If an error is detected at decision block 1230, then the error message is formatted at function block 1250 and presented to the user at output block 1260. The message prompts the user to start MSAM from the PC and to retry the Graphic request from MSAM. After the user is prompted, control passes back to the main loop at branch label 70.

If none of the MSAM requests of the host was received, then control is passed back to the main processing loop in FIG. 7 at branch label 70.

Figure 9:
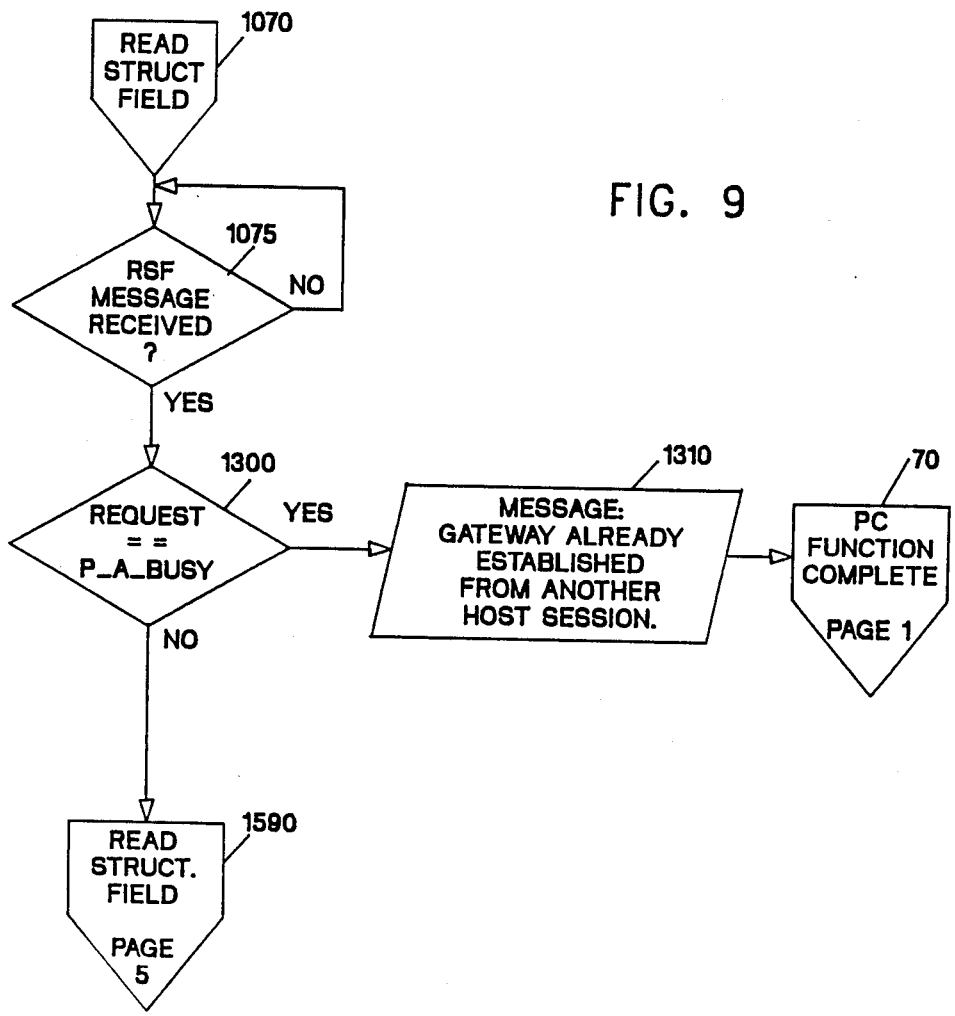

In FIG. 9, the logic is presented to process a read structured field request after initializing the gateway.

The branch to this logic at 1070 is from FIG. 8B where the gateway was initialized at 1060. When a structured field is received from MSAM, control enters at branch label 1070 and immediately flows to decision block 1300 which performs a test to see if the TYPE byte of the structured field is a P_A_Busy (Hex 31), indicating that a gateway session already exists then a message is displayed indicating the situation at output block 1310 and control returns to the main loop processing at branch label 70. If the TYPE byte is not a P_A_BUSY, then control is passed to branch label 1590 in FIG. 11 for processing of the gateway during execution.

Figures 10, 10A:
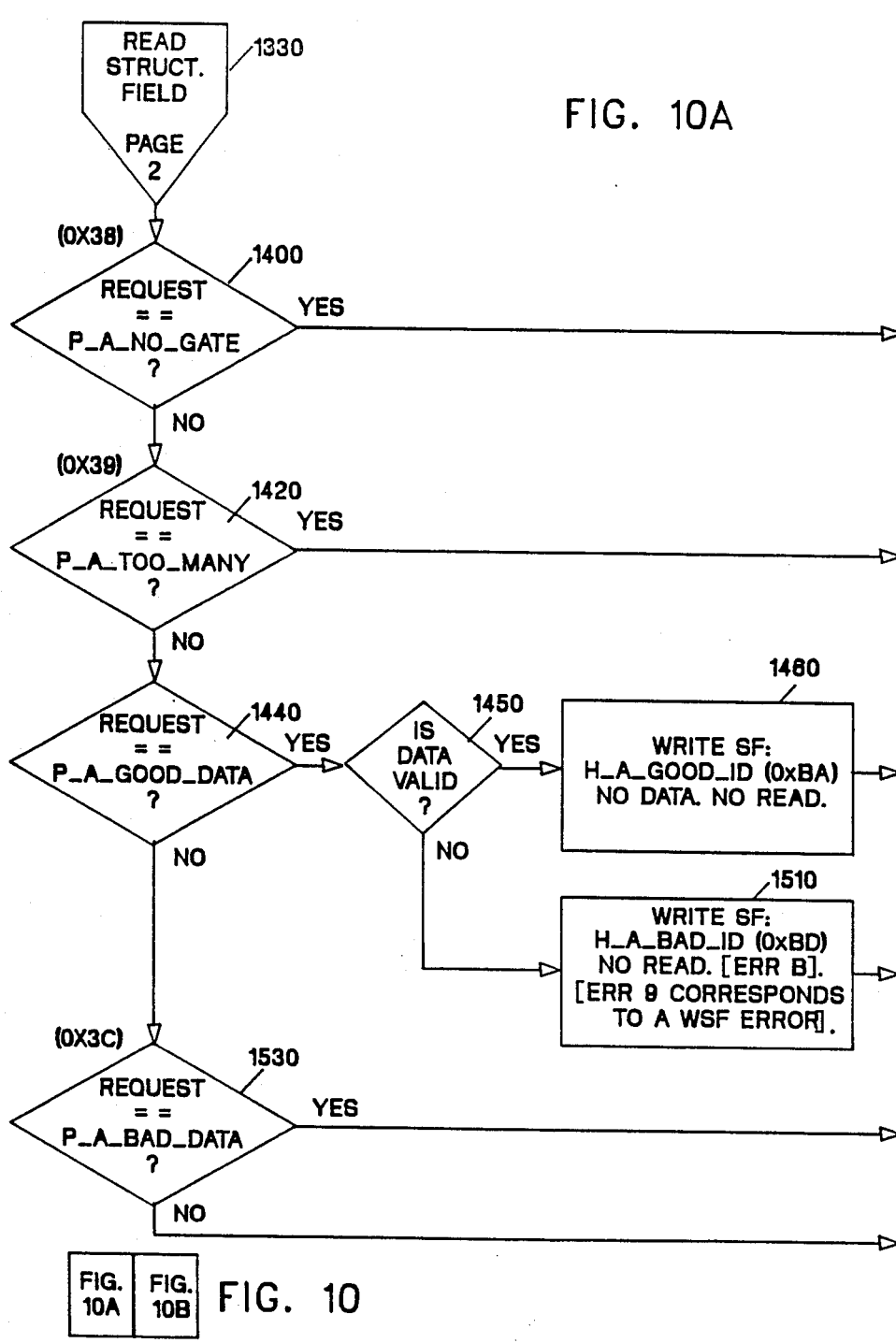
Figures 11, 11A:
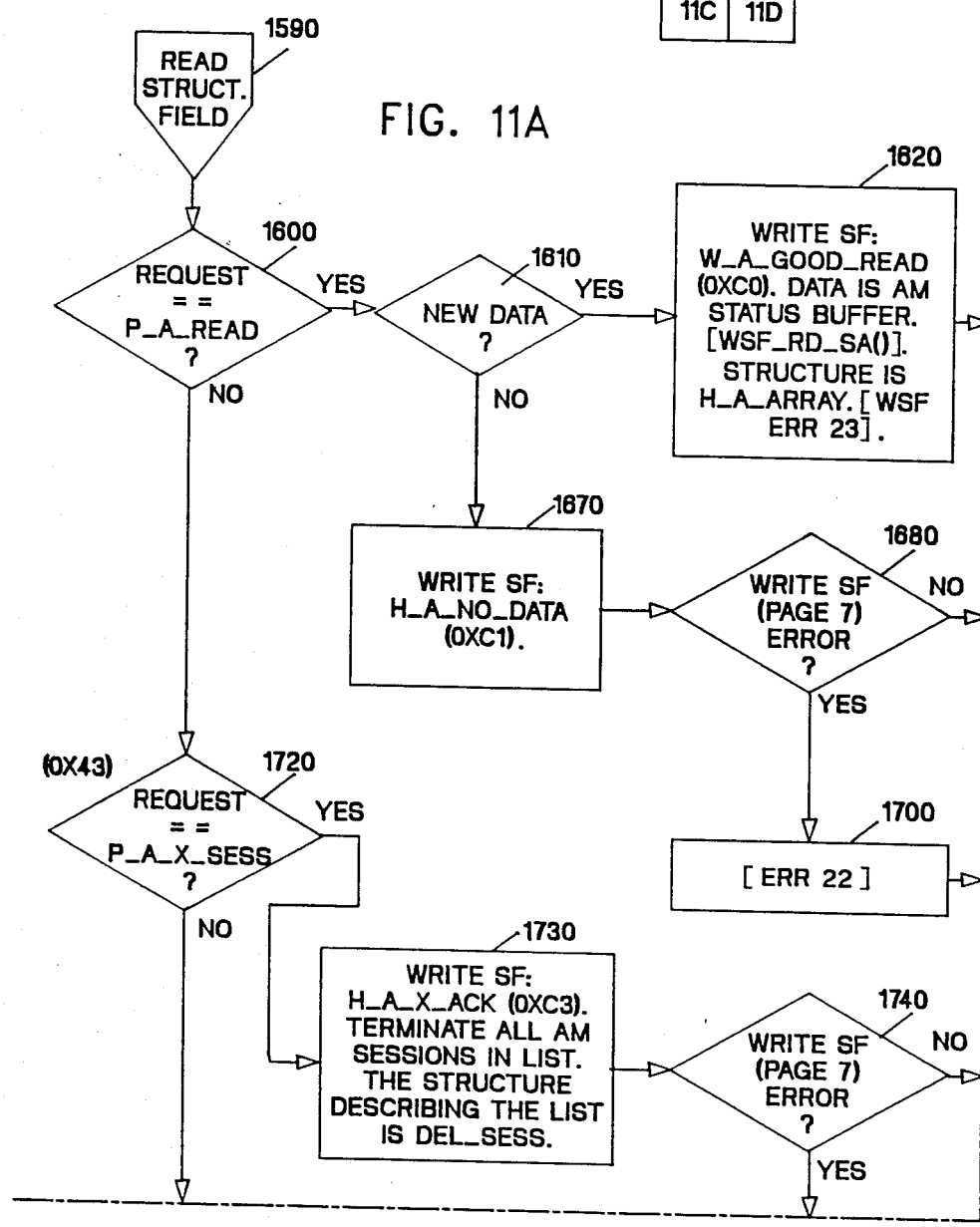
Figure 11B:
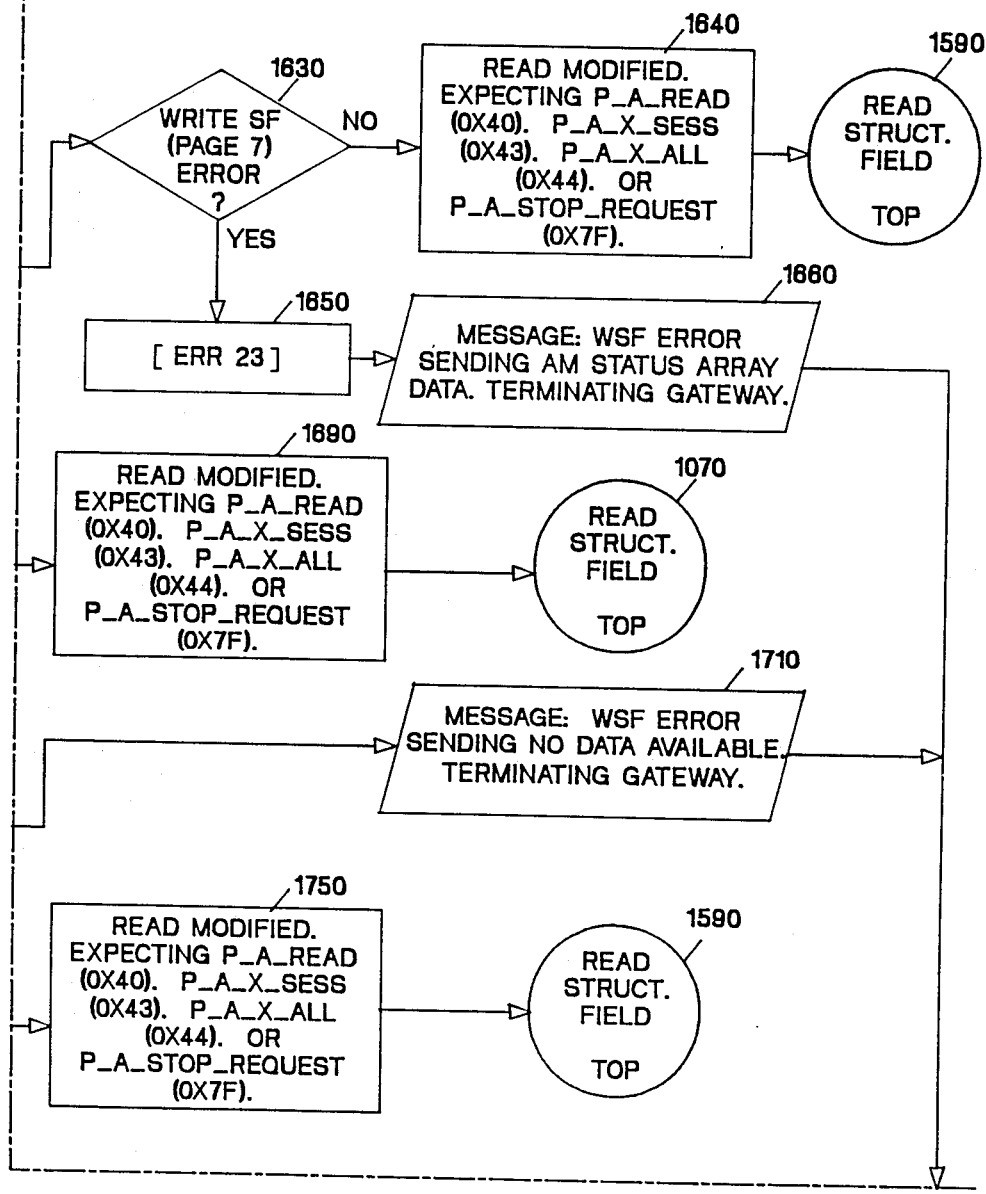
Figure 11C:
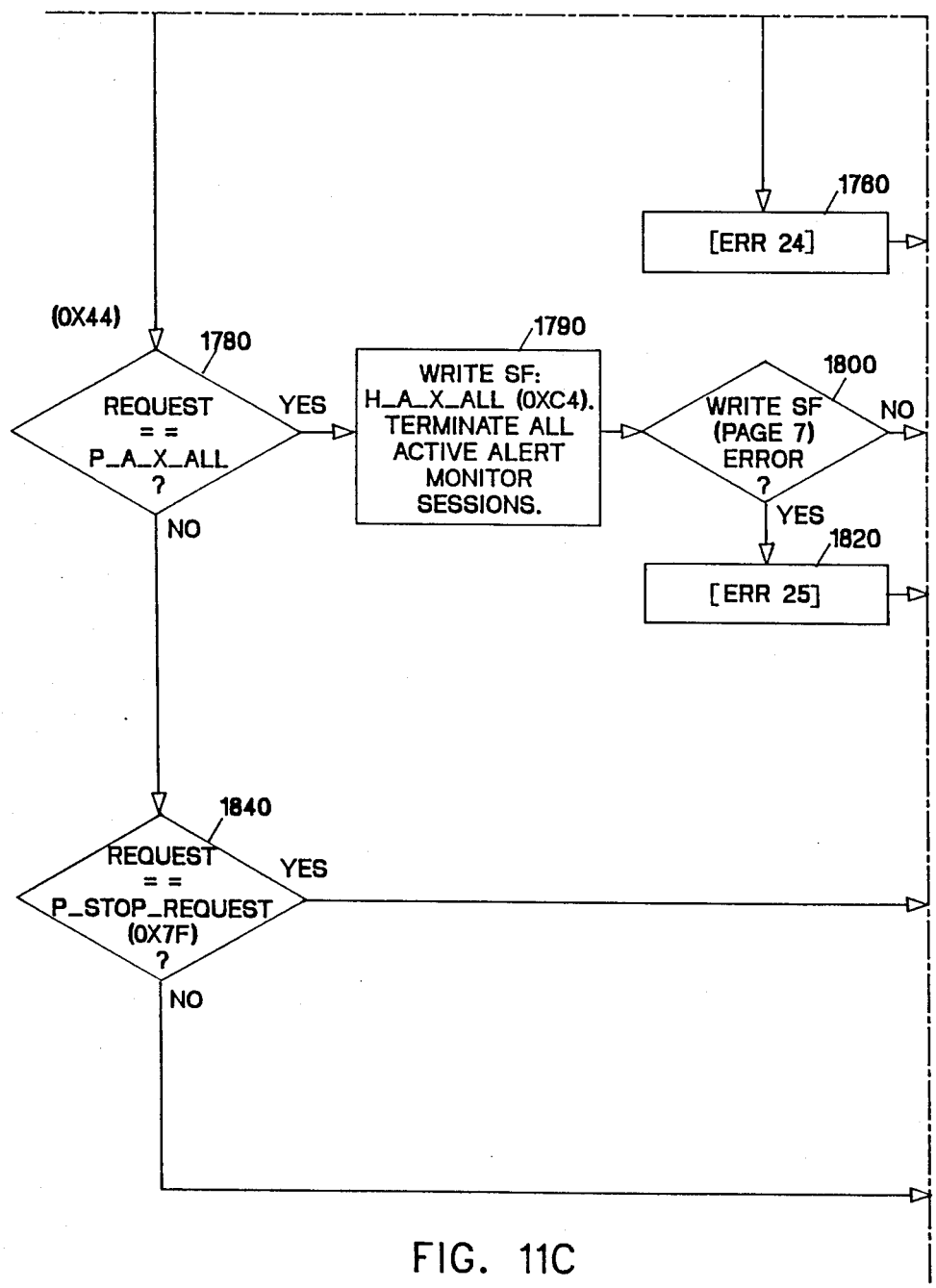
Figure 11D:
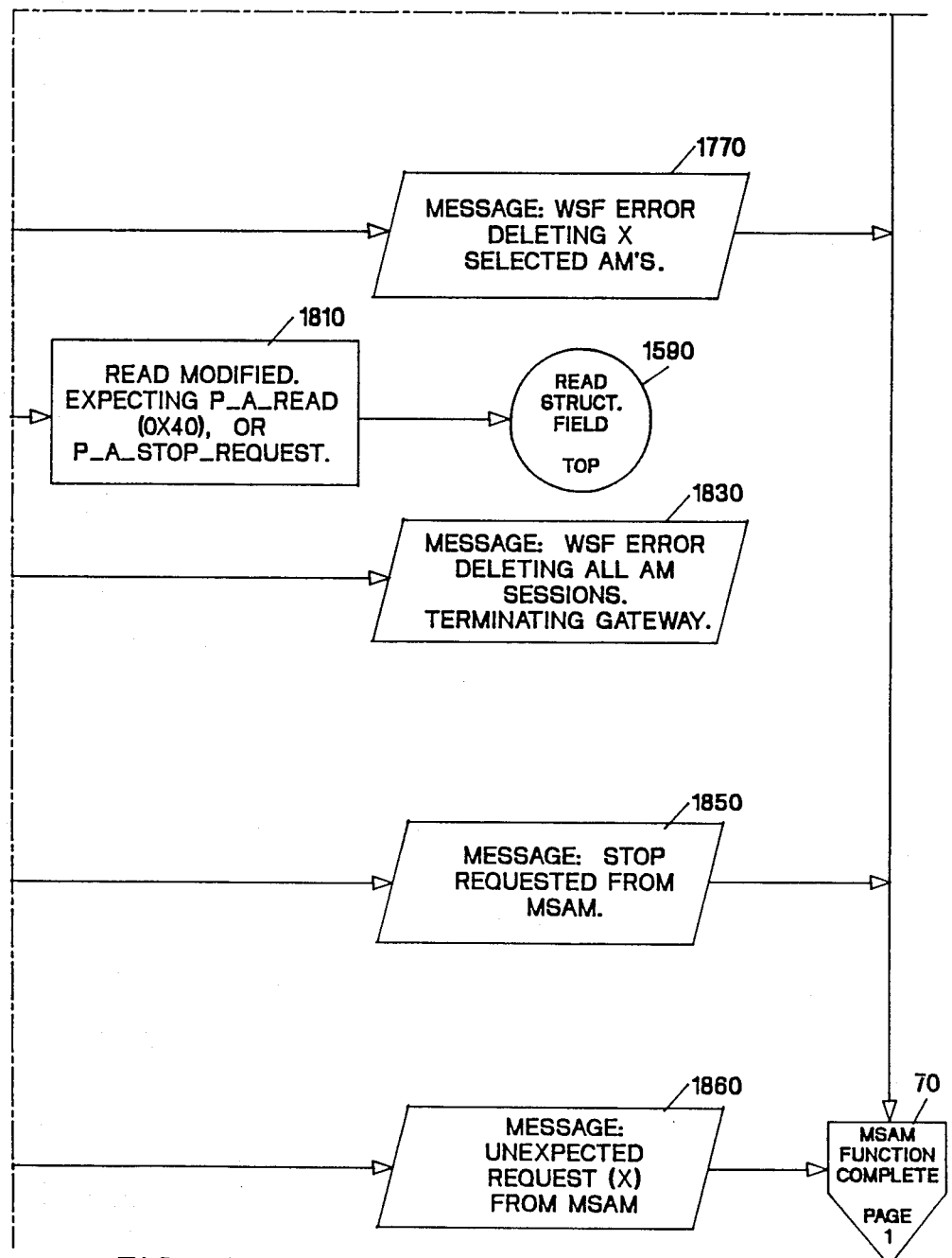

In FIGS. 10A and 10B, the logic is presented to process a read structured field request after initializing the alert monitor. The branch to this logic at 1330 is from FIG. 8B where the gateway was initialized at 1120. When a structured field is received from MSAM, control enters at branch label 1330 and immediately flows to decision block 1400 where a test is performed to determine if the TYPE byte of the structured field is a P_A_NO_GATE (Hex 38), indicating that no gateway session has been initiated. If it is, a message is displayed indicating the situation at output block 1410 and control returns to the main loop at branch label 70 in FIG. 7.

If the TYPE byte of the structured field is a P_A_TOO_MANY (Hex 39), which indicates that an attempt has been made to exceed the maximum number of allowable alert monitors at decision block 1420, then a message is displayed at output block 1430 to indicate to the user that the action can not be taken and control is returned to the main processing loop at branch label 70.

If the TYPE byte of the structured field is a P_A_GOOD_DATA (hex 3B) at decision block 1440, which indicates that MSAM was able to interpret the H_A_INVOC array at function block 1140 of FIG. 8, then the host validates the H_SYS_TERMID, which is passed with the P_A_GOOD_DATA string at function block 1050 of FIG. 8B. The data is valid if the host can read and write to the AMSA. If the area can be read from and written to, then the data is assumed valid. If the data is valid, then a TYPE H_A_GOOD_ID (Hex BA) is written to MSAM at function block 1460 and a test is performed at decision block 1470, to determine if an error has occurred. If an error has not occured, then a message is displayed by MSAM on the IBM 3270-PC indicating that a summary line will be constructed for this alert monitor invocation at function block 1480. If an error is detected at decision block 1470 then an appropriate message is formatted at function block 1490, the message is displayed at output block 1500 and control is returned to the main processing loop at branch label 70. If the data is not deemed valid at decision block 1450, then a TYPE H_A_BAD_ID is written to MSAM to indicate that an error in the CICS Application has occurred at function block 1510, a message is displayed on the MSAM display indicating the problem has occurred and control is returned to the main processing loop at branch label 70.

If the test at decision block 1440 did not determine that the required header was present, then a test is performed at decision block 1530 to determine if the TYPE byte of the structured field is P_A_BAD_DATA (Hex 3C). Positive results indicate that MSAM was unable to interpret the H_A_INVOC array sent at function block 1140 and a message is displayed indicating the problem at output block 1540 and control is returned to the main processing block at branch label 70. If the data was not specified wrongly, then a message is displayed at output block 1550 indicating that the request was unexpected from MSAM and control is returned to the main processing loop at branch label 70.

FIGS. 11A to 11D show the logic associated with processing a MSAM request for AMSA information. If no new information is contained in the AMSA, then this condition is indicated to MSAM and no new information is sent. Control enters at branch label 1590 from FIG. 9 and immediately flows to a test to determine if the request is to read the AMSA at 1600, in which case an additional test is performed at 1610 to determine if any new data exists since the last request. If new data does exist, then the information is formatted and written to MSAM in TYPE H_A_GOOD_READ in a communications buffer reflecting the current contents of the AMSA at 1620. A test is performed next to determine if an error has occurred at decision block 1630. If an error has not occurred, then a structured field is sent at block 1640 and control loops back to 1590 to process the next request from MSAM. If an error has occurred, then the error message is formatted at function block 1650, the message is displayed at output block 1660 indicating the send error and control is passed back to main processing loop at 70. If no new data is present at decision block 1610, then a TYPE N_A_NO_DATA (Hex C1) is sent back to MSAM at function block 1670 and a test is made to determine if an error has occurred at decision block 1680. If an error has not occurred, a structured field request is sent at function block 1690 and control loops back to 1590 to process the next request. If an error has occurred, then the error message is formatted at function block 1700, the message is displayed at output block 1710 indicating the send error and control is passed back to main processing loop at 70.

If the request was not an MSAM read request, then a test is made at decision block 1720 to determine if the request is to terminate all alert monitor sessions contained in a list. If this is a terminate request, then the host terminates the alert monitor sessions indicated in the list accompanying the P_A_X_SESS (Hex 43) structured field request and writes a structured field message of TYPE H_A_X_ACK (Hex C3) to MSAM, which acknowledges the receipt of the P_A_X_SESS request at function block 1730. Next a test is performed at decision block 1740 to determine if an error has occurred. If an error has not occurred, then a structured field request is sent at function block 1750 and control loops back to 1590 to process the next request from MSAM. If an error has occurred, then the error message is formatted at function block 1760, the message is displayed at output block 1770 indicating the error and control is passed back to main processing loop at 70.

If the request was not an MSAM terminate some sessions request, then a test is made at decision block 1780 to determine if the request is to terminate all alert monitor sessions. If this is a terminate all request, then a TYPE H_A_X_ALL (Hex C4) is written to MSAM to indicate the termination of all CICS applications at function block 1790 and a test is performed at decision block 1800 to determine if an error has occurred. If an error has not occurred, then a structured field request is sent at function block 1810 and control loops back to 1590 to process the next request. If an error has occurred, then the error message is formatted at function block 1820, the message is displayed at output block 1830 indicating the error and control is passed back to main processing loop at 70.

If the request was not an MSAM terminate all sessions request, then a test is made at decision block 1840 to determine if the request is to stop. If this is a stop request, then a message is displayed indicating that MSAM is shutting down and control is passed to the main loop at branch label 70. If the request is not a stop request then a message is displayed at output block 1860 indicating that an unexpected request has ben received from MSAM and control is passed back to the main processing loop at 70.

Figure 12A:
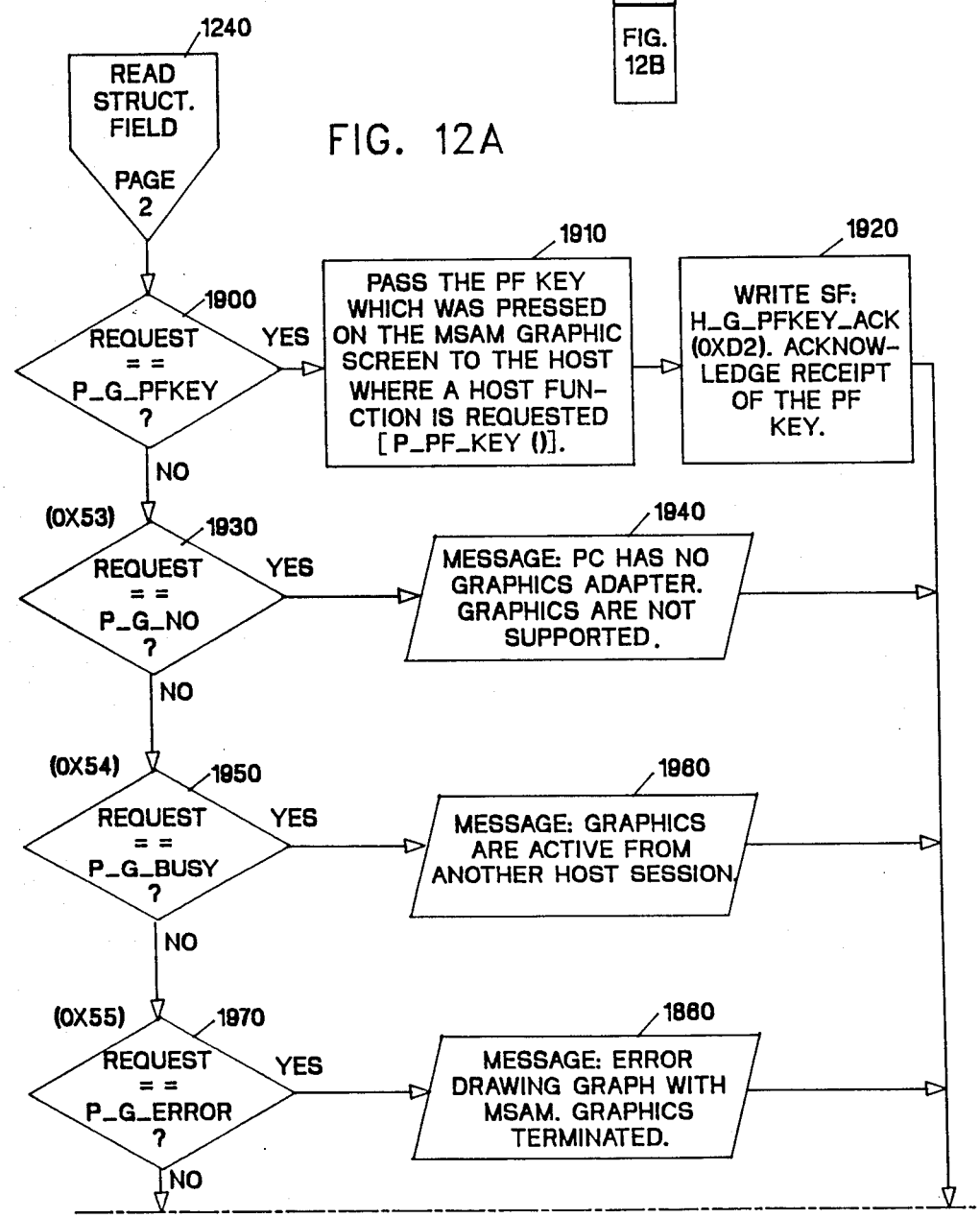
Figure 12B:
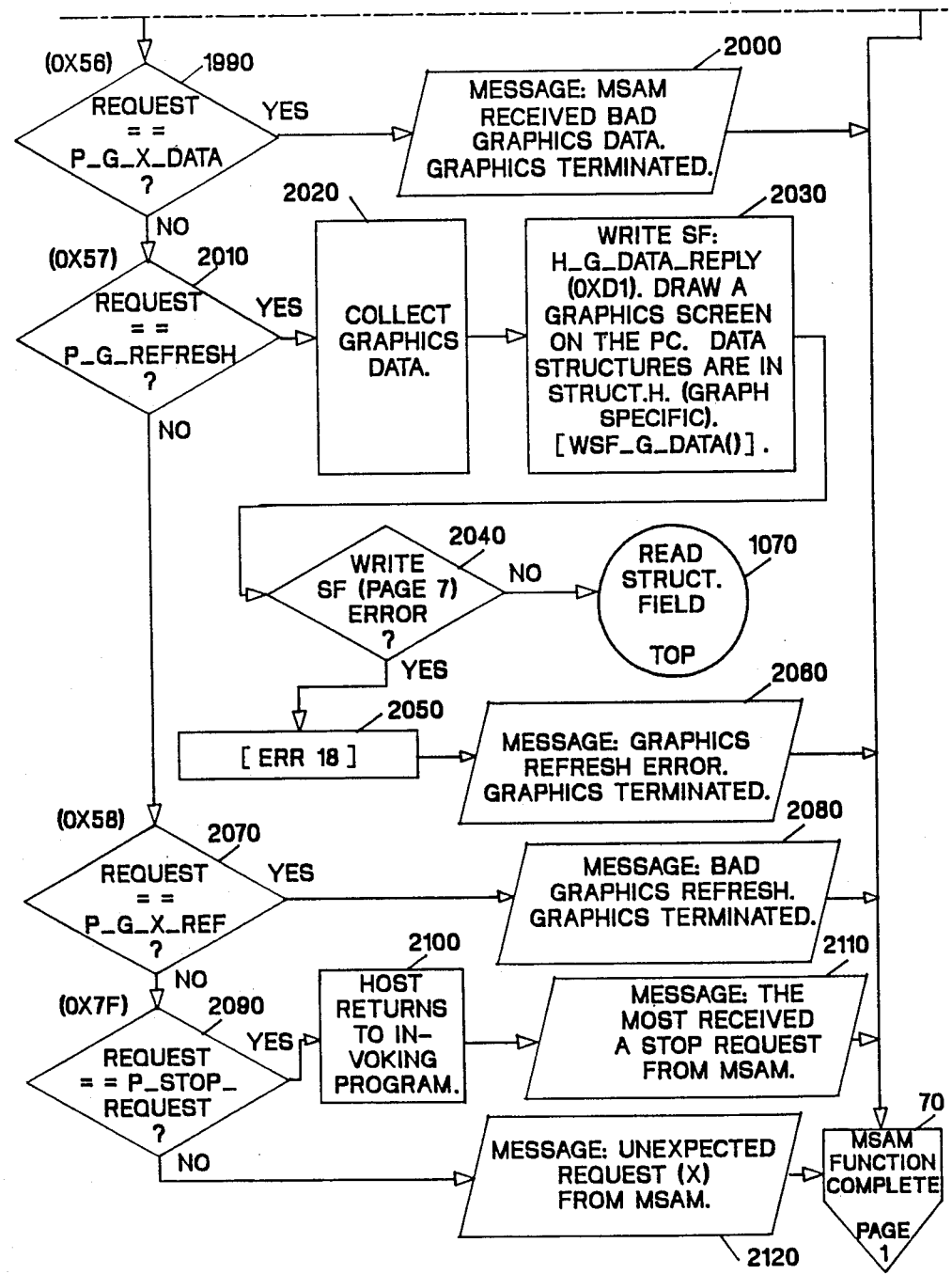

In FIGS. 12A and 12B, the HOST has received a request to process graphics information for MSAM. Control enters at branch label 1240 and control flows immediately to decision block 1900 where a test is performed to determine if a function key request has been received. If a function key request has been received, then the function key number is relayed to CICS/PARS for processing at function block 1910 and an acknowledgement is returned to MSAM by writing a TYPE H_G_FKEY_ACK (Hex D2) at function block 1920 and returning to the main loop in FIG. 7 at branch label 70.

If the request was not to process graphics information at decision block 1900, then a test is performed to determine if the request was inappropriate because of no graphics adapter at decision block 1930. If there is no graphics adapter in the PC, then a message is displayed indicating the problem at output block 1940 and control is passed back to the main processing loop at branch label 70.

If the test for a graphics adapter was negative, then a test is performed to determine if any other host graphics sessions are already active on the PC at decision block 1950. If other graphics sessions are active, then a message is displayed indicating the problem at output block 1960 and control is passed back to the main processing loop at branch label 70.

If the test for another active graphics session was negative, then a test is performed to determine if a graphics error has occurred on the PC at decision block 1970. If an error has occurred, then a message is displayed indicating the problem at output block 1980 and control is passed back to the main processing loop at branch label 70.

If the test for a graphics error was negative, then a test is performed to determine if bad graphics data has been received at decision block 1990. If bad graphics data has been received, then a message is displayed indicating the problem at output block 2000 and control is passed back to the main processing loop at branch label 70.

If the test for bad graphics data was negative, then a test is performed to determine if this is a refresh graphics data at decision block 2010. If this is a refresh request, then a collection of the graphics data is performed at function block 2020 and a TYPE H_G_DATA_REPLY (Hex D1) is written to MSAM with the requested graphics data at function block 2030 and a test is performed at decision block 2040 to determine if an error has occurred. If an error has not occurred, then control loops back to 1240 to process the next request. If an error has occurred, then the error message is formatted at function block 2050, the message is displayed at output block 2060 indicating the error and control is passed back to main processing loop at 70.

If the test for a graphics refresh was negative, then a test is performed to determine if a bad graphics refresh request data has been received at decision block 2070. If a bad graphics refresh has been received, then a message is displayed indicating the problem at output block 2080 and control is passed back to the main processing loop at branch label 70.

If the test for a bad graphics refresh was negative, then a test is performed to determine if a stop graphics has been received at decision block 2090. If a stop graphics data has been received, then the HOST returns to the invoking program at function block 2100 and a message is displayed indicating that the HOST has received the stop request at output block 2110 and control is passed back to the main processing loop at branch label 70. If the request is not a stop graphics request at 2090, then a message is displayed indicating that the HOST has received an unexpected request at output block 2120 and control is passed back to the main processing loop at branch label 70.

Figure 13:
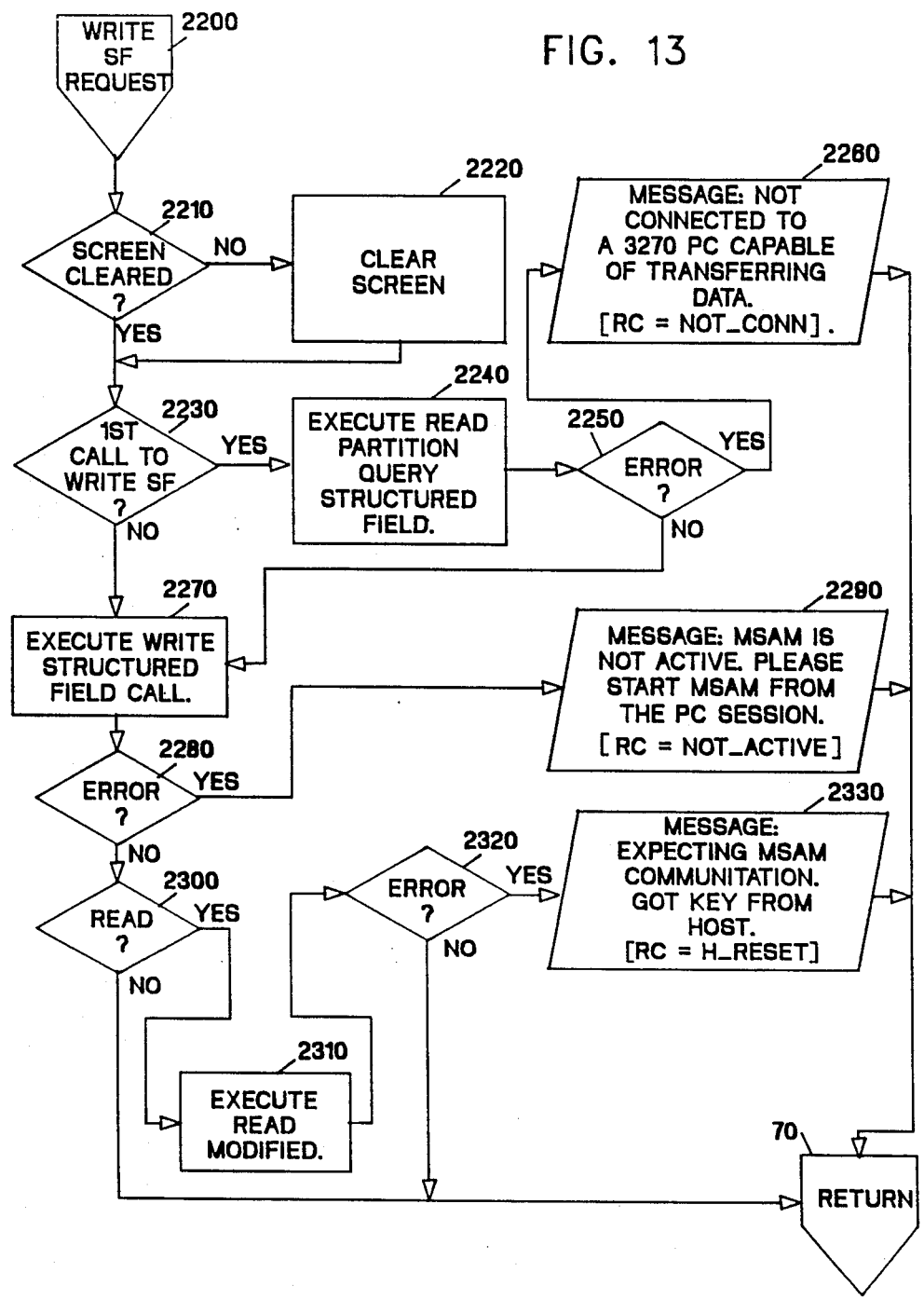

In FIG. 13, the detailed logic of the write structured field requests is presented. The writing of a structured field corresponds to sending data from the HOST to the IBM 3270-PC. This logic presents the detailed logic of function blocks, 1050, 1220, 1460, 1510, 1620, 1670, 1730, 1790, 1920 & 2030 of the flowchart figures. Control enters at branch label 2200 and flows immediately to decision block 2210 where a test is performed to determine if the display is cleared. If the screen is not cleared, then it is cleared in function block 2220. In either case, a second test is performed next at decision block 2230 to determine if this is the first attempt to write a structured field. If this is the first attempt to write a structured field, then a test is performed to determine if an IBM 3270-PC is actively attached to the HOST in function block 2240 and decision block 2260. If there is not an active PC attached, then a message is displayed indicating the problem at output block 2260 and control is returned to the main processing loop at branch label 70. If no error is detected at decision block 2250 or this is not the first structured field write, then function block 2270 is entered to execute the structured field write operation. This operation is the actual communication buffer send to MSAM. Next, a test is made in decision block 2280 to determine if an error has occurred. If an error has occurred, then a message is displayed at output block 2230 indicating that MSAM is not active and prompting the user to restart MSAM. After the message is displayed, then control is returned to the main processing loop at branch label 70. If an error is not detected at decision block 2280, then a test is performed at 2300 to determine if a read from MSAM is appropriate. If a read is requested, then a read is performed at function block 2310 and a test is performed for error at decision block 2320. If an error has occurred, then an appropriate message is displayed at output block 2330 and control is returned to the main processing loop at branch label 70. If no error was detected at decision block 2320, then control is returned to the main processing loop at branch label 70.

MSAM PC PROCESSING

Figure 14:
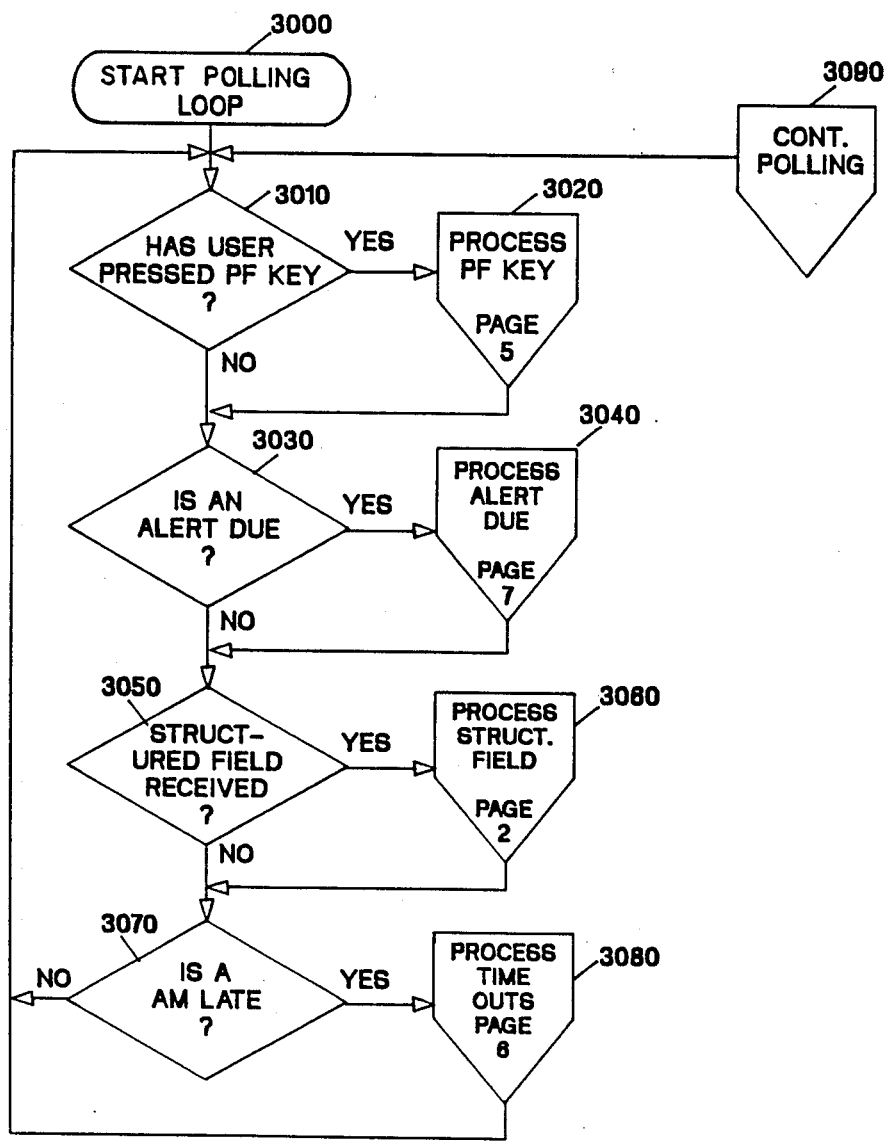

The next set of flowchart figures give the detailed logic associated with the IBM 3270-PC side of the processing. Referring now to FIG. 14, control enters at 3000 where a continuous loop is presented. The loop consists of carrying out four sets of functions. The first is the handling of function key entries indicated at decision block 3010 and branch label 3020. The second is the handling of an alert indicated at decision block 3030 and branch label 3040. The third is the processing of structured fields indicated at decision block 3050 and branch label 3060. The fourth is the detection and handling of alert monitors that are late in arriving indicated at decision block 3070 and branch label 3080. A return label at 3090 is also provided for returns to the main processing loop from any ancillary function processing.

Figure 15:
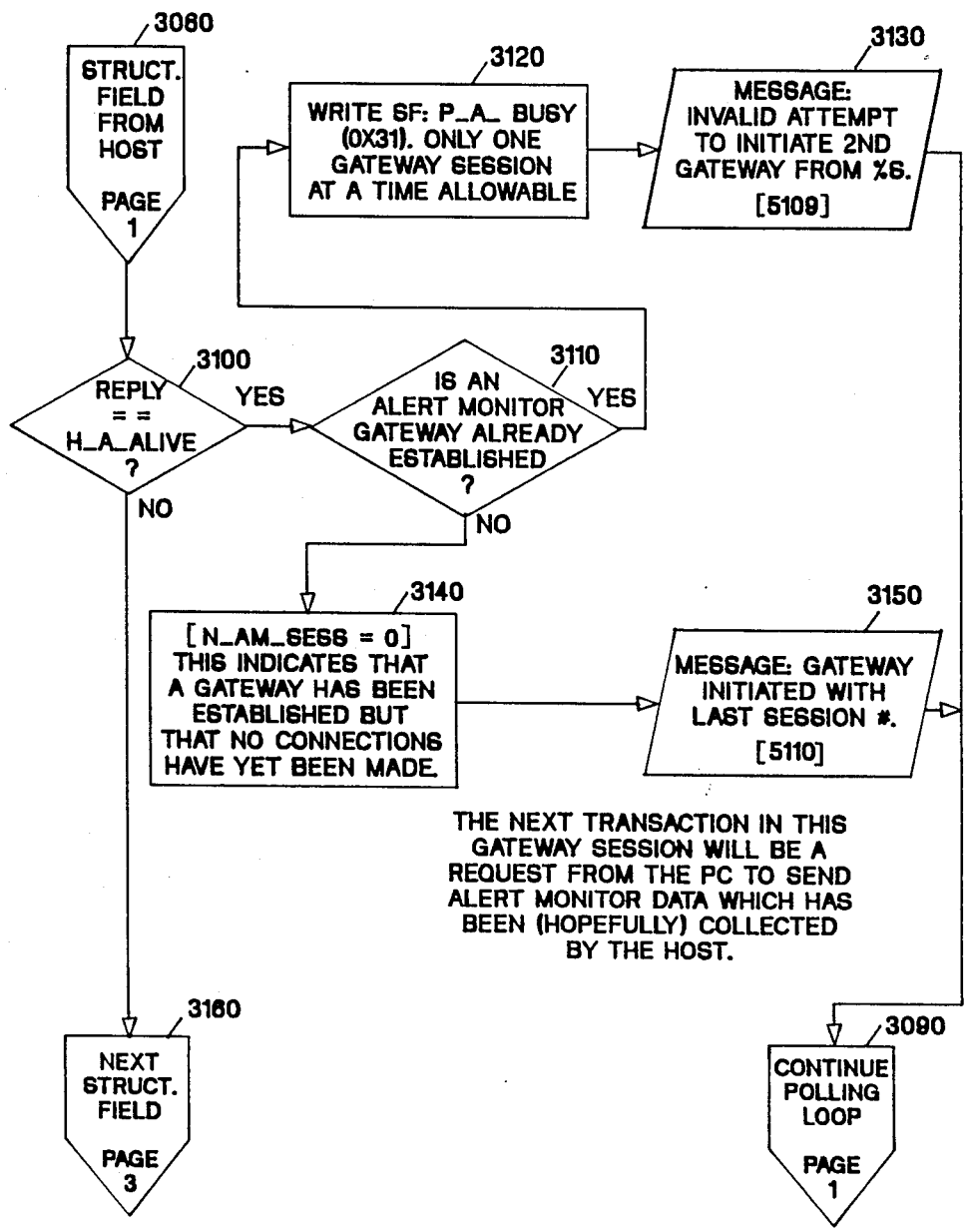

In FIG. 15, the processing of structured fields received from the HOST is presented. Control enters at branch label 3060 from the main processing loop in FIG. 15 and a test is performed at decision block 3100 to determine if the host is attempting to initialize a gateway session. If the host is attempting to establish a gateway, then a second test is performed to determine if a gateway has already been established previously in decision block 3110. If a gateway is already active, then a structured field is sent to the host of TYPE P_A_BUSY (Hex 31) at function block 3120, a message is displayed indicating the error and control is returned to the main processing loop at branch label 3090. If another gateway is not detected at decision block 3110, then the gateway active is set in function block 3140, a message is displayed in output block 3150 indicating the successful initiation of a gateway, and control is returned to the main processing loop at branch label 3090. If the structured field was not an initiate gateway notice, then control is passed to further structured block processing in FIG. 16A at branch label 3160.

Figure 16B:
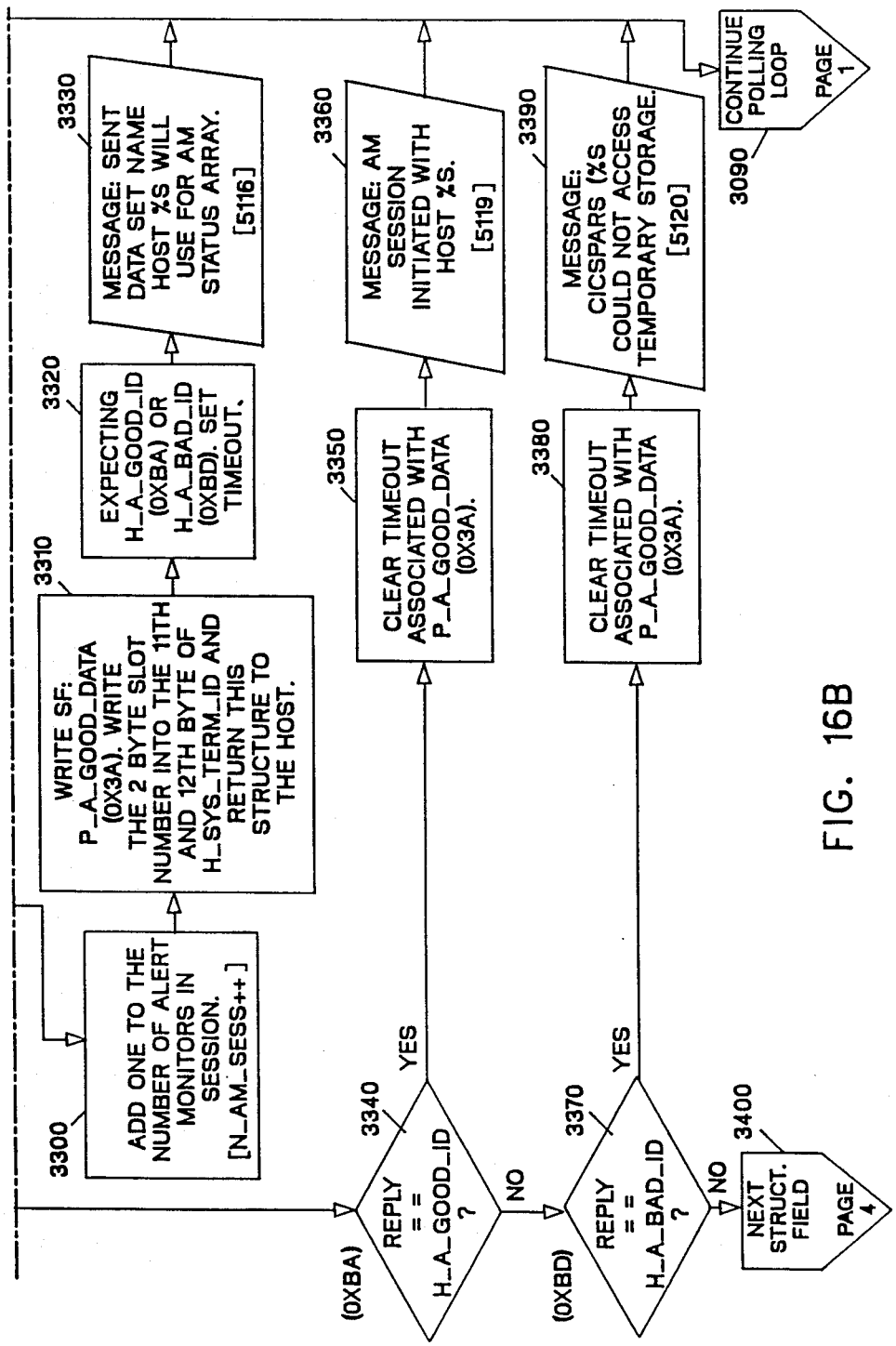

In FIGS. 16A and 16B, the MSAM logic associated with initiating the alert monitor processing is presented. Control enters at branch label 3160 where control immediately passes to a test for a HOST inquiry for application alert monitor information at decision block 3200. If this is a host inquiry, then a second test is performed to determine if the gateway has already been established at decision block 3210. If the gateway has not been established, then a structured field is written of TYPE P_A_NO_GATE (Hex 38) to the HOST, a message is displayed indicating that an attempt has been made to invoke the alert monitor before establishing the gateway from CICS/PARS at output block 3230 and control is returned to the main processing loop at 3090. If the gateway has been established at 3210, then a test is made to determine if more than sixteen alert monitors are already active at decision block 3240. If there are more then 16, then a structured field of TYPE P_A_TOO_MANY (Hex 39) is sent to the HOST at function block 3250, a message is displayed indicating the problem at output block 3260 and control is returned to the main processing loop at 3090. If there are not too many alert monitoring sessions already active at decision block 3270, then a test is made to determine if valid data was sent by the HOST at 3270. If the data is not valid, then a structured field of TYPE P_A_BAD_DATA (Hex 3C) is sent to the HOST at function block 3280, a message is displayed indicating the problem at output block 3290 and control is returned to the main processing loop at 3090. If the data is valid at decision block 3270, then the number of alert monitors is incremented in function block 3300, a structured field of TYPE P_A_GOOD_DATA (Hex 3A) is sent to the HOST at function block 3310, a timeout is set expecting a structured field of TYPE P_A_GOOD_ID (Hex BA) from the HOST at function block 3320, a message is displayed indicating the data set name and the success at output block 3330, and control is returned to the main processing loop at 3090.

If the structured field is not requesting invocation of a monitoring session, then a test is made at decision block 3340 to determine if the data is the reply indicating that the identification of the application is verified on the HOST. If the information is the reply, then the time-out for the wait for the identification information is cleared at function block 3350, a message is displayed indicating the initiation of the session at output block 3360, and control is returned to the main processing loop at 3090.

If the structured field is not a verification reply, then a test is made at decision block 3370 to determine if the data is a negative reply to the identification of the application initiated at 3320. If the information is a negative reply, then the time-out for the wait for the identification information is cleared at function block 3380, a message is displayed indicating that CICS/PARS on the HOST could not initiate communications with the application at output block 3390 and control is returned to the main processing loop at 3090. If the structured field was not processed, then a branch is made to branch label 3400 for additional processing of the structured field in FIG. 17.

Figure 17:
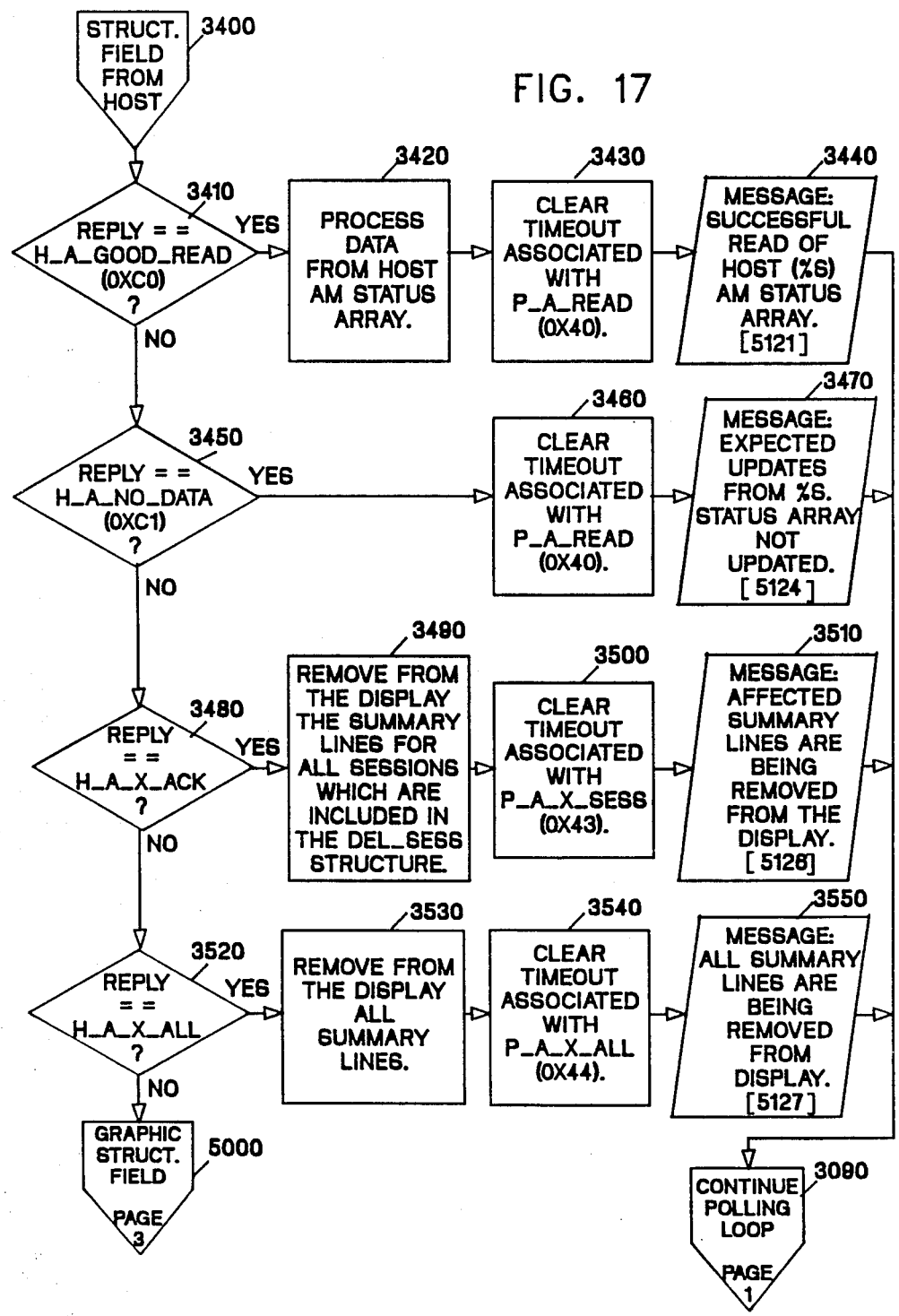

In FIG. 17, the HOST is sending AMSA data back to MSAM after a request for information has been initiated. Control enters at branch label 3400 and a test is immediately performed to determine if the reply that the HOST has sent is good data in decision block 3410. If it is good data, then the data is processed in function block 3420.

The processing described in FIG. 17 is key to MSAM. Before exploring the detailed functions in the following flowcharts, a high level explanation of some key processes seems appropriate. The data associated with the TYPE byte H_A_GOOD_READ in function block 3420 contains the entire Alert Monitor Status Array AMSA as maintained on the host side of the gateway. The AMSA is an array of seventeen structures. Each structure describes the current status of a single CICS region. The fields which make up this structure are presented below:

| NAME | LENGTH (bytes) | DESCRIPTION |
| --- | --- | --- |
| S_RES_V(8) | 16 | An array of eight integer values each representing the value of a system resource. |
| N_TASK_NUM | 4 | The most current task number as defined by CICS. A change in task number indicates that the AMSA has been updated for this invocation. |
| TASK_P_S | 2 | The task rate during the most recent collection interval in tasks per second. |
| RESERVED | 2 | Reserved (Used now for full word alignment) |

MSAM maintains a control array which keeps threshold and timing information. Similar to the AMSA, the control array is an array of seventeen structures which describe the resource status of a single CICS region. The fields which make up the MSAM control structure are:

| NAME | LENGTH (bytes) | DESCRIPTION |
|------|----------------|-------------|
| L_U_TIME | 4 | Time of the last update |
| N_U_TIME | 4 | Time of the next update |
| INT_SEC | 2 | Sampling interval (as passed in H_AM_INVOC) (Function block 1140 of the flowcharts. |
| INT_P_A_FLAG | 1 | Flag Byte which is used to indicate a session is to be deleted. |
| APPLID | 12 | character application id (as passed in H_AM_INVOC) in function block 1140 of the flowcharts. |
| O_TASK_N | 4 | The most current task number as defined by CICS at the last update. |
| O_SEC | 4 | The number of seconds since the original invocation. |
| S_RES_T(8) | 16 | An array of eight integers which represent the threshold of a system resource (as passed in H_AM_INVOC) at function block 1140 in the flowcharts. |
| INT_OP_SYS | 2 | Operating system indicator Hex (FFFF-MVS, 0000-VSE) |

Figure 37:
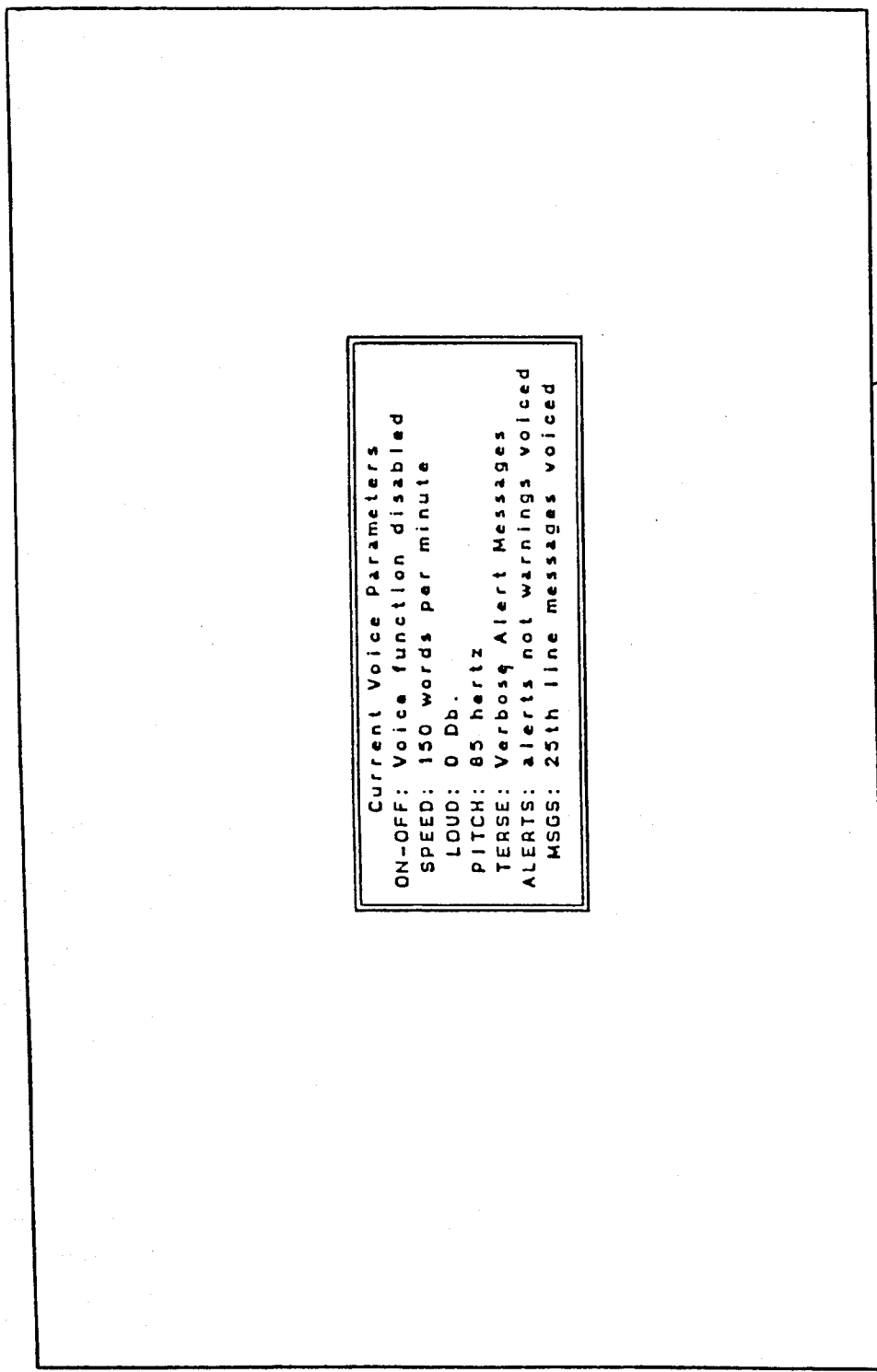
FIG. 37 is a screen print of the current voice parameters MSAM screen.

When the AMSA structured field is received by MSAM, each slot in the control array is compared with corresponding slots in the control array on MSAM. If the O_TASK_N in the control array is not equal to the N_TASK_NUM field, then if the history feature is enabled, then the history file is appended with the resource values. In addition, the L_U_TIME, the N_U_TIME, the O_TASK_N, and the O_SEC fields are also updated. Then, each member of the S_RES_V array is compared with the corresponding member of the S_RES_T array. If any S_RES_T is exceeded, then the following tests and actions are taken:

(1) If the voice feature is enabled, a message is enunciated indicating the source of the problem according to the parameters set in the voice window as shown in FIG. 37. The voice feature is implemented using the ASCII text to speech capability of the IBM Personal Computer Voice Communications Adapter.

(2) If the speaker feature is enabled, then a high frequency tone is emitted to alert the user to threshold exceeded conditions. To emit this tone, the speaker is programmed for a frequency of 2000 hertz and a duration of one-half second. The duration and frequency are user selectable.

(3) The attribute bytes of the corresponding field on the summary line are changed so that the field is displayed in RED.

(4) A message indicating the problem resource is displayed in the message field of the summary line in RED.

(5) The attribute bytes of the APPLID field on the summary line are changes to display RED.

The following tests and actions are taken if the S_RES_V is within 20% of the S_RES_T:

(1) If the voice feature is enabled, a message is enunciated indicating the source of the problem according to the parameters set in the voice window as shown in FIG. 37.

(2) If the speaker feature is enabled, then a medium frequency tone is emitted to alert the user to the warning conditions. To emit this tone, the speaker is programmed for a frequency of 500 hertz and a duration of one-fifth second. The duration and frequency are user selectable.

(3) The attribute bytes of the corresponding field on the summary line are changed so that the field is displayed in YELLOW.

(4) A message indicating the problem resource is displayed in the message field of the summary line in YELLOW.

(5) The attribute bytes of the APPLID field on the summary line are changes to display YELLOW.

Should all S_RES_V values be below eighty percent of S_RES_T then the attribute bytes of all the fields on the summary line are changed to display GREEN. FIG. 2 shows an MSAM display with seventeen summary lines displayed.

The time-out associated with the request is cleared at function block 3430, a message is displayed indicating the success of the read at output block 3440, and control is returned to the main processing loop at 3090.

If the reply does not indicate good data at decision block 3410, then a test is performed at decision block 3450 to determine if no new data existed in the AMSA on the host. If no new data existed, then the time-out associated with the request is cleared at function block 3460, a message is displayed indicating the success of the read at output block 3470, and control is returned to the main processing loop at 3090.

If the reply does not indicate that no data is available at decision block 3450, then a test is performed at decision block 3480 to determine if the reply indicates successful deletion of some of the CICS applications from the monitoring list. If the test is true, then the summary lines for all the sessions are removed from the alert monitor display in function block 3490, the time-out associated with the request is cleared at function block 3500, a message is displayed indicating the removal of the lines at output block 3510 and control is returned to the main processing loop at 3090.

If the reply does not indicate that applications have been deleted per the request at 3480, then a test is performed at decision block 3520 to determine if the reply indicates successful deletion of all the CICS applications from the monitoring list. If the test is true, then the summary lines for all the sessions are removed from the alert monitor display in function block 3530, the time-out associated with the request is cleared at function block 3540, a message is displayed indicating the removal of the lines at output block 3550, and control is returned to the main processing loop at 3090. If the structured field was not processed, then a branch is made to branch label 6000 for additional processing of the structured field.

Figure 18:
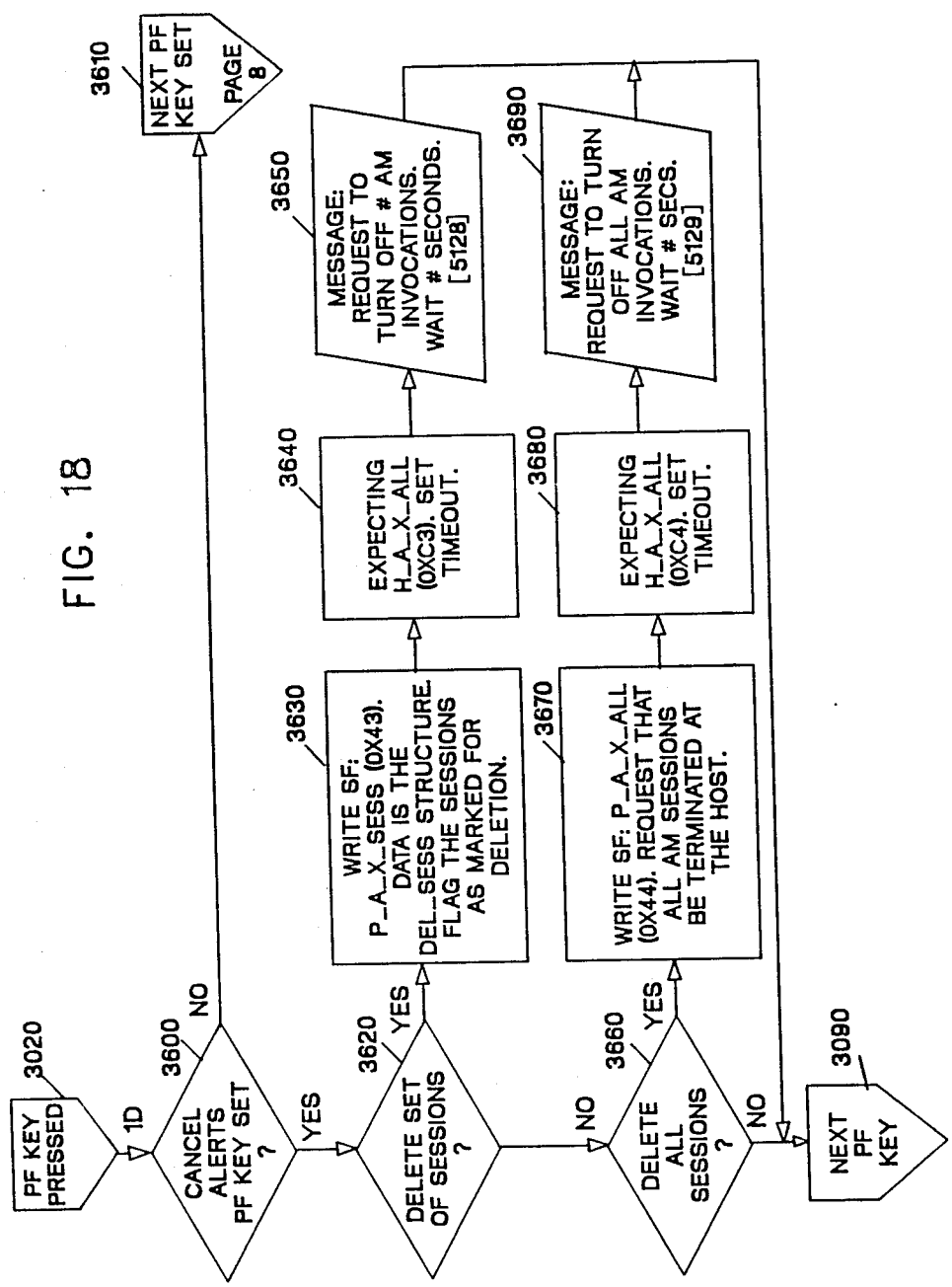

In FIG. 18, the logic associated with the function key processing is presented. Control enters at branch label 3020 from the main processing loop of FIG. 14 and immediately enters a test to determine if the cancel alerts function key was pressed at decision block 3600. If it was not, then control passes to branch label 3610 at FIG. 21 for continued function key processing. If the cancel alert sessions function key was pressed, then an array is created containing the set of alert monitor invocations on the host to terminate at decision block 3620. If the user has requested a set of sessions, then a structured field of TYPE P_A_X_SESS (Hex 43) is sent along with the array of alert monitors to terminate to the HOST at function block 3630, a timeout parameter is set to await reply at function block 3640, a message is displayed indicating the request was made at output block 3650 and control is returned to the main processing loop at 3090.

If a delete set of sessions was not indicated at decision block 3620, then another test is performed at decision block 3660 to determine if the delete all sessions was indicated. If delete all sessions is indicated, then a structured field of TYPE P_A_X_ALL (Hex 44) is sent to the HOST at function block 3670, a timeout parameter is set to await reply at function block 3680, a message is displayed indicating the request was made at output block 3690, and control is returned to the main processing loop at 3090.

Figure 19:
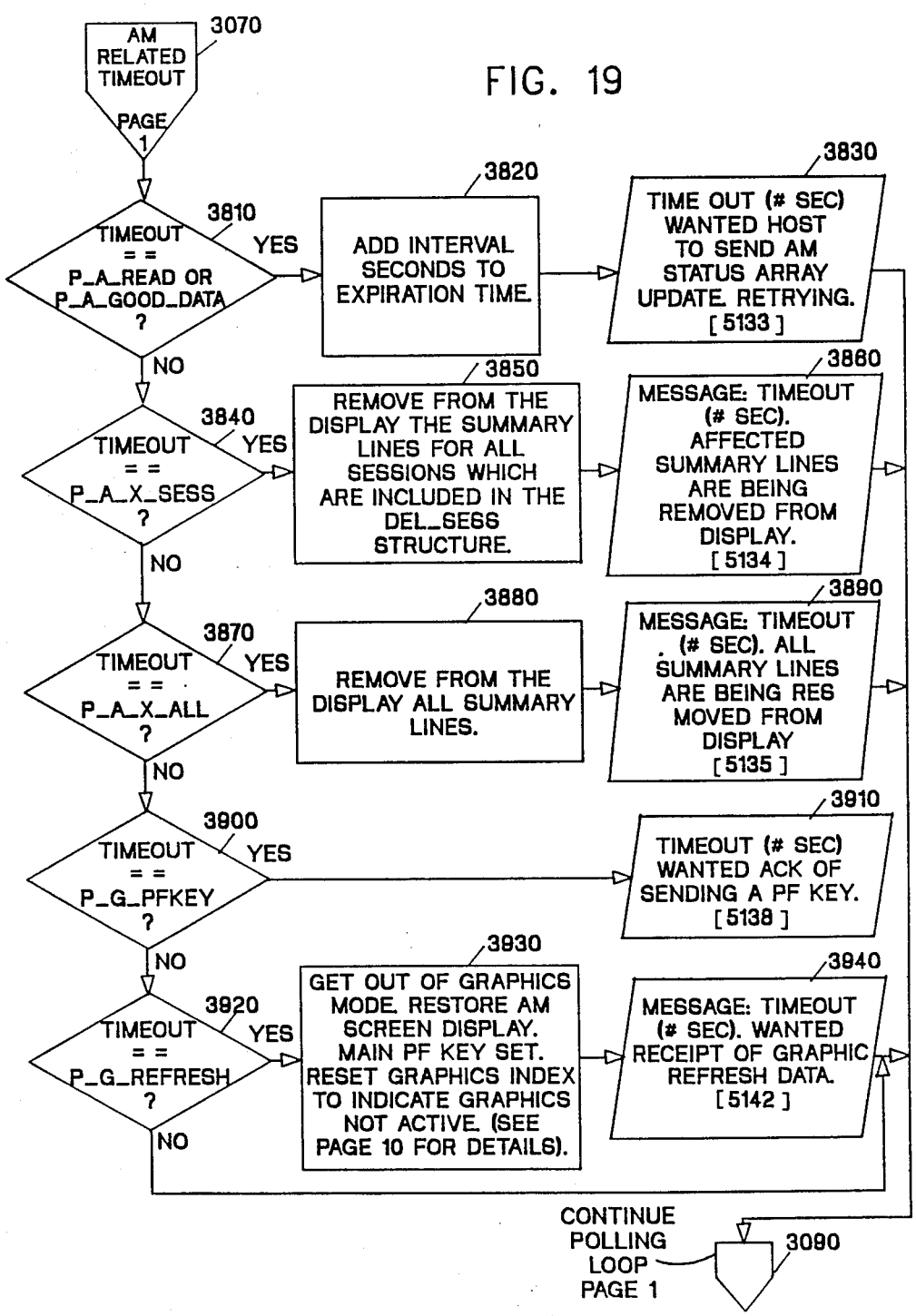

FIG. 19 presents the details of alert monitor time-out processing. Control enters at branch label 3070 from the main processing loop in FIG. 14 and immediately enters a test to determine if the time-out is from a request for alert monitor data from the host at decision block 3810. If the request is for data, then the time-out interval is bumped up in function block 3820, a message is displayed indicating to the user what is happening in output block 3830, and control is returned to the main processing loop at 3090.

If the request is for deletion of some of the monitoring sessions at decision block 3840, then the summary lines of the requested deletions are removed from the display at function block 3850, a message is displayed indicating to the user what is happening in output block 3860 and control is returned to the main processing loop at 3090.

If the request is for deletion of all of the monitoring sessions at decision block 3870, then the summary lines of all sessions are removed from the display at function block 3880, a message is displayed indicating to the user what is happening in output block 3890, and control is returned to the main processing loop at 3090.

If the request is for acknowledgement of a function key at decision block 3900, then a message is displayed indicating to the user what is happening in output block 3910 and control is returned to the main processing loop at 3090.

If the request is for graphics refresh information at decision block 3920, then the alert monitor display replaces the graphics display that the user was trying to use at function block 3930, a message is displayed indicating to the user what is happening in output block 3840, and control is returned to the main processing loop at 3090.

Figure 20:
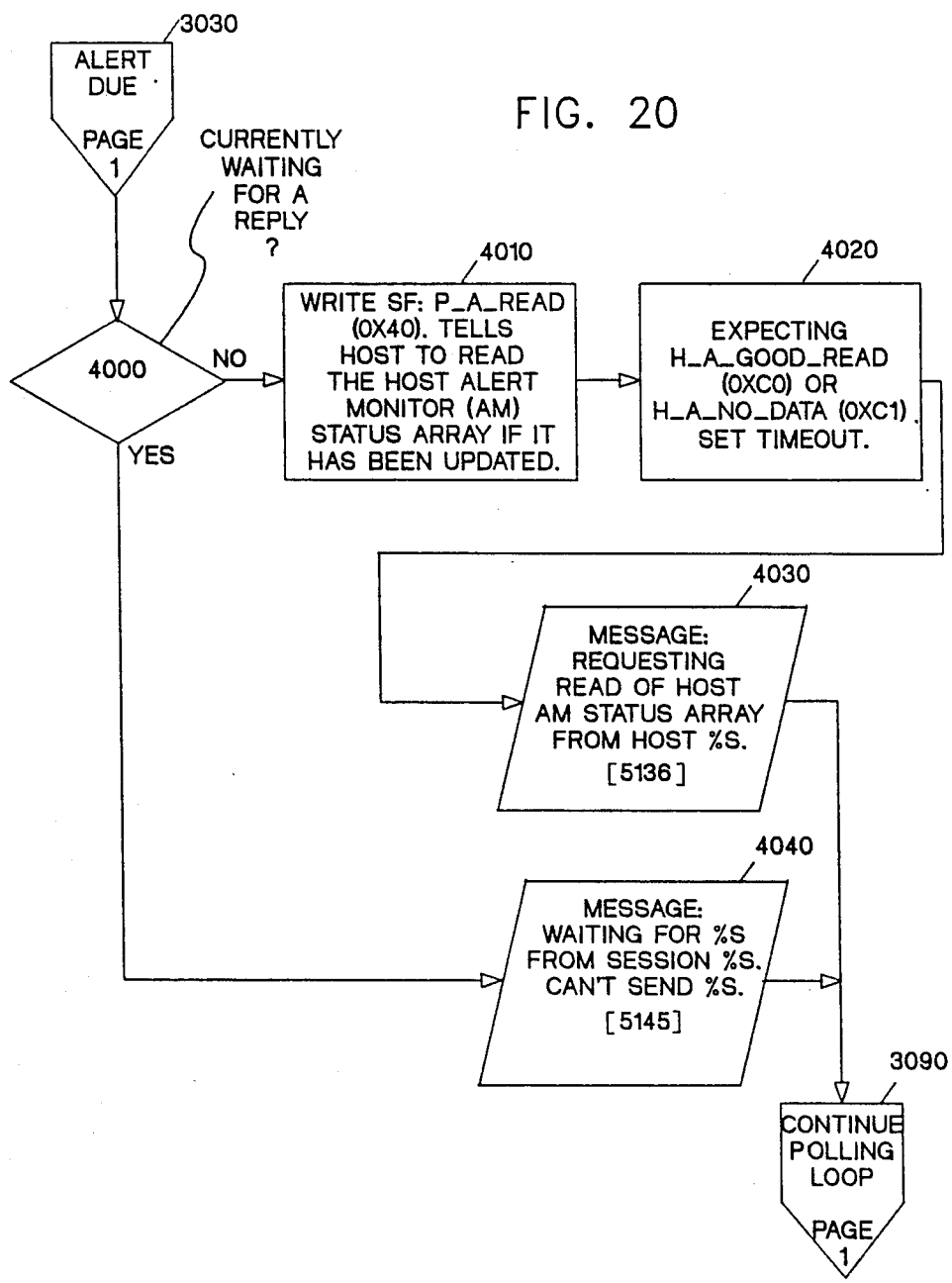

In FIG. 20, the logic enabling the continuous retrieval on a user specified interval of alert information is shown. Control enters from branch label 3030 where a test is performed to determine if the MSAM alert monitor is already waiting for a reply from the host at decision block 4000. If it is, then a message is displayed indicating the predicament in output block 4040. If no data is currently awaited, then a structured field of TYPE P_A_READ (Hex 40) is sent to the HOST at function block 4010, a time-out is set at 4020, a message is displayed indicating the request at output block 4030, and control is returned to the main processing loop at 3090.

Figure 21:
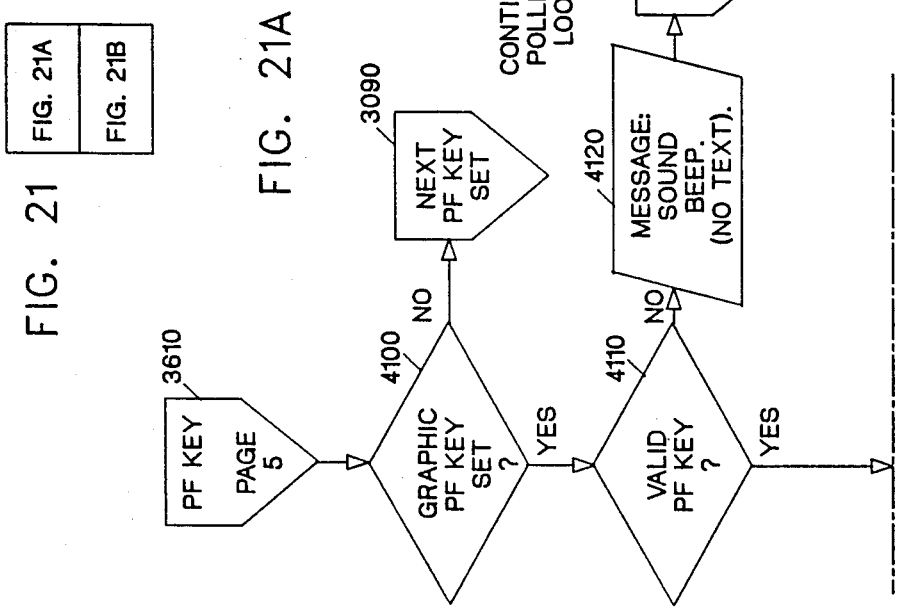
Figure 21B:
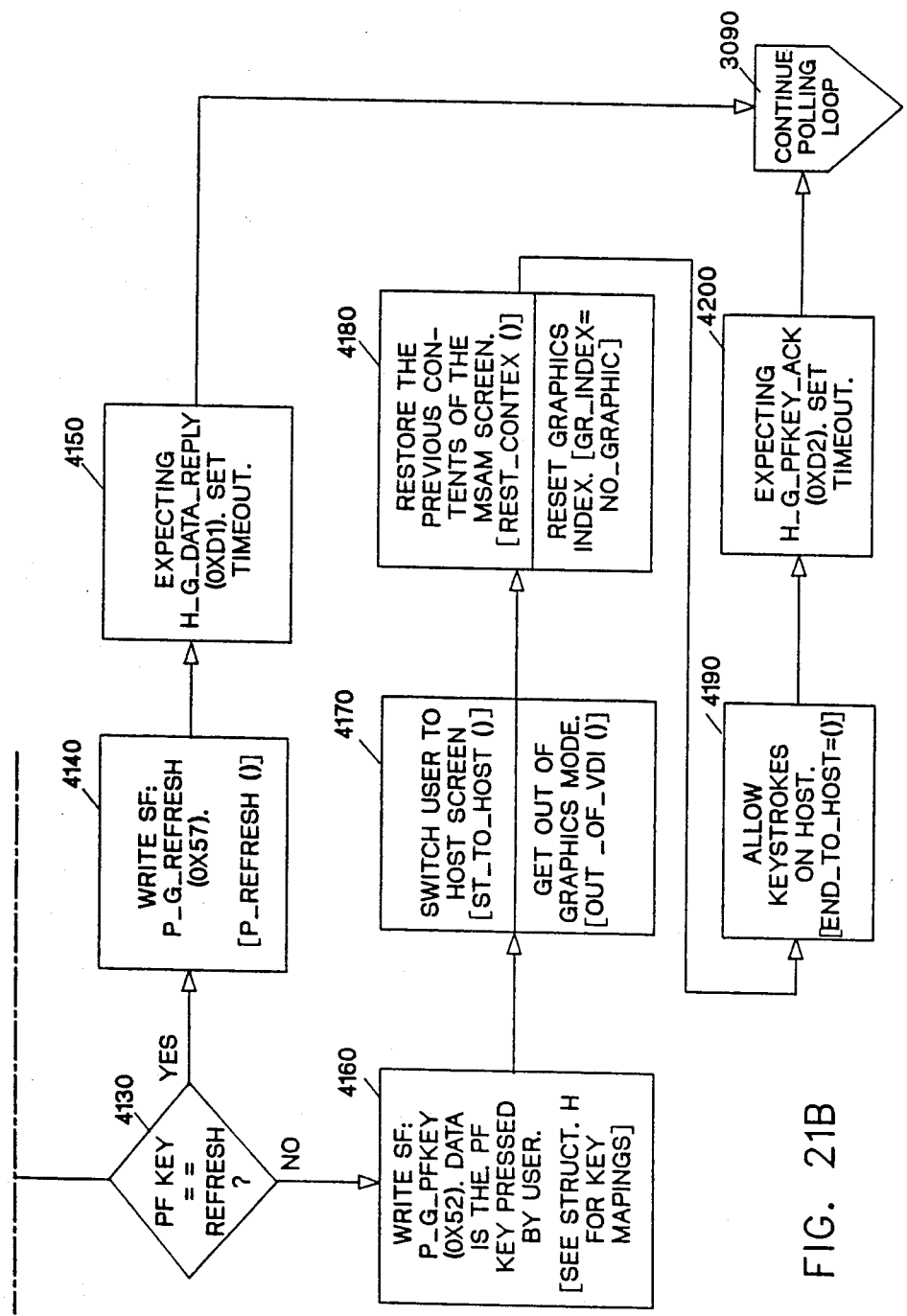

FIGS. 21A and 21B present the logic associated with processing the function keys other than the cancel alert monitor function key. The valid function keys and their functions are presented at 3609. Control enters at 3610 and a test is immediately performed in decision block 4100 to determine if one of the graphic function keys was pressed. If it was not, then control returns to the main loop at 3090 for processing. If the function was not a graphic function, then a test is made at decision block 4110 for the validity of the function key. If the function key was not a valid graphic function, then the user is beeped in function block 4120 and control returns to the main processing loop at 3090 for additional processing. If a valid function key was pressed at 4110 an additional test is performed at decision block 4130 to determine if the refresh key was pressed. If it was, then a structured field of TYPE P_G_REFRESH (Hex 57) is sent to the HOST at function block 4140, a time-out is set to await the reply at function block 4150, and control is returned to the main processing loop at 3090.

If the refresh function key was not pressed, then a structured field of TYPE P_G_FKEY (Hex 52) is sent to the HOST with the number of the function key pressed at function block 4160, the user is switched to a host screen in function block 4170, and the previous contents of the MSAM screen, before entering graphics mode, are displayed in function block 4180. Then, the keyboard is enabled in function block 4190, a time-out is set to await the function key acknowledgement in function block 4200 and a return is executed to the main loop processing at 3090.

Figure 22:
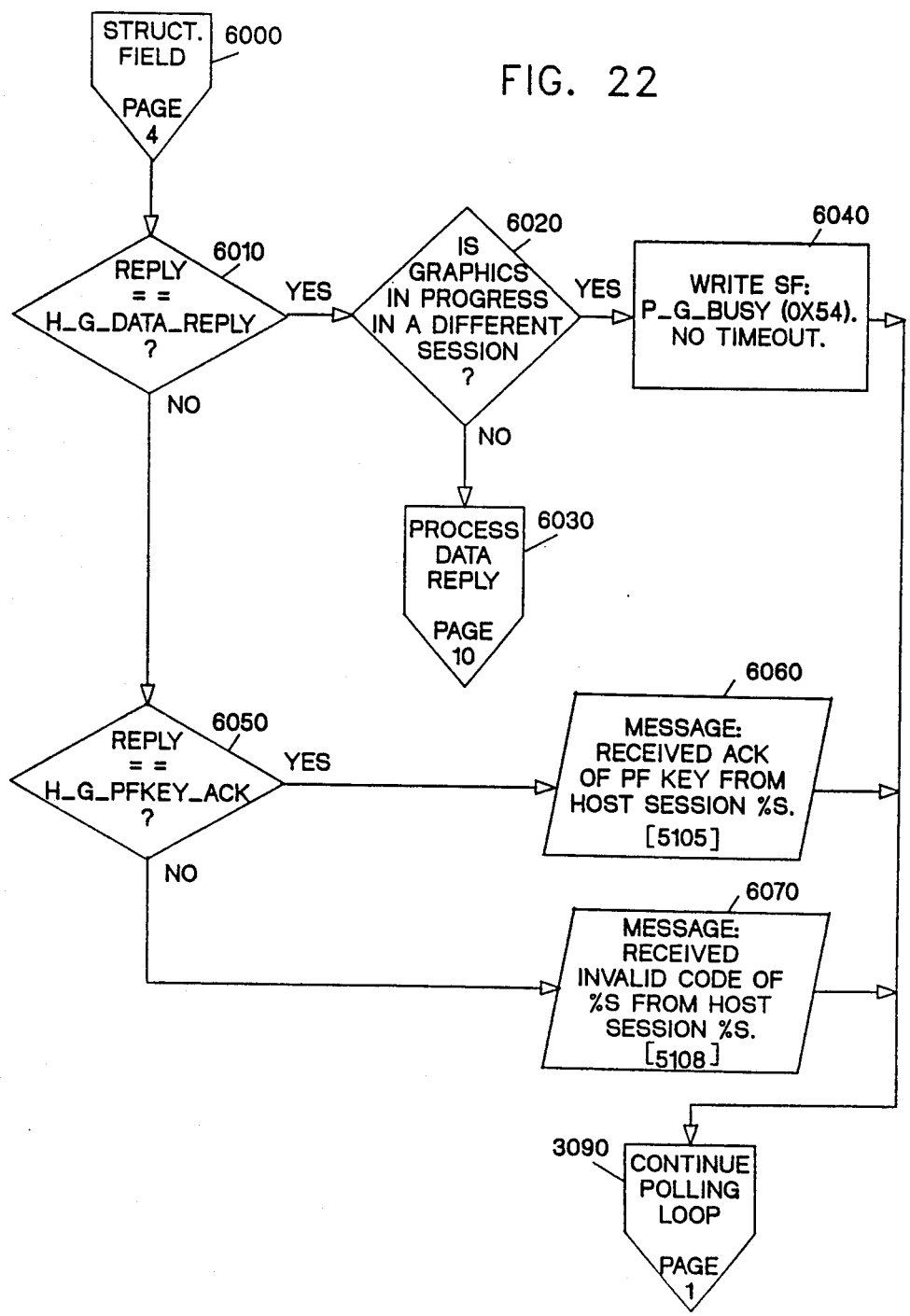

FIG. 22 presents additional structured field processing for graphics data received from the HOST and function key acknowledgement. Control enters at branch label 6000 from FIG. 17. A test is immediately performed to determine if the structure is a reply to a graphics request at decision block 6010. If it is, then another test is performed at decision block 6020 to determine if graphics is in progress in another session. If it is, then a structured field of TYPE P_G_BUSY (Hex 54) is sent to the HOST at function block 6040, and control is returned to the main loop at branch label 3090. If no other graphics sessions are active at decision block 6020, then the data is processed at branch label 6030 in FIG. 23A.

If the structured field was not graphics at 6010, then an additional test is performed at 6050 to determine if the structured field is a function key acknowledgement. If it is, then a message verifying receipt is presented to the user at 6060 and control returns to the main processing loop at branch label 3090. If the structured field is not an acknowledgement, then a message saying that an invalid code has been received from the host is presented to the user at output block 6070 and control returns to the main loop at 3090.

Figure 23B:
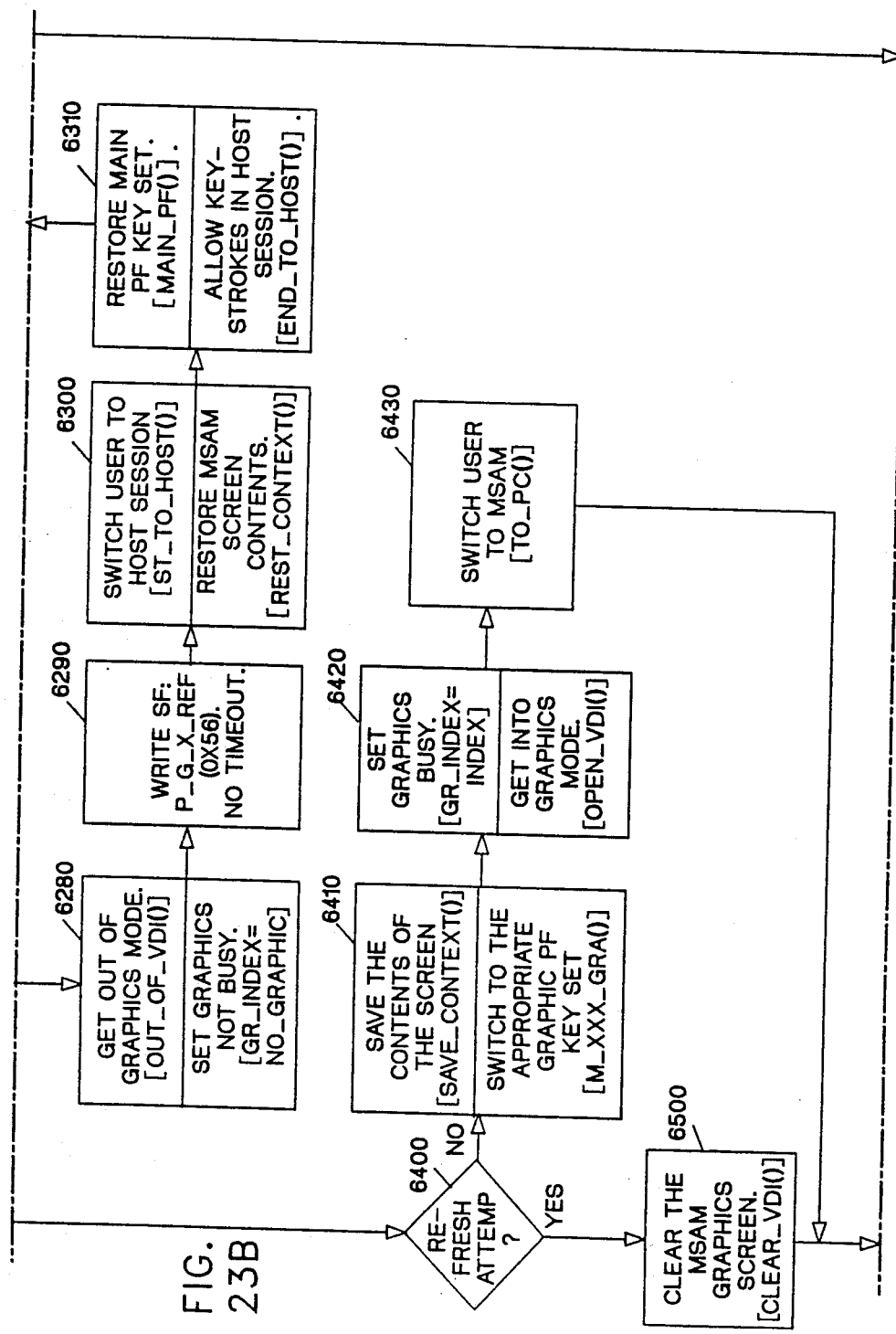
Figure 23C:
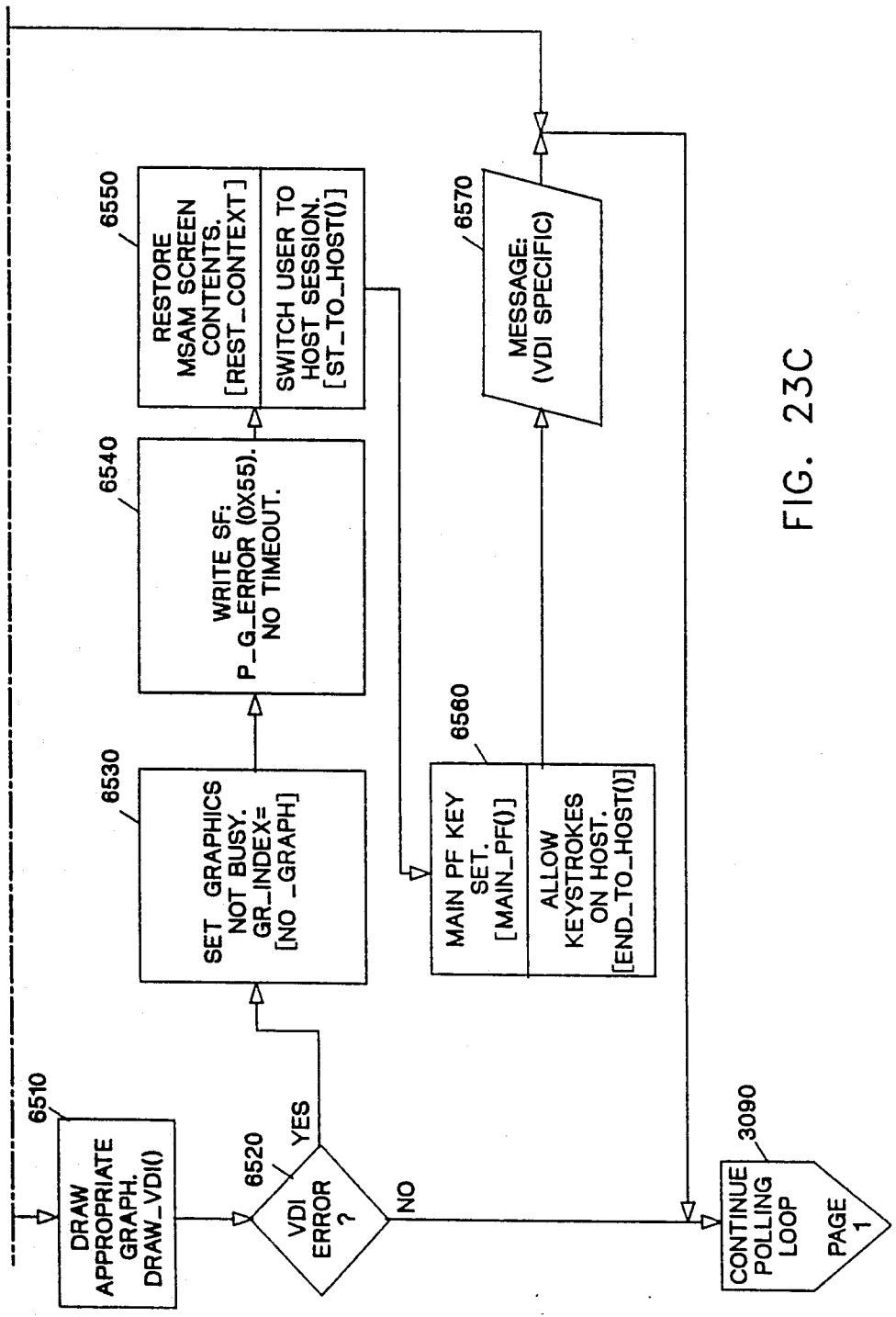

FIGS. 23A to 23C present the details associated with the graphics function. Control enters at branch label 6030 and enters a test to determine if graphics is already in progress for the session at 6200. If graphics is not in session, then a test is made to determine if the data is from a reply to an alert monitor graph at decision block 6210. If the data is not from an alert monitor graph, then a final test is performed to determine if an APA (all points addressable graphics) card is installed on the PC at decision block 6220. If the card is not installed, then a structured field of TYPE P_G_NO (Hex 53) is sent to the HOST at function block 6230 and control is passed back to the main loop at 3090 in FIG. 14. If the APA card was installed on the PC at 6220 or the reply was to an alert monitor graph request at 6210 or if graphics was already in progress for the session, then a test is performed next at decision block 6240 to determine if the information is valid graphic data from the HOST. If the data is not valid, then a further test is performed at decision block 6250 to determine if the request was a refresh attempt. If a refresh attempt was not the request, then a structured field of TYPE P_G_X_DATA (Hex 56) is sent to the HOST at function block 6260, a message is displayed telling the user that unknown graph data was received at 6270, and control is returned to the main loop at branch label 3090. If the data was a refresh attempt at decision block 6250, then the display is removed from graphics mode and graphics is released from the busy state for this session at function block 6280. Then at function block 6290, a structured field of TYPE P_G_X_REF (Hex 58) is sent to the HOST, the user is switched to a HOST session, and the MSAM screen is restored at function block 6300. Next, the keyboard is restored for entries to the HOST at function block 6310, an appropriate message is displayed at function block 6270, and control is passed back to the main loop at branch label 3090. If the graphics data from the HOST is not valid information, then at decision block 6400, a test is performed to decide if this is a refresh graphics attempt. If it is not, then the contents of the display are saved at function block 6410, the graphics session is set to busy at function block 6420, the user is switched into MSAM at 6430, and control is passed to function block 6510. If it is a refresh attempt at decision block 6400, then the MSAM graphic screen is cleared at function block 6500 and control flows to function block 6510 to join up with the control logic from function block 6430. Function block 6510 is responsible for drawing the graph on the display. If any errors are detected at decision block 6520, then the graphics flag is reset at function block 6530, a structured field of TYPE P_G_ERROR (Hex 55) is sent to the HOST at function block 6540, the MSAM display is reset at function block 6550, the display is returned to HOST mode at function block 6560, an appropriate message is displayed at output block 6570, and control returns to the main loop at branch label 3090. If there was no error at decision block 6520, then control returns to the main processing loop at branch label 3090.

SAMPLE SESSIONS

FIGS. 24 to 36 give an example of a computing environment in which MSAM would be used. In this environment, there are two HOSTS, HOSTX and HOSTY. Referring now to FIG. 24, HOSTX, HOSTY and an IBM 3270-PC are shown. HOSTX has four CICS regions active at 7000. Each region can be thought of as a separate CICS application such as Accounts Receivable or Inventory Control. HOSTY has three applications active at 7010. The IBM 3270-PC has four host sessions and one DOS session active. The CICS regions communicate using IBM Multiple Region Option (MRO) which is a specialized communications manager built into CICS for communicating between CICS applications. HOSTX and HOSTY communicate using IBM Inter System Communication (ISC). As a systems manager in this environment, it would be your responsibility to monitor these systems and assure that users received the response time that they are accustomed to. Before this invention, it would have been necessary to have a row of displays monitoring each separate CICS application and another row of terminals monitoring the communications environment. A systems operator would have to move from display to display to determine if there was a problem anywhere. The only way to analyze multiple CICS Regions was by the operator either employing paper or personal experience. MSAM is capable of monitoring all of these applications as well as the communications network and organize this information on a single IBM 3270-PC display.

Figure 25:
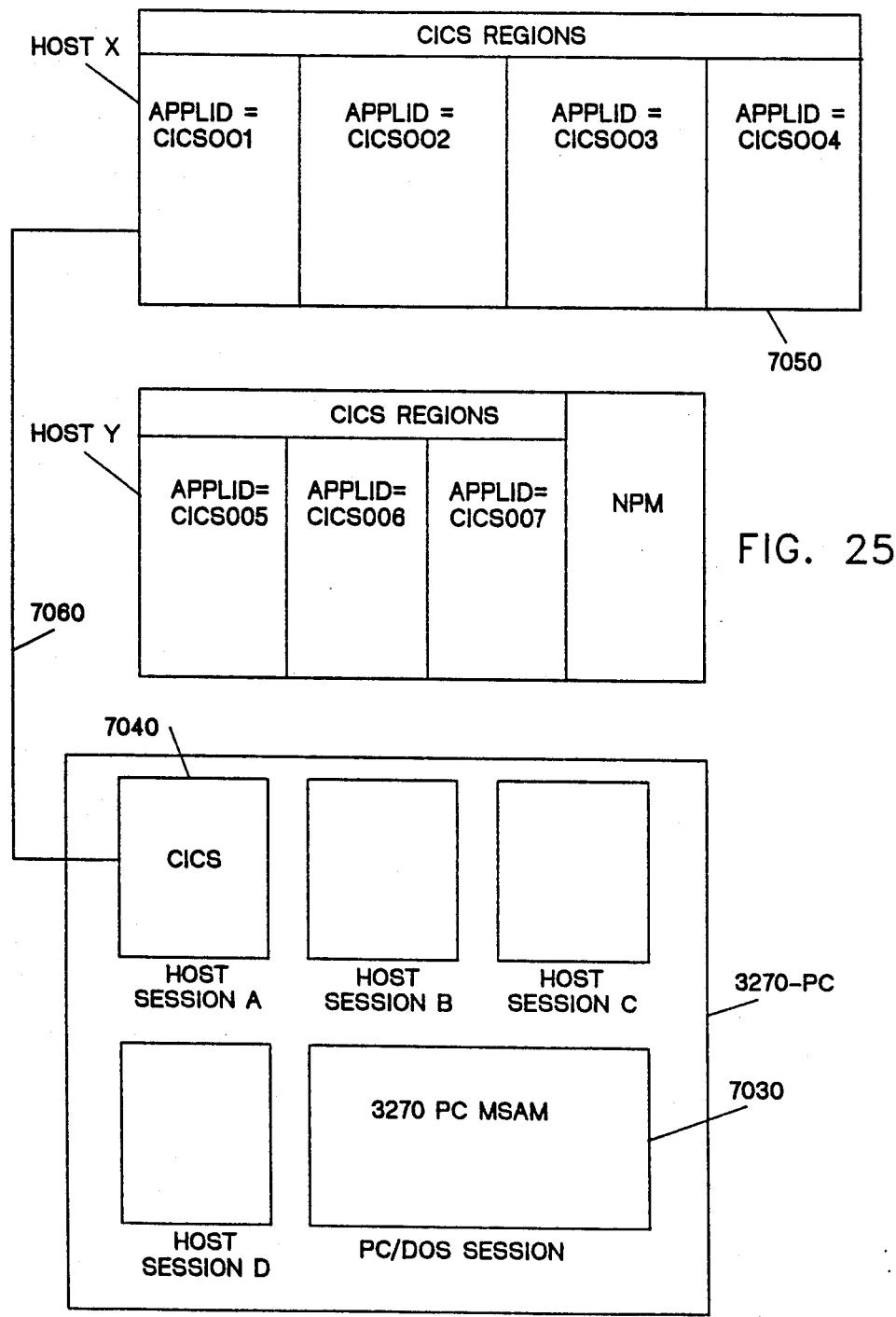

In FIG. 25, the same environment as FIG. 24 is used, but the user has invoked MSAM by entering MSAM on the prompt line of the IBM 3270-PC. The result of this entry is shown at 7030. The user then uses the JUMP key on the IBM 3270-PC to access a HOST session at 7040. The JUMP key allows the user to move out of the DOS environment and into a HOST terminal environment. From the HOST session, the user logs onto the CICS application CICS001 at 7050 by entering the command logon applid(CICS001). This initiates the communication link depicted at 7060. At this point the user is in communication with the CICS application CICS001.

Figure 26:
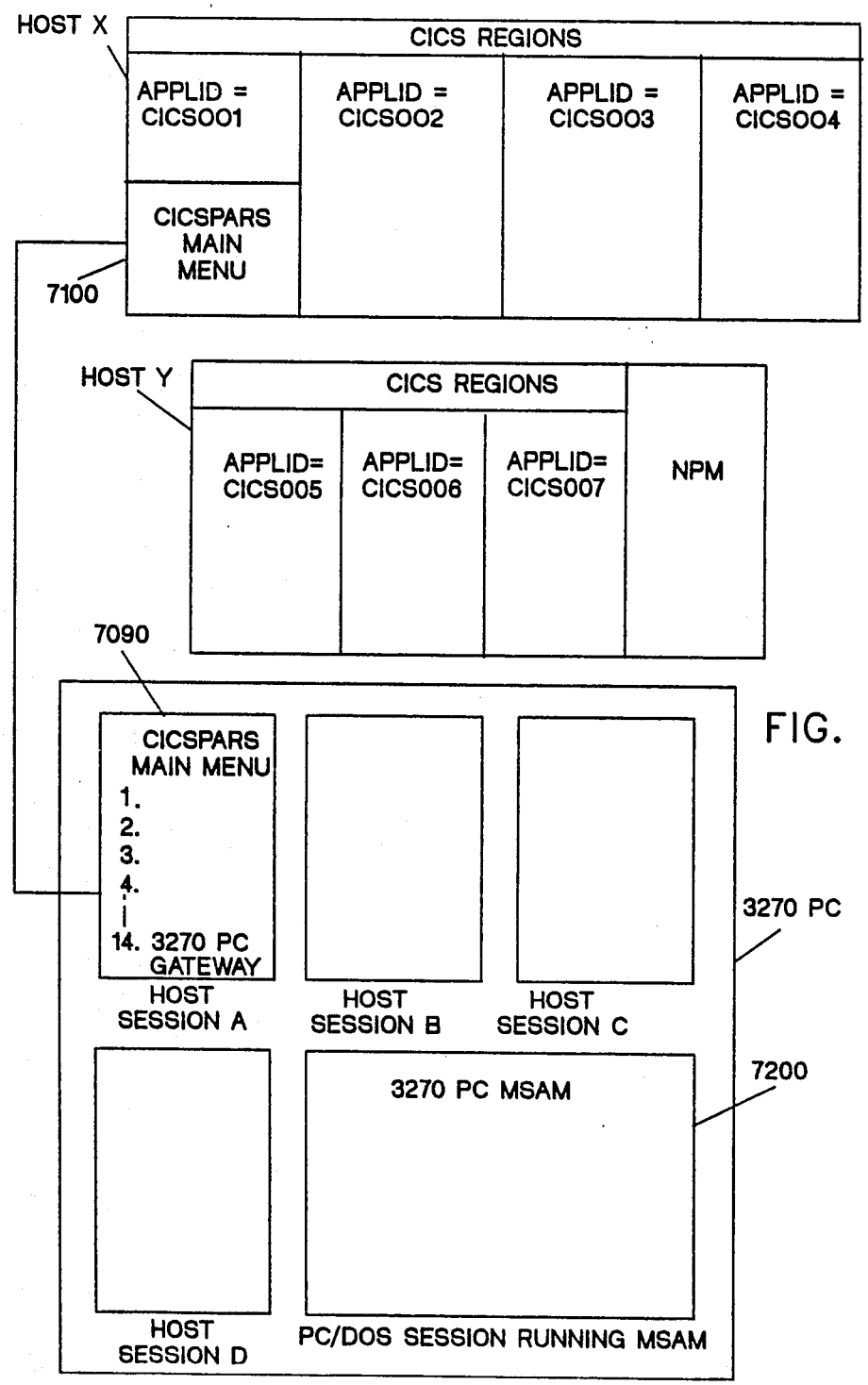
Figure 27:
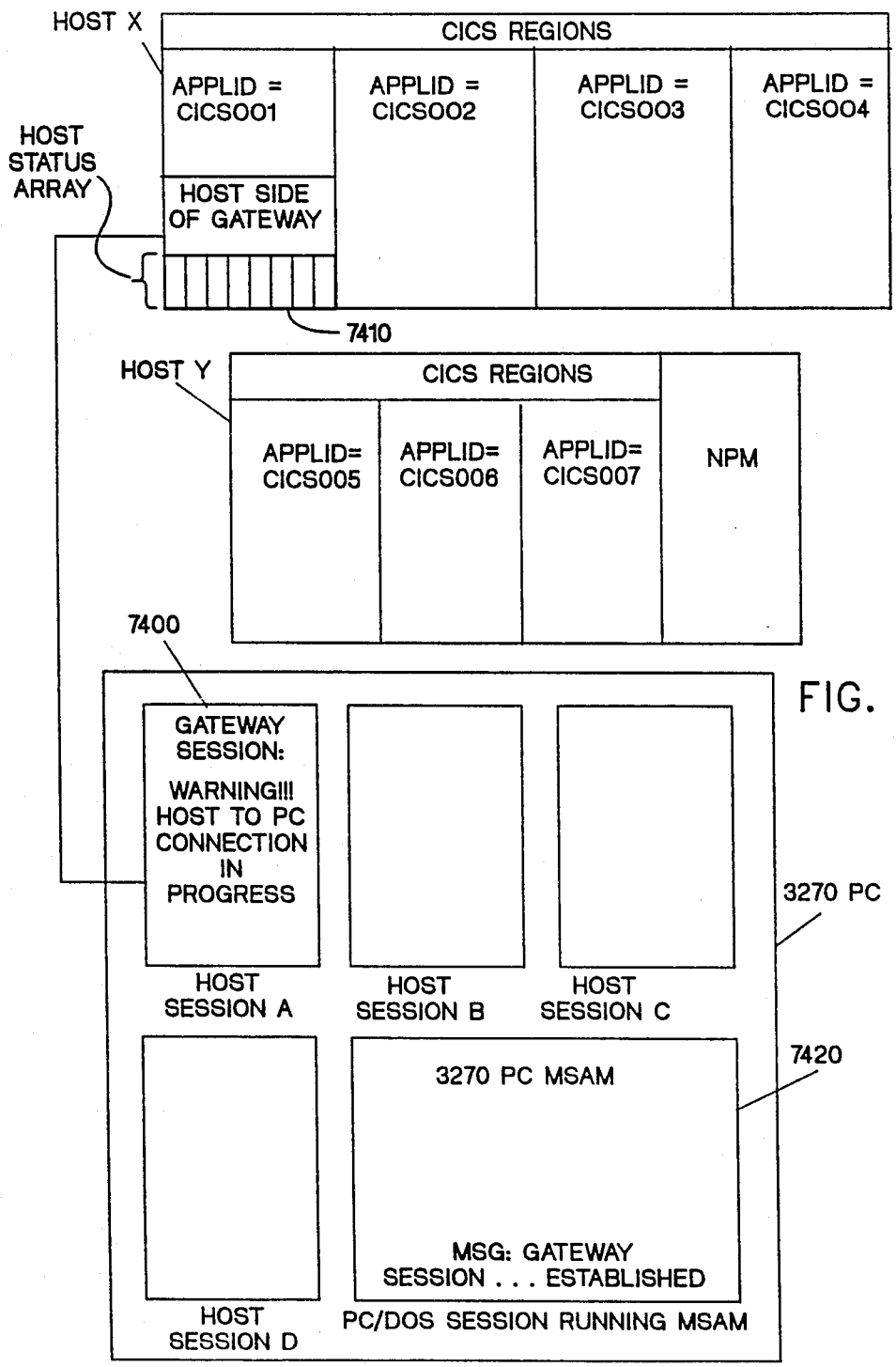

In FIG. 26, the user accesses CICS/PARS from the same host session that the initial communications with CICS001 was initiated. CICS/PARS is invoked by entering ECPM. The CICS/PARS main menu appears in the host session display as depicted at 7090. The CICS/PARS application actually resides on HOSTX as depicted at 7100 in the same CICS region as CICS001. From the main menu, the user selects option fourteen which establishes a gateway between the CICS Region and MSAM residing on the IBM 3270-PC as shown in FIG. 27. CICS/PARS will use the gateway to send the data structure H_SYS_TERM_ID to MSAM as described in detail in the flowcharts at FIGS. 24 and 25. CICS/PARS maintains an array that all the CICS applications can write status and alert information into. This array is used to relay information to MSAM through the gateway. The HOST session that the user was interfacing with on the IBM 3270-PC displays a message identifying it as the gateway session as depicted at 7400. The CICS Region CICS001 on HOSTX becomes the gateway server for communications between MSAM and all other CICS application as shown at 7410. A message is displayed on the MSAM screen to indicate that the gateway session has been established as illustrated at 7420. At this point no information is flowing over the communications gateway; however, the HOST session is now dedicated to the gateway.

Figure 28:
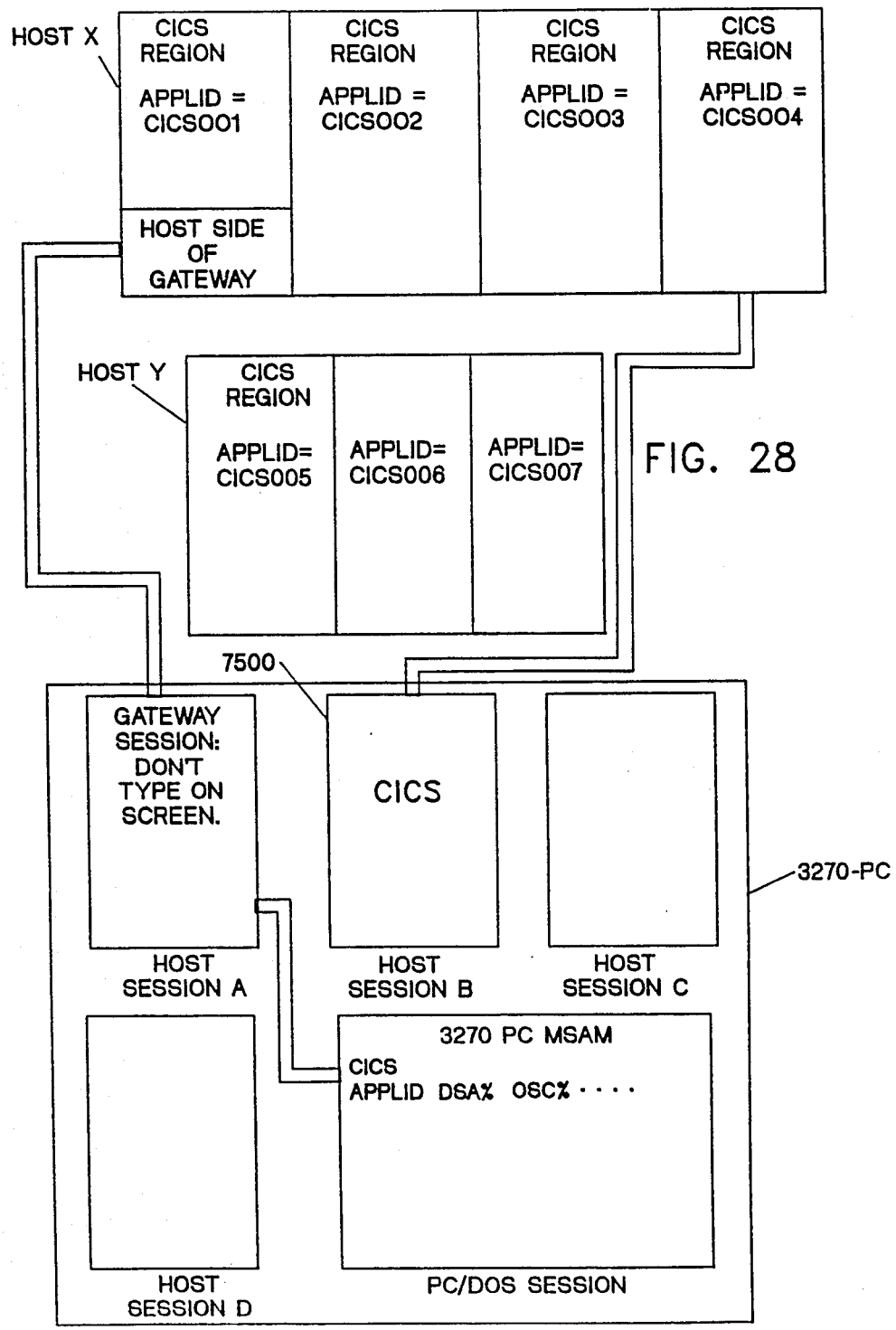
Figure 29:
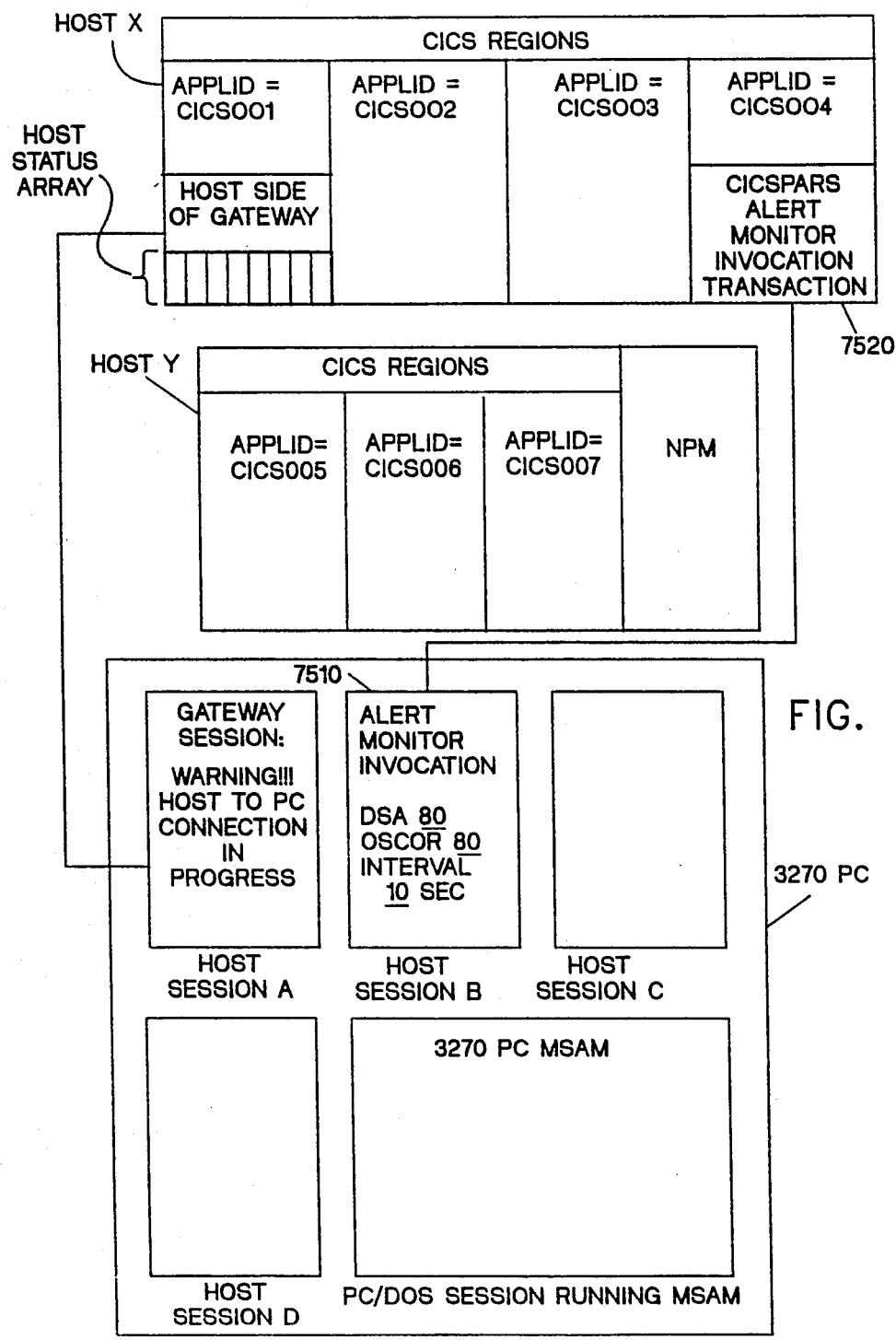

In FIG. 28, the user selects a second host session at 7500 and logs onto the CICS application that is to be monitored using the same logon procedure as discussed earlier. In this example the application is CICS004. In FIG. 29, the user logs onto CICS/PARS and selects the Alert Monitor Invocation function from the Main Menu. A full screen of resources will be presented as depicted at 7510. The user selects the resources that are to be monitored from this screen. Then the user enters the thresholds which trigger the alarms on MSAM. The user also selects the interval that the user deems necessary for sampling of the resource. An example of a resource that a user might monitor is the percentage utilization of the Dynamic Storage Area (DSA) of CICS. This storage area is maintained by CICS and used by application programs through storage requests to the CICS storage control. It is important to a systems manager to keep the percentage utilization of this area from exceeding a certain percentage to avoid applications waiting for space to free up to execute. Therefore, an operator might want to sample on ten second intervals to assure that the percentage has not exceeded a threshold. If the threshold is exceeded, then a message would indicate to the operator that corrective measures should be taken to remedy the problem.

Figure 30:
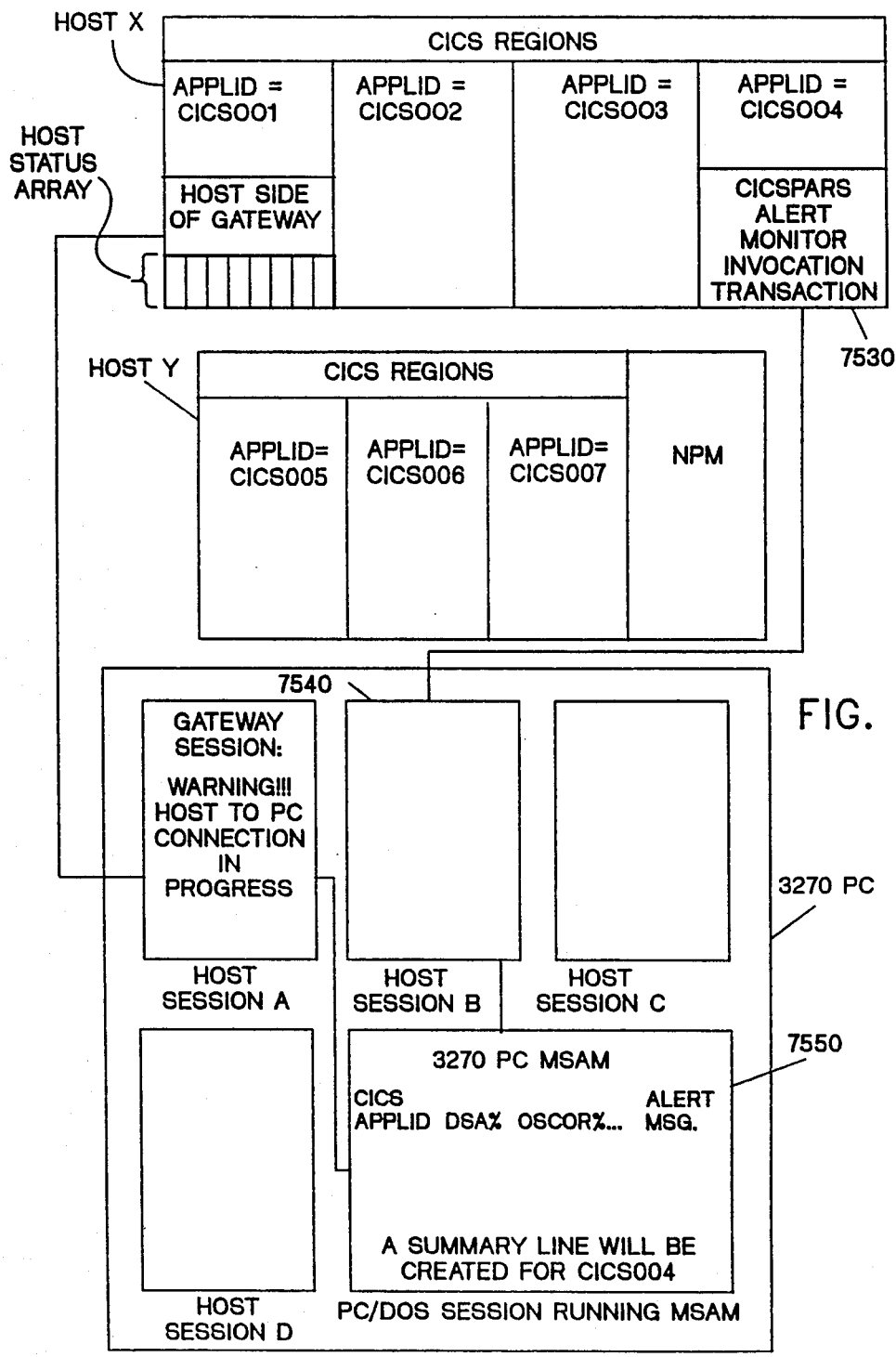
Figure 31:
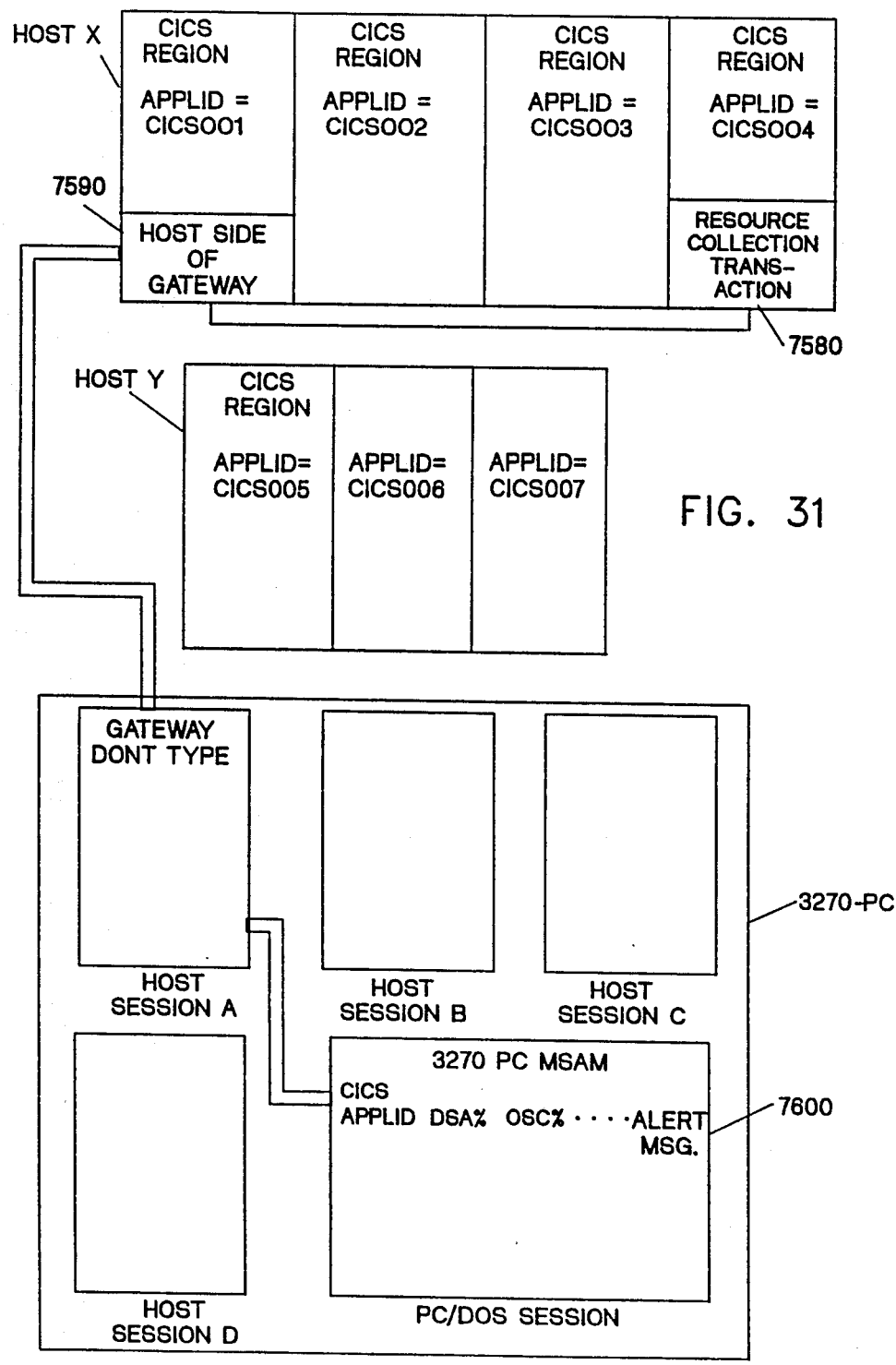
Figure 32:
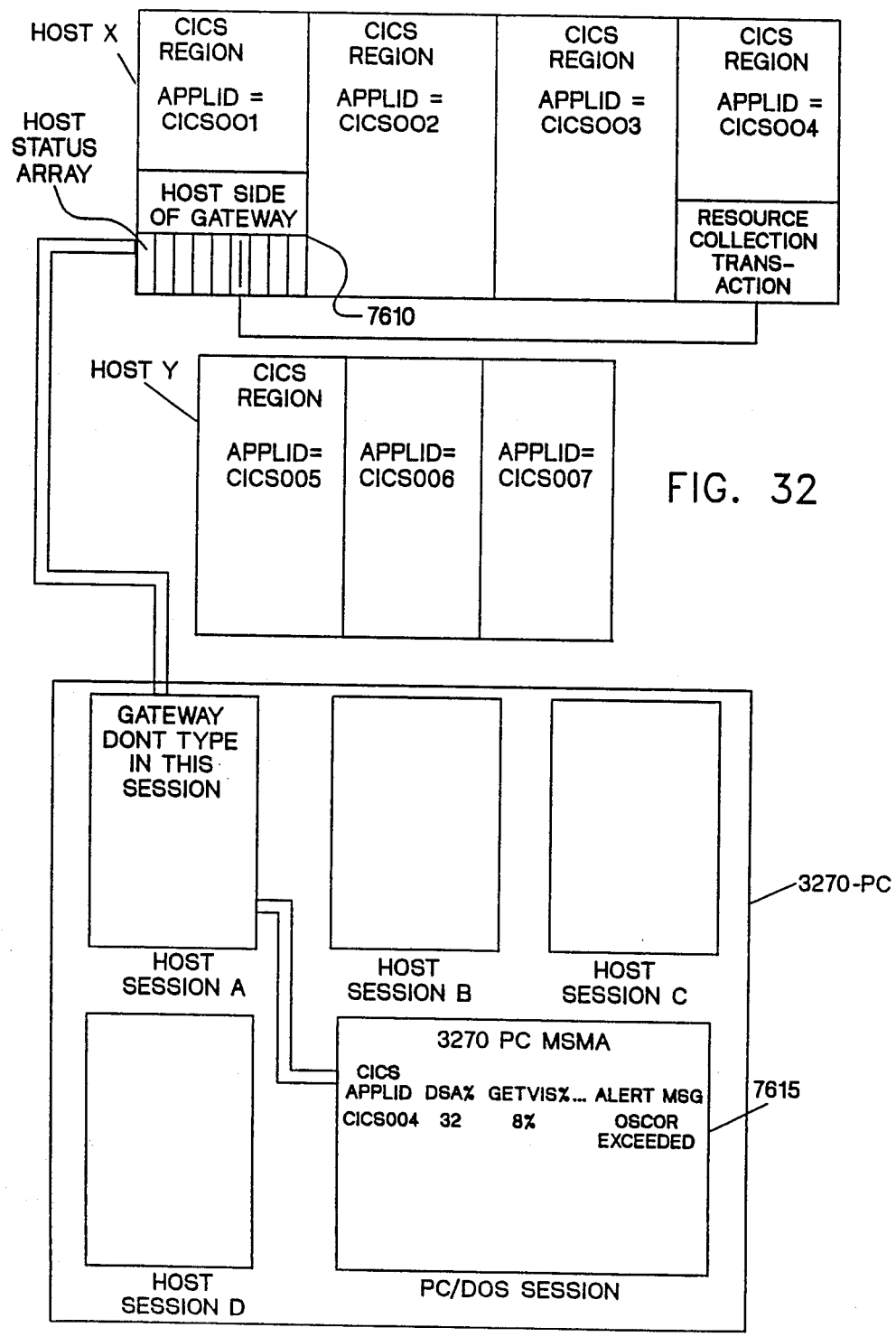

Turning now to FIG. 30, the steps to actually begin communication between the CICS application and MSAM are depicted. At 7540 when all the resources are selected and the threshold and interval information has been correctly entered, the user indicates the acceptance to the CICS/PARS application through the HOST session on the IBM 3270-PC at 7540. CICS/PARS on the host at 7530 sends MSAM the application identification CICS004, the resource and interval information through a communications buffer discussed in more detail in FIG. 8 of the flowcharts. MSAM responds at 7550 by sending CICS/PARS the address in temporary storage in which it is to post future summary and alert information. This address corresponds to the gateway status array address initially sent by the gateway application in FIG. 27. This initial communication between the application and MSAM directly is no longer required and is dropped in FIG. 31. All future communications will be indirect by the application CICS004 at 7580 writing status and alert information into the gateway status array on the specified intervals at 7590 and MSAM communicating with the HOST gateway to acquire current status and alert information.

MSAM polls the gateway to request current information and update its status lines. MSAM is also responsible for checking thresholds and presenting alarm information to the operator. This is a significant off-load for the HOST resources. MSAM also monitors the updated information to assure proper interval collection of information and notifies the operator if information is tardy in arriving. It is important to note that only one of the four host sessions on the IBM 3270-PC is tied up while monitoring is taking place. The other three sessions can be used for interfacing with other host applications. The key to this approach is the use of the Host gateway status array to accumulate resource status and alert information from the CICS applications as depicted at 7610 in FIG. 32. Also note at 7615 that the applications are identified on MSAM monitoring display by application identification to call information such as DSA% to the operators attention by both number value and a message if a threshold has been exceeded. Although it is not depicted on the display, MSAM can also be logging information to disk to create history information.

Figure 33:
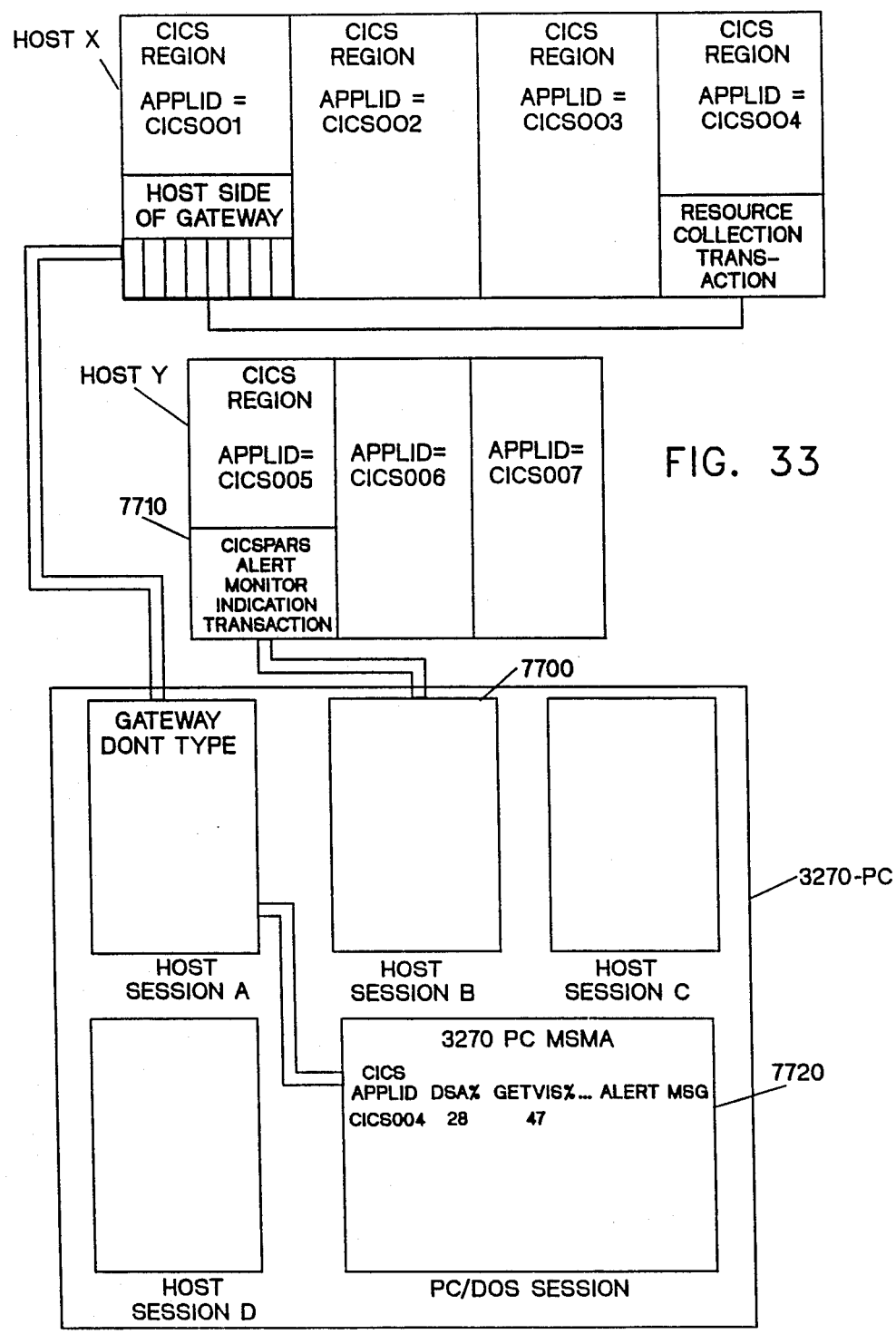

In FIG. 33, the steps necessary to bring another CICS application are shown. The user must use a free host session as indicated at 7700 on the IBM 3270-PC to access the CICS application that the user would like to monitor. The user logs onto the second CICS region, in this case BOX2001, invokes CICS/PARS, and enters the resource information that is to be monitored through the steps discussed previously. A temporary communication session begins again between MSAM and the CICS region BOX2001 at 7710 and the resource information consisting of application identification, resources, thresholds and intervals is exchanged between MSAM and the BOX2001 directly. FIG. 33 represents the configuration as this occurs. After the definition information is passed, the communications is all channeled through the gateway as discussed earlier.

Figure 34:
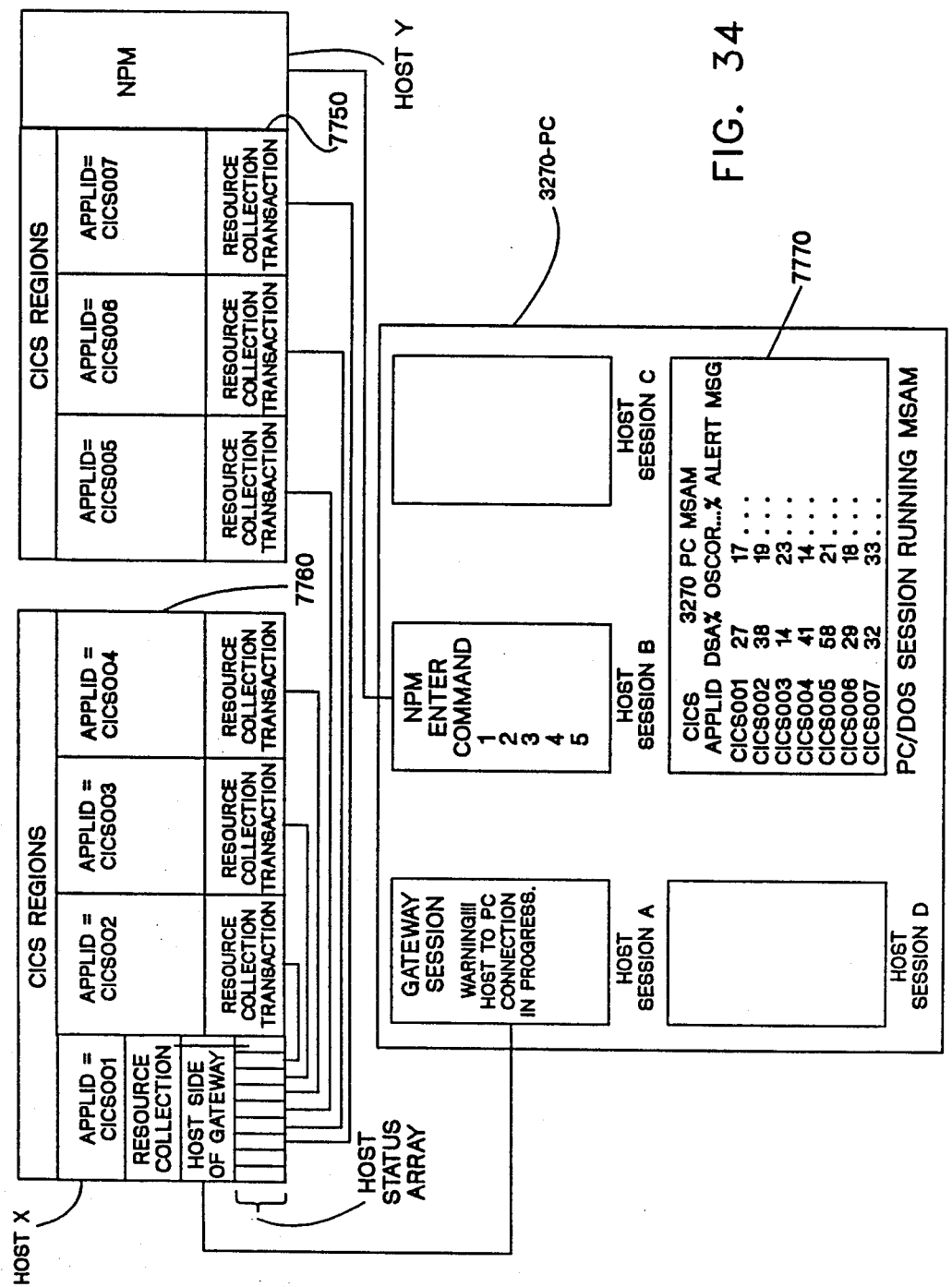

FIG. 34 shows MSAM after all of the CICS applications have been set up for monitoring. In this environment all seven CICS sessions can be monitored including the gateway application. All that is required is to log onto each application, invoke the alert monitor, set the thresholds, logoff to allow MSAM to acquire the settings and begin updating the HOST gateway status arrays. HOSTY at 7750 and HOSTX at 7760 are both being monitored by a single IBM 3270-PC communicating with only one CICS session with all the filtering and presentation of information being offloaded to MSAM on the PC at 7790. It is important to note that only one CICS session is communicating information to MSAM, although all seven are being monitored. This is accomplished by utilizing the HOST gateway status array.

Figure 35:
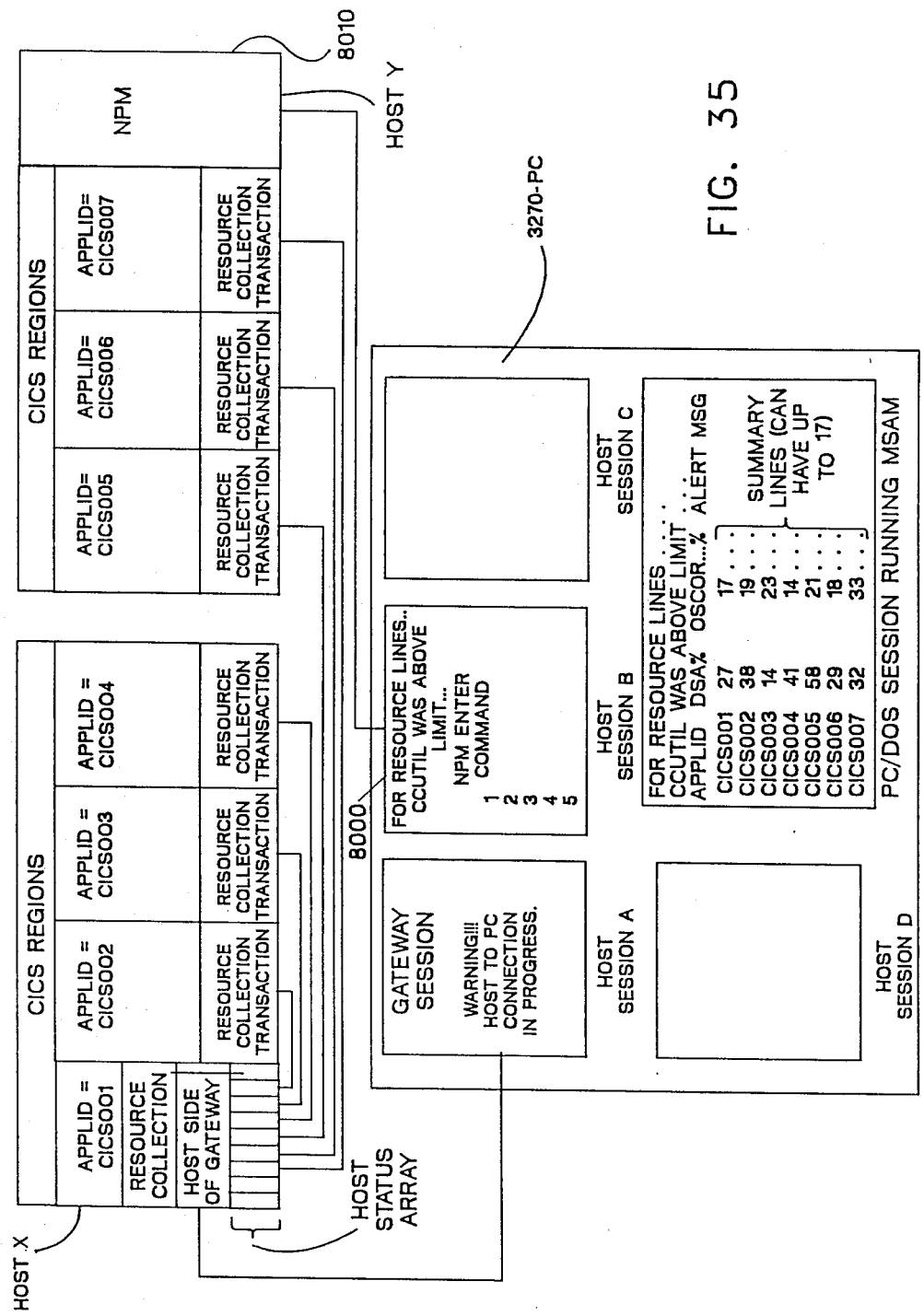
Figure 36:
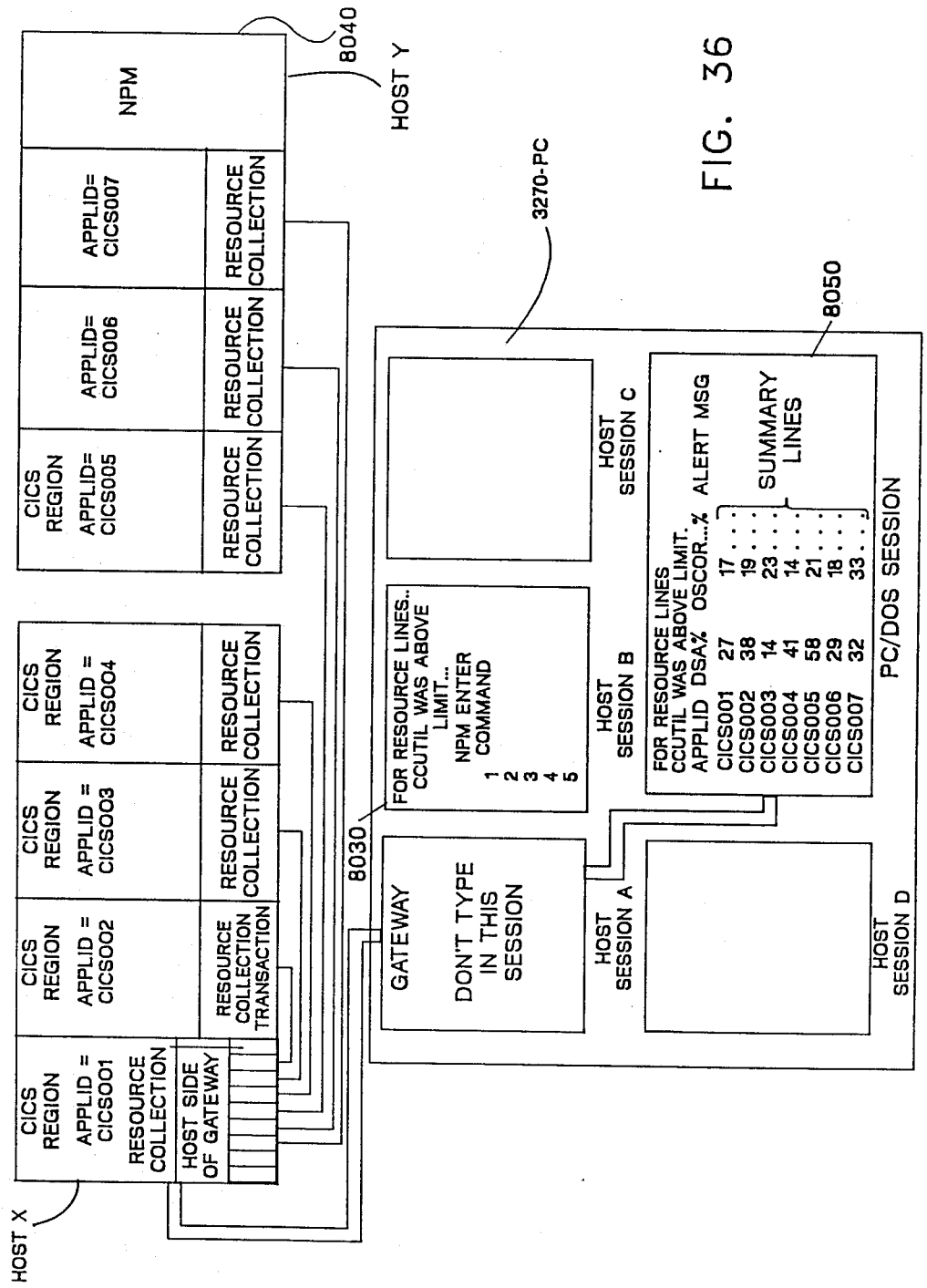

In FIGS. 35 and 36, the interface between MSAM and NPM are illustrated. To access NPM, the user invokes an NPM session on an available HOST display window of the IBM 3270-PC at 8000. From the NPM menu, resources are selected and thresholds and intervals are entered. NPM at 8010 alerts the operator of a threshold exceeded condition by writing an alarm message to the first and second line of the NPM session. MSAM polls each host session for the presence of an NPM alarm message.

Should an alarm message be detected, that message is transferred to the top of the MSAM display as depicted at 8050, an alarm is issued as shown at 8030 and the message is copied to the history log file. The NPM application remains active on the host that it was invoked from as shown at 8040. It is important to make note of the concurrent monitoring of CICS and NPM from the single MSAM display as depicted at 8050. This capability of monitoring multiple CICS and NPM sessions provides a unique capability to manage multiple hosts communication and application environments from a single IBM 3270-PC.

Although a preferred embodiment of the invention has been illustrated and described, those skilled in the art will recognize that this invention may be practiced with modification using other and different hardware to meet particular application requirements within the spirit and scope of the appended claims.

Having thus described my invention, what I claim as new and desire to secure by Letters Patent is as follows:

1. In a networked system of a plurality of host computers running a plurality of host computer programs, a method of simultaneously displaying data representative of operational parameters indicating performance of said plurality of host computer programs on a single work station display screen wherein each of said host computer programs is monitored by means of a monitor program associated therewith, each of said monitor programs detecting and storing operating parameter values during operation of its associated computer program, and said work station display screen includes a plurality of areas for displaying data, said method comprising an application program running on said single work station which performs the steps of:
   receiving user inputs at said single work station and setting thresholds of selected operating parameter values for each of said host computer programs;
   scanning the stored operating parameter values for each of said host computer programs and displaying on a single line within a first area of said single work station display screen selected values for each of said host computer programs;
   generating an alarm associated with any of said selected values for which a threshold is exceeded; and
   responding to a user input on said single work station to log onto a host computer program using a second area of said work station display screen in order to allow diagnosing an alarm condition.

2. The method recited in claim 1 further comprising the step of displaying said selected values in colors according to a predetermined relationship with said thresholds, one color indicating a selected value has exceeded its set threshold, a second color indicating a selected value is within a predetermined range of its set threshold, and a third color indicating that a selected value is below said predetermined range.

3. The method recited in claim 2 wherein said step of generating an alarm includes generating an audible alarm.

4. The method recited in claim 3 wherein said step of generating an audible alarm includes generating a voiced message.

5. The method recited in claim 1 further comprises the steps of analyzing the scanned and stored operating parameter values for each of said host computer programs and optionally displaying a graphical representation, in said first area on said single work station display screen, or a transaction rate, use of dynamic storage, and use of operating system core of a selected one of said host computer programs.

6. The method recited in claim 1 wherein a network monitor program is run on one of said host computers, said network monitor program detecting and storing operating parameter values of said networked plurality of host computers, said method further comprising the steps of:

receiving user inputs at said single work station and setting thresholds of selected operating parameter values of said networked system of a plurality of host computers;

scanning the stored operating parameter values for networked plurality of host computers and displaying in a third area of said single work station display screen selected values of the operating parameter values of said networked plurality of host computers; and generating an alarm associated with any of said selected values of the operating parameter values of said networked plurality of host computers.

7. The method recited in claim 6 further comprising the step of displaying said selected values in colors according to a predetermined relationship with said thresholds, one color indicating a selected value has exceeded its set threshold, a second color indicating a selected value is within a predetermined range of its set threshold, and a third color indicating that a selected value is below said predetermined range.

8. The method recited in claim 7 wherein said step of generating an alarm includes generating an audible alarm.

9. The method recited in claim 8 wherein said step of generating an audible alarm includes generating a voiced message.

10. The method recited in claim 6 further comprises the steps of analyzing the scanned and stored operating parameter values for each of said host computer programs and optionally displaying a graphical representation, in said first area on said single work station display screen, or a transaction rate, use of dynamic storage, and use of operating system core of a selected one of said host computer programs.

* * * * *